(12) United States Patent
Kajiwara et al.

(10) Patent No.: US 10,530,117 B2
(45) Date of Patent: Jan. 7, 2020

(54) OPTICAL FIBER LASER DEVICE

(71) Applicant: FURUKAWA ELECTRIC CO., LTD., Tokyo (JP)

(72) Inventors: Koji Kajiwara, Tokyo (JP); Takeshi Takagi, Tokyo (JP); Kousuke Kashiwagi, Tokyo (JP); Kazuaki Hyuga, Tokyo (JP); Yoshihiro Emori, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/393,709

(22) Filed: Dec. 29, 2016

(65) Prior Publication Data
US 2017/0110847 A1    Apr. 20, 2017

Related U.S. Application Data

(63) Continuation of application No. PCT/JP2015/069342, filed on Jul. 3, 2015.

(30) Foreign Application Priority Data

Jul. 4, 2014    (JP) .................................. 2014-139047
May 8, 2015    (JP) .................................. 2015-096100

(51) Int. Cl.
*H01S 3/13*    (2006.01)
*G02B 6/02*    (2006.01)
(Continued)

(52) U.S. Cl.
CPC .............. *H01S 3/1305* (2013.01); *G02B 6/02* (2013.01); *G02B 6/26* (2013.01); *H01S 3/0014* (2013.01);
(Continued)

(58) Field of Classification Search
CPC .. H01S 3/1305; H01S 3/06754; H01S 3/1306; H01S 3/0014; H01S 3/1022;
(Continued)

(56) References Cited

U.S. PATENT DOCUMENTS 4,697,869 A  * 10/1987  So .......................... G02B 6/266
                                                                                    385/140
5,363,234 A  * 11/1994  Newhouse ............. G02B 6/262
                                                                                    359/337
(Continued)

FOREIGN PATENT DOCUMENTS

CN          102651531 A     8/2012
CN          103794983 A     5/2014
(Continued)

OTHER PUBLICATIONS

International Search Report dated Oct. 6, 2015 in PCT/JP2015/069342 filed on Jul. 3, 2015 (with English translation).
(Continued)

*Primary Examiner* — Xinning(Tom) Niu
(74) *Attorney, Agent, or Firm* — Oblon, McClelland, Maier & Neustadt, L.L.P.

(57) ABSTRACT

An optical fiber laser device generates laser light by using an optical amplifying fiber as an amplification medium in a laser oscillator and includes: an optical outputting fiber configured to emit laser light to an outside; a return-light-attenuating portion configured to perform an attenuation process to return light propagating through at least the optical outputting fiber in a reverse direction of the laser light; a thermal conversion unit provided at the return-light-attenuating portion and configured to convert the return light into heat; a temperature-monitoring device configured to measure an increase in a temperature, of the return-light-attenuating portion, caused by the heat converted by the thermal conversion unit; and a control unit configured to
(Continued)

decrease or stop an output of the laser light when the temperature measured by the temperature-monitoring device becomes a predetermined threshold temperature or higher.

17 Claims, 20 Drawing Sheets

(51) Int. Cl.
  *G02B 6/26*   (2006.01)
  *H01S 3/067*   (2006.01)
  *H01S 3/102*   (2006.01)
  *H01S 3/00*   (2006.01)
  H01S 3/094   (2006.01)
  H01S 3/0941   (2006.01)
  H01S 3/16   (2006.01)

(52) U.S. Cl.
  CPC ........ *H01S 3/06754* (2013.01); *H01S 3/1022* (2013.01); *H01S 3/1306* (2013.01); *H01S 3/005* (2013.01); *H01S 3/0675* (2013.01); *H01S 3/09415* (2013.01); *H01S 3/094011* (2013.01); *H01S 3/1618* (2013.01)

(58) Field of Classification Search
  CPC .. H01S 3/0675; H01S 3/09415; H01S 3/1618; H01S 3/005; H01S 3/094011; G02B 6/02; G02B 6/26
  See application file for complete search history.

(56) References Cited

U.S. PATENT DOCUMENTS

| | | | | |
|---|---|---|---|---|
| 6,781,748 | B2* | 8/2004 | Yeniay | H01S 3/06754 359/341.1 |
| 2005/0169339 | A1* | 8/2005 | Gumbo | H01S 3/063 372/66 |
| 2005/0220429 | A1* | 10/2005 | Davis | G02B 6/02 385/123 |
| 2009/0110355 | A1* | 4/2009 | DeMeritt | G02B 6/02009 385/123 |
| 2009/0251697 | A1* | 10/2009 | Cutillas | H01S 5/02248 356/400 |
| 2011/0103756 | A1* | 5/2011 | Rice | C03B 37/0235 385/123 |
| 2013/0259069 | A1 | 10/2013 | Miyato et al. | |
| 2013/0299474 | A1 | 11/2013 | Kashiwagi et al. | |
| 2015/0214692 | A1 | 7/2015 | Miyato et al. | |
| 2016/0254637 | A1 | 9/2016 | Ikoma et al. | |

FOREIGN PATENT DOCUMENTS

| | | |
|---|---|---|
| EP | 0 507 483 A1 | 10/1992 |
| JP | 56-18901 U | 7/1954 |
| JP | 53-100879 | 9/1978 |
| JP | 1-302205 | 12/1989 |
| JP | 8-191286 | 7/1996 |
| JP | 10-51056 A | 2/1998 |
| JP | 2000-131139 | 5/2000 |
| JP | 2001-27719 | 1/2001 |
| JP | 2001-228337 A | 8/2001 |
| JP | 2005-354144 A | 12/2005 |
| JP | 2007-42981 | 2/2007 |
| JP | 2014-13936 A | 1/2014 |
| JP | 5680170 | 3/2015 |
| WO | WO 2012/073952 A1 | 6/2012 |
| WO | WO 2012/099116 A1 | 7/2012 |
| WO | WO 2014/014068 | 1/2014 |

OTHER PUBLICATIONS

Written Opinion dated Oct. 6, 2015 in PCT/JP2015/069342 filed on Jul. 3, 2015.
Combined Office Action and Search Report dated Sep. 5. 2018 in Chinese Patent Application No. 201580033604.9 (with English translation of the Office Action and English translation of categories of cited documents), 13 pages.
Office Action dated Feb. 12, 2019 in Japanese Patent Application No. 2016-531481, with English-language translation, 6 pages. (The references cited therein were previously filed.).
Japanese Office Action dated Apr. 25, 2019 in Patent Application No. 2016-531481, 4 pages (with unedited computer generated English translation).
Combined Chinese Office Action and Search Report dated Apr. 30, 2019 in Patent Application No. 201580033604.9, 10 pages (with unedited computer generated English translation and English Translation of Category of Cited Documents).

\* cited by examiner

OPTICAL FIBER LASER DEVICE

CROSS-REFERENCE TO RELATED APPLICATION(S)

This application is a continuation of International Application No. PCT/JP2015/069342, filed on Jul. 3, 2015, which claims the benefit of priority from Japanese Patent Application No. 2014-139047 filed on Jul. 4, 2014, and Japanese Patent Application No. 2015-096100 filed on May 8, 2015, the entire contents of which are incorporated herein by reference.

BACKGROUND

The present disclosure relates to an optical fiber laser device.

Optical fiber laser devices using an optical fiber for an optical amplifying portion of a laser oscillator or an optical amplifier have been used in various fields such as laser-processing or the like.

In such optical fiber laser devices, a so-called return light problem occurs sometimes that a reflected laser light is coupled to a core of an optical fiber inside the optical fiber laser device (for example, see WO2014/014068 or WO2012/073952). When the optical fiber laser device is used as a laser-processing apparatus, this return light is generated because, for example, laser light irradiated to a workpiece is reflected by the workpiece. This return light is considered to be generated by a reflection as well at various locations such as a crack in the optical fiber used in the optical fiber laser device, a defect at an optical connection portion.

This return light may be propagated in the optical fiber in the optical fiber laser device in a reverse direction of laser light output by the laser oscillator, and it may damage composing parts of the optical fiber laser device sometimes. A composing part of the optical fiber laser device which may be affected and damaged by the return light may be, for example, a light emission element that emits a guide light pointing a position where laser light for laser machining is emitted. Even if a composing part is not provided to an end portion where the return light reaches, it may be a problem from a view point of securing safety if high power return light is emitted from the end portion.

However, the above-described return light may be unforeseeable qualitatively and quantitatively sometimes. For example, the return light may be amplified while propagating through an oscillator or an amplifier in the optical fiber laser device. A stimulated Raman scattered light whose wavelength is longer than that of laser light oscillated by the laser oscillator may be generated sometimes in a process of propagation through the optical fiber in the optical fiber laser device. Therefore, when adopting a countermeasure for return light with specific power and specific wavelength, the return light could not be attenuated appropriately, and thus, composing parts of the optical fiber laser device may be damaged.

SUMMARY

It is an object of the present disclosure to at least partially solve the problems in the conventional technology.

According to one aspect of the present disclosure, there is provided an optical fiber laser device for generating laser light by using an optical amplifying fiber as an amplification medium in a laser oscillator, the optical fiber laser device including: an optical outputting fiber configured to emit laser light to an outside; a return-light-attenuating portion configured to attenuate return light propagating through at least the optical outputting fiber in a reverse direction of the laser light; a thermal conversion unit provided at the return-light-attenuating portion and configured to convert the return light into heat; a temperature-monitoring device configured to measure an increase in a temperature, of the return-light-attenuating portion, caused by the heat converted by the thermal conversion unit; and a control unit configured to decrease or stop an output of the laser light when the temperature measured by the temperature-monitoring device becomes a predetermined threshold temperature or higher.

According to another aspect of the present disclosure, there is provided an optical fiber laser device for generating laser light by using an optical amplifying fiber as an amplification medium in a laser oscillator, the optical fiber laser device including: an optical outputting fiber configured to output laser light to an outside in a forward direction; and a return-light-attenuating portion formed of an optical attenuating fiber coiled for a plurality of rounds, wherein a bending loss in return light is greater than a bending loss in visible light, the return light being infrared light propagating through the optical outputting fiber in a reverse direction of the laser light.

According to further aspect of the present disclosure, there is provided an optical fiber laser device for generating laser light by using an optical amplifying fiber as an amplification medium in a laser oscillator, the optical fiber laser device including: an optical outputting fiber configured to output the laser light to an outside in a forward direction; and a return-light-attenuating portion configured to attenuate an optical intensity of return light including infrared light propagating a core of the optical outputting fiber in a reverse direction and emit the attenuated return light from an end portion on an opposite side to the optical outputting fiber, wherein the return-light-attenuating portion includes: a return light propagation loss portion made of a medium, the medium giving a loss to the return light continuously in a direction of propagation of the return light; and a thermal conversion portion configured to convert light generated by the loss into heat, a major portion of the return light is attenuated and subjected to thermal conversion at the return light propagation loss portion, and only light, of which intensity is minute, remaining after being attenuated is output from an end portion of the return light propagation loss portion.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION

Figure 1:
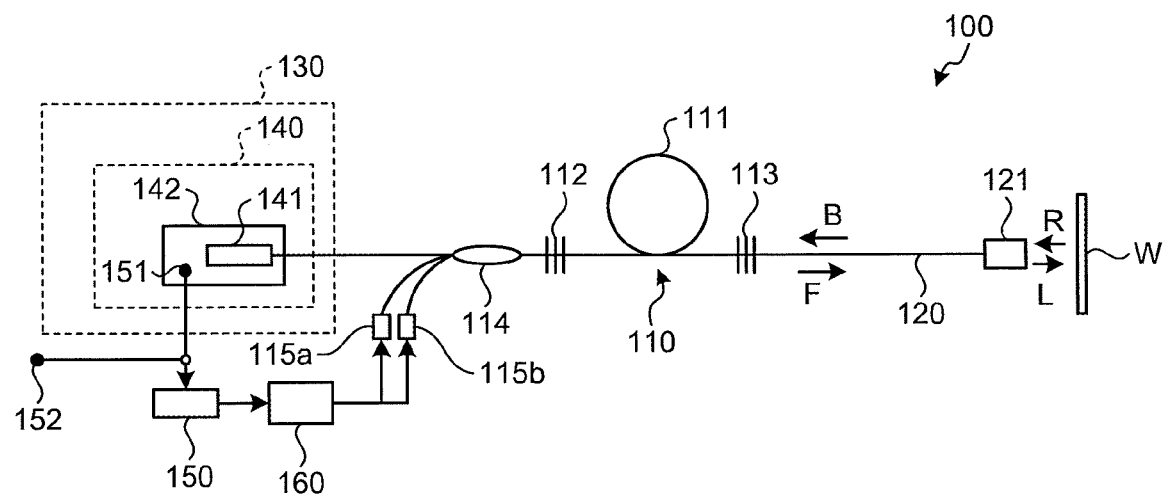
FIG. 1 illustrates a schematic configuration of an optical fiber laser device according to a first embodiment of the present disclosure.

Hereafter, embodiments of an optical fiber laser device according to the present disclosure will be explained in detail with reference to the drawings. The present disclosure is not limited by the embodiments explained below. In all the drawings, identical or corresponding elements are given same reference numerals appropriately. It should be noted that the drawings show schematic examples. Accordingly, a relationship between respective elements may be different from real values. Among the drawings, there may be parts where the relationships and ratios of the illustrated sizes are different from one another. In the present description, cut-off wavelength means a cut-off wavelength according to 22-m method defined by International Telecommunication Union Standardization Sector (ITU-T) G. 650.1. Any terms not specifically defined in the description follow definitions and measuring methods of the ITU-T G. 650.1.

First Embodiment

FIG. 1 illustrates a schematic configuration of an optical fiber laser device 100 according to a first embodiment. As illustrated in FIG. 1, the optical fiber laser device 100 according to the first embodiment is an optical fiber laser type device that generates laser light by using an optical amplifying fiber 111 as an amplification medium in a laser oscillator 110.

The optical fiber laser device 100 includes an optical outputting fiber 120, a return-light-attenuating portion (a return-light attenuation module 140), a thermal conversion unit 141, a temperature-monitoring device 150, and a control unit 160. The optical outputting fiber 120 outputs output laser light L in a forward direction (arrow F in the drawing) and to outside. The attenuation module 140 attenuates return light R propagating through at least the optical outputting fiber 120 in a reverse direction (arrow B in the drawing). The thermal conversion unit 141 is disposed in a return-light-attenuating module 140 and convers the return light to heat. The temperature-monitoring device 150 measures an increase in temperature, caused by heat generated in the thermal conversion unit 141, of the return-light-attenuating module 140. The control unit 160 decreases or stops an output of the output laser light L when the temperature measured by the temperature-monitoring device 150 is equal to or more than a predetermined threshold. In the configurations of the embodiments explained below, the forward direction F and the reverse direction B are defined as illustrated in FIG. 1.

As illustrated in FIG. 1, the laser oscillator 110 includes the optical amplifying fiber 111, a first light-reflecting unit 112 disposed on a reverse direction side of the optical amplifying fiber 111 and a second light-reflecting unit 113 disposed on a forward direction side of the optical amplifying fiber 111. At least the laser oscillator 110 and preferably optical fibers, arranged in upstream and downstream of the laser oscillator 110, from the optical outputting fiber 120 to a signal port optical fiber of a pumping-light multiplexer 114 are configured by an optical fiber including a core having characteristics that light of wavelength of 1000 nm to 1200 nm is propagated in a substantially single mode (single mode, or light having a mode field distribution most of which is composed of a fundamental mode and the rest of which, approximately several percentages, is composed of several higher-order modes (a few modes)) in an electric field intensity distribution in a core of an optical fiber. Hereafter, a substantially single mode refers to a propagation mode of the light defined above. It is preferable that these optical fibers be configured to be approximately identical in mode-field diameter respectively at a wavelength of output laser light, and it is preferable that, for a core from the first light-reflecting unit 112 configuring at least the laser oscillator 110 to an optical fiber configuring the second light-reflecting unit 113, a mode-field diameter at a wavelength of the output laser light be approximately identical and mode propagation characteristics be configured approximately identical.

The optical amplifying fiber 111 is a double-cladding-type optical fiber whose core portion made of a silica-based glass is doped with an ytterbium (Yb) ion that is an amplification substance. An inner cladding layer made of a silica-based glass and an outer cladding layer made of a resin or the like are formed in this order on an outer periphery of the core portion of the optical amplifying fiber 111. The core portion whose numerical aperture is for example 0.08 is configured to propagate light of wavelength of 1000 nm to 1200 nm in single mode. The length of the optical amplifying fiber 111 is, for example, 25 m. The absorption coefficient for the core portion of the optical amplifying fiber 111 is, for example, 200 dB/m at a wavelength of 1070 nm. A power conversion efficiency of pumping light input to the core portion to the oscillated laser light is, for example, 70%.

The first light-reflecting unit 112 and the second light-reflecting unit 113 include, for example, fiber bragg gratings (FBGs) having different wavelength characteristics. The first light-reflecting unit 112 and the second light-reflecting unit 113 are configured by providing a diffraction grating on the core of the optical fiber. It is preferable that the first light-reflecting unit 112 and the second light-reflecting unit 113 be configured to be a double-cladding-type optical fiber having an inner cladding, and the inner cladding be configured to propagate light of a pumping-light wavelength in multi-mode.

The center wavelength of the first light-reflecting unit 112 is, for example, 1070 nm, and the reflectivity of the first light-reflecting unit 112 is approximately 100% at the center wavelength and approximately 2 nm of wavelength bandwidth including the center wavelength. The first light-reflecting unit 112 has characteristics of transmitting most of light at a wavelength of 915 nm therethrough. On the other hand, the center wavelength of the second light-reflecting unit 113 is, for example, 1070 nm which is approximately identical to that of the first light-reflecting unit 112, the reflectivity of the second light-reflecting unit 113 is approximately 10% to 30% at the center wavelength, and the full width at half maximum in a reflection wavelength bandwidth is approximately 1 nm. The second light-reflecting unit 113 has characteristics of transmitting most of the light at the wavelength of 915 nm therethrough. When pumping light of, for example, a wavelength of 975 nm but not 915 nm is used, it is preferable for the first light-reflecting unit 112 and the second light-reflecting unit 113 to have characteristics of transmitting most of the light of the wavelength of 975 nm therethrough.

By the above-described configuration, the laser oscillator 110 configured to oscillate laser light of wavelength of 1070 nm when pumping light of the wavelength of 915 nm is introduced and output the laser light from the second light-reflecting unit 113 to the optical outputting fiber 120.

By the above-described configuration, the laser oscillator 110 is configured to oscillate laser light of wavelength of 1070 nm when pumping light of the wavelength of 915 nm is introduced to the optical amplifying fiber 111 and output the laser light from the second light-reflecting unit 113 to the optical outputting fiber 120.

When the optical fiber laser device 100 is used for laser-processing, the output laser light L output to the optical outputting fiber 120 is irradiated to a workpiece W via an irradiation head 121. The output laser light L irradiated to the workpiece W generates a reflected light on a surface of the workpiece W, and a part of this reflected light may be introduced to the optical outputting fiber 120 via the irradiation head 121. The reflected light introduced to the optical outputting fiber 120 may propagate through the core of the optical outputting fiber 120 in the reverse direction and transmit through the first light-reflecting unit 112. Similarly, a Raman scattering light, a stimulated Brillouin scattering light, and the like generated from the reflected light may transmit through the first light-reflecting unit 112 and reach a terminal portion 130. Therefore, a plurality of components are supposed to be included in the light transmitting through the first light-reflecting unit 112, and in the present description, light propagating through at least the core of the optical outputting fiber 120 in the reverse direction of the output laser light L is called return light R.

As illustrated in FIG. 1, the optical fiber laser device 100 according to the first embodiment adopts a so-called forward-pumping type configuration. In the optical fiber laser device 100, the pumping-light multiplexer 114 for outputting pumping light to the first light-reflecting unit 112 is provided upstream to the first light-reflecting unit 112. Hereby the optical fiber laser device 100 introduces the pumping light from the upstream to the first light-reflecting unit 112 toward the optical amplifying fiber 111.

The pumping-light multiplexer 114 includes, for example, a tapered fiber bundle (TFB). The pumping-light multiplexer 114 includes a forward-direction-side signal port optical fiber and a reverse-direction-side signal port optical fiber, which configure two end portions, and a plurality of pumping-light port optical fibers. Extending between the forward-direction-side signal port optical fiber and the reverse-direction-side signal port optical fiber is a core which is preferable to have single mode propagation characteristics at a laser oscillation wavelength but may be a substantially single mode. on the other hand, the port for pumping light is configured by an optical fiber including a (multi-mode) core having multi-mode propagation characteristics at the pumping-light wavelength. A multi-mode core of a multi-mode optical fiber configuring each port for pumping light is configured to surround around the core of the optical fiber configuring the forward-direction-side signal port.

The forward-direction-side signal port of the pumping-light multiplexer 114 is connected to the double-cladding-type optical fiber so that the core extending from the reverse-direction-side signal port is coupled to a single mode core and the core extending from each port for pumping light is coupled to an inner cladding. Moreover, this double-cladding-type optical fiber is connected to the optical amplifying fiber 111 via the first light-reflecting unit 112. Hereby the light input to the reverse-direction-side signal port at the laser emission wavelength is propagated to the core of the optical amplifying fiber 111 at a substantially single mode. On the other hand, the light input to each port for pumping light at the pumping wavelength is propagated to the inner cladding of the optical amplifying fiber 111 in multi-mode.

In the optical fiber laser device 100, the port for pumping light of the pumping-light multiplexer 114 is connected to pumping laser diodes 115a and 115b.

The reverse-direction-side signal port of the pumping-light multiplexer 114 is connected to the terminal portion 130. Since the cores extend at two ends of the forward-direction-side signal port and the reverse-direction-side signal port, the intensity of the return light is strong, and thus, the reverse-direction-side signal port of the pumping-light multiplexer 114 is preferable for a port to be connected to the terminal portion 130. However, the terminal portion 130 is not limited to one that is connected to the reverse-direction-side signal port of the pumping-light multiplexer 114. For example, the pumping-light multiplexer 114 includes a plurality of pumping-light ports, and not all the port for pumping light are connected to the pumping laser diode. Therefore, a so-called dummy port may exist which is not connected to a pumping laser diode. In such a case, the redundant port may be connected possibly to the terminal portion 130 of the present embodiment. When a plurality of redundant ports exist, it is preferable to select one of the redundant ports which is the maximum in the intensity of the return light and connect the selected one to the configuration of the terminal portion 130. There is an application in which other instruments are connected to the reverse-direction-side signal port of the pumping-light multiplexer 114 as well, and in such a case, the port for pumping light, which is the maximum in the intensity of the return light, among the redundant ports is preferable for a port to which the terminal portion 130 is connected. Although FIG. 1 illustrates only one terminal portion 130, a plurality of terminal portions 130 may possibly exist in the optical fiber laser device 100, and in such a case, the present disclosure may be applied to at least one of the plurality of the terminal portions 130. Certainly, the present disclosure may be simultaneously applied to the plurality of the terminal portions 130.

As illustrated in FIG. 1, the terminal portion 130 of the optical fiber laser device 100 includes the return-light-attenuating module 140. In the example illustrated in FIG. 1, the terminal portion 130 includes only the return-light-attenuating module 140; however, as will be described hereafter in detail, the terminal portion 130 may include other components.

As illustrated in FIG. 1, the return-light-attenuating module 140 includes the thermal conversion unit 141 converting the return light output from the pumping-light multiplexer 114 to heat, a thermal conductor 142 disposed to contact the thermal conversion unit 141 and conducting heat emitted by the thermal conversion unit 141, and a first temperature measurement point 151 provided on the thermal conductor 142. The first temperature measurement point 151 is a position where temperature sensors such as a thermistor, thermocouple, and the like are disposed.

As will be explained hereafter with reference to a specific example, the thermal conversion unit 141 is means for converting an optical energy of the return light to a thermal energy. The thermal conductor 142 includes, for example, a metal plate, and the thermal conversion unit 141 is fixed on the thermal conductor 142 with a resin, etc. Therefore, a measured temperature at the first temperature measurement point 151 provided on the thermal conductor 142 reflects the heat generated by the thermal conversion unit 141 appropriately. The heat generated by the thermal conversion unit 141 reflects a thermal load which the optical fiber receives at the terminal portion 130. As a result, the measured temperature at the first temperature measurement point 151 provided on the thermal conductor 142 is supposed to reflect the thermal load which the optical fiber receives at the terminal portion 130.

The temperature-monitoring device 150 converts an electric signal such as a voltage, etc. obtained from a temperature sensor such as a thermistor, thermocouple, and the like provided at the first temperature measurement point 151 into information on temperature at the first temperature measurement point 151.

In the optical fiber laser device 100, it is preferable to dispose temperature sensors such as a thermistor, thermocouple, and the like at a second temperature measurement point 152 which may be regarded as a reference point for measuring a temperature in the optical fiber laser device 100. The measured temperature at the first temperature measurement point 151 provided on the thermal conductor 142 reflects the thermal load which the optical fiber at the terminal portion 130 receives, however, the measured temperature may be affected sometimes by a thermal external disturbance other than the heat generated by the optical fiber at the terminal portion 130. Therefore, a situation may occur that the thermal load which the optical fiber receives at the terminal portion 130 may not correctly be reflected to measured temperature at the first temperature measurement point 151 due to the thermal external disturbance other than the heat generated by the optical fiber at the terminal portion 130.

To address this, temperature sensors such as a thermistor, thermocouple, and the like are disposed at the second temperature measurement point 152 which may be regarded as a reference point for measuring a temperature in the optical fiber laser device 100 so that a temperature difference between a temperature at the first temperature measurement point 151 and a temperature at the second temperature measurement point 152 is measured by the temperature-monitoring device 150. For example, the second temperature measurement point 152 may be a predetermined point of a heatsink for cooling other heat-generating components such as pumping laser diodes 115a and 115b, the optical amplifying fiber 111, and the like. The thermal conductor 142 conducting the heat of the thermal conversion unit 141 may be contacted to the heatsink.

By the above-described configuration, it is possible to restrain an external disturbance by other heat-generating components such as the pumping laser diodes 115a and 115b, the optical amplifying fiber 111, and the like by subtracting the temperature at the second temperature measurement point 152 from the temperature at the first temperature measurement point 151, and thus measure the thermal load which the optical fiber receives at the terminal portion 130 more accurately.

Information, obtained by the temperature-monitoring device 150, on the temperature at the first temperature measurement point 151, or on the temperature difference between the temperature at the first temperature measurement point 151 and the temperature at the second temperature measurement point 152 is transmitted to the control unit 160. The temperature-monitoring device 150 may be configured as one of the functions of the control unit 160. The control unit 160 may not be a special control unit for carrying out the present disclosure but may be a common general-purpose controller.

For example, the control unit 160 includes a central processing unit (CPU), a read only memory (ROM), a random access memory (RAM), an interface (I/F), and a bus connecting them mutually. The CPU controls respective portions based on a program and data stored in the ROM. The ROM is a non-volatile semiconductor memory device and stores the program and the data. The RAM is a volatile semiconductor memory device operating as a working area when carrying out the program by the CPU. The I/F is configured by, for example, a digital-analog converter (DAC) and an analog-digital converter (ADC), etc. The I/F converts digital data supplied by the CPU to an analogue signal and supplies the converted analogue signal to each controlled site such as the pumping laser diodes 115$a$ and 115$b$, and converts an analog electric current signal from the thermistor, thermocouple, and the like to a digital signal. The bus is a signal line group that connects CPU, ROM, RAM, and I/F mutually and enables data transaction among them. The control unit 160 is not limited to a CPU or the like but may be a digital signal processor (DSP) or a device that utilizes an analogue control method instead of a digital control method.

The control unit 160 compares a temperature obtained by the temperature-monitoring device 150 at the first temperature measurement point 151 with a predetermined threshold to supply a control signal for decreasing, or stopping, an output to the pumping laser diodes 115$a$ and 115$b$ when the temperature at the first temperature measurement point 151 is equal to or more than the predetermined threshold. It is preferable that the threshold be set at a value with a predetermined margin, for example, to an experimentally obtained temperature regarded to generate a thermal damage to an optical fiber such as a fiber fuse. As described in the above, it is preferable that the control unit 160 compares the temperature difference between the temperature at the first temperature measurement point 151 and the temperature at the second temperature measurement point 152 with the predetermined threshold since more accurate measurement of thermal load which the optical fiber receives at the terminal portion 130 is possible.

The pumping laser diodes 115$a$ and 115$b$ receiving the control signal for decreasing or stopping the output decrease or stop the output of the pumping light introduced to the laser oscillator 110. Then, the output laser light L output by the optical fiber laser device 100 is decreased or stopped, and the return light R introduced to the optical outputting fiber 120 via the irradiation head 121 is also decreased or stopped. As a result, a load which the optical fiber receives at the terminal portion 130 is restrained, and thus, the optical fiber laser device 100 achieves high durability and high output capability.

Figure 2:
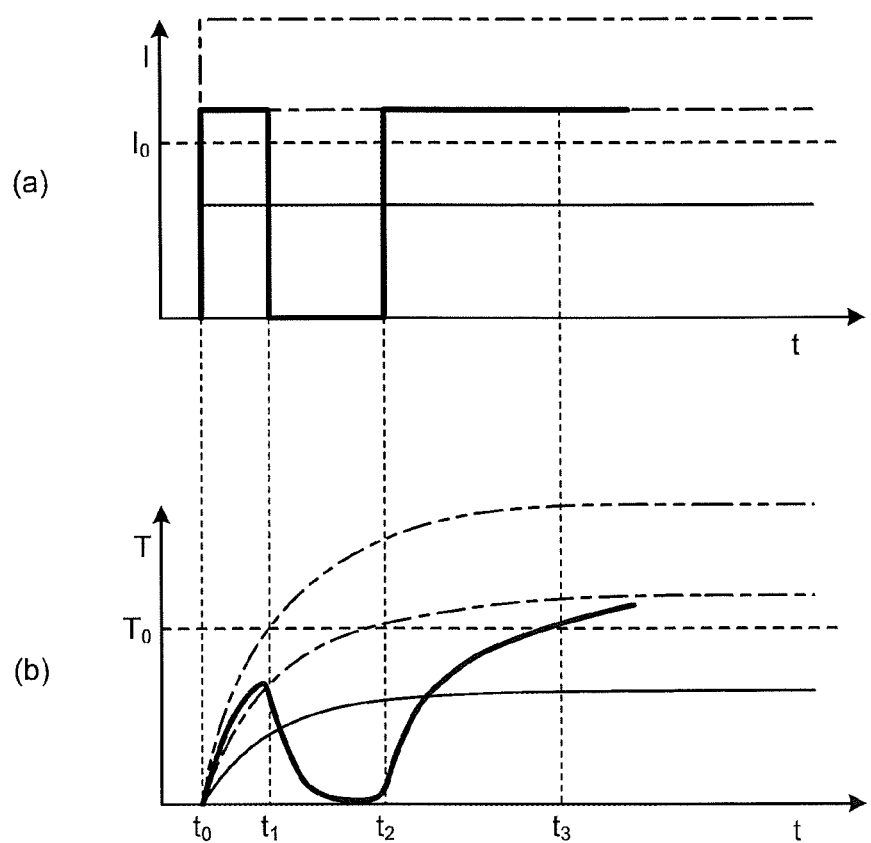
FIG. 2 is a graph illustrating an example of determination conducted at a control unit using a threshold relevant to temperature.
Figure 3:
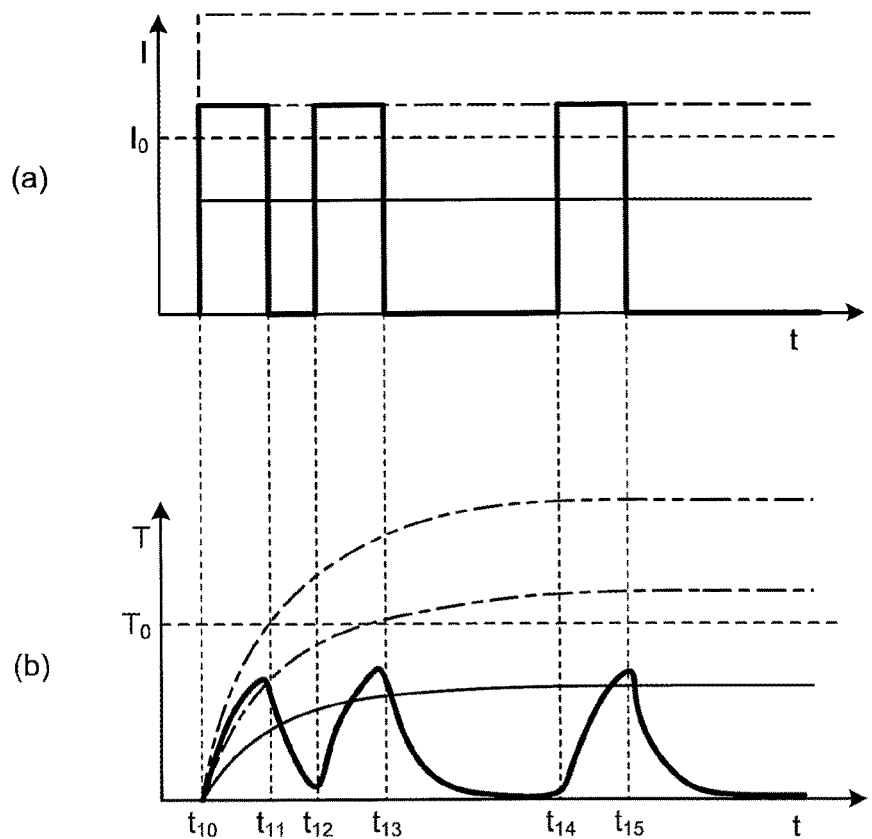
FIG. 3 is a graph illustrating an example of determination conducted at the control unit using the threshold relevant to temperature.

FIGS. 2 and 3 are graphs illustrating examples of determinations, conducted by the control unit 160, using a threshold relating to a temperature. For comparison, FIGS. 2 and 3 also include graphs illustrating examples of determinations using a threshold related to the intensity of the return light. The determinations using a threshold related to the intensity of the return light refers to a method of determination in which, for example, the intensity of the return light is detected by a light-receiving element, etc. and a threshold relative to the intensity of the received light is used. In FIGS. 2 and 3, an upper graph (a) illustrates an example of determination using the threshold related to the intensity of the return light and a lower graph (b) illustrates an example of determination using the threshold related to temperature. In the respective drawings, the upper graph (a) and the lower graph (b) are graphs sharing a time axis t (horizontal axis) and relating to identical time-variation of the return light. In the respective drawings, a vertical axis I of the upper graph (a) indicates the intensity of the return light, and a vertical axis T of the lower graph (b) indicates the measured temperature.

As illustrated in FIG. 2, the intensity of the return light varies steeply relative to time progression, and on the other hand, the measured temperature varies relatively modestly relative to time progression. The intensity of the return light corresponds to an increasing degree of the measured temperature and a temperature when being saturated. Therefore, even if the intensity of the return light reaches equal to or more than the value $I_0$ as seen between time $t_0$ and time $t_1$, and even if the increasing degree of the measured temperature is high, the measured temperature does not reach threshold $T_0$ if the time length is short. In such a case, since the load which the optical fiber receives at the terminal portion 130 is not so great that damage is generated on the optical fiber from a view point of time history, it is not necessary to restrain the output laser light L output by the optical fiber laser device 100.

On the other hand, as seen between time $t_2$ and time $t_3$, when a time length in which a state of the higher intensity of the return light is long, the measured temperature is supposed to reach equal to or more than threshold $T_0$. In this case, the control unit 160 is supposed to conduct, at the time $t_3$, a controlling action for restraining the output laser light L output by the optical fiber laser device 100.

In another example illustrated in FIG. 3, the time length in which the intensity of the return light reaches equal to or more than the value $I_0$ between time $t_{10}$ and time $t_{11}$, between time $t_{12}$ and time $t_{13}$, and between time $t_{14}$ and time $t_{15}$, and thus, a situation in which the intensity of the return light is high is repeated intermittently. In such a case, the measured temperature decreases sufficiently during the time length in which the intensity of the return light is low such as between time $t_{11}$ and time $t_{12}$, between time $t_{13}$ and time $t_{14}$, and the like. In such a case, since the load which the optical fiber receives at the terminal portion 130 is not great, it is not necessary to restrain the output laser light L output by the optical fiber laser device 100.

As understood from the above-described examples, the optical fiber laser device 100 determines the amount of load which the optical fiber receives at the terminal portion 130 in consideration of not only the intensity of the return light but also a time period during which a state continues in which the return light is high power. Hereby, the determination as to whether the output laser L output by the optical fiber laser device 100 is restrained is optimized, and thus, restraining unnecessary output laser light L, that is, decrease in output or stoppage operation for unnecessary output laser L becomes fewer. As a result, of the optical fiber laser device 100 achieves high durability and high output capability.

Hereafter, a configuration example of the return-light-attenuating module 140 is explained. In the embodiment of the present disclosure, various configuration examples may be considered in the configuration of the return-light-attenuating module 140. Configuration examples explained below are illustrative of the return-light-attenuating module 140, and each configuration example may replace the return-light-attenuating module 140 in the optical fiber laser device 100. Therefore, only portions corresponding to the return-light-attenuating module 140 are described in the below-explained configuration examples, and other portions may be regarded as identical to those of the optical fiber laser device 100.

First Configuration Example of Return-Light-Attenuating Module

Figure 4:
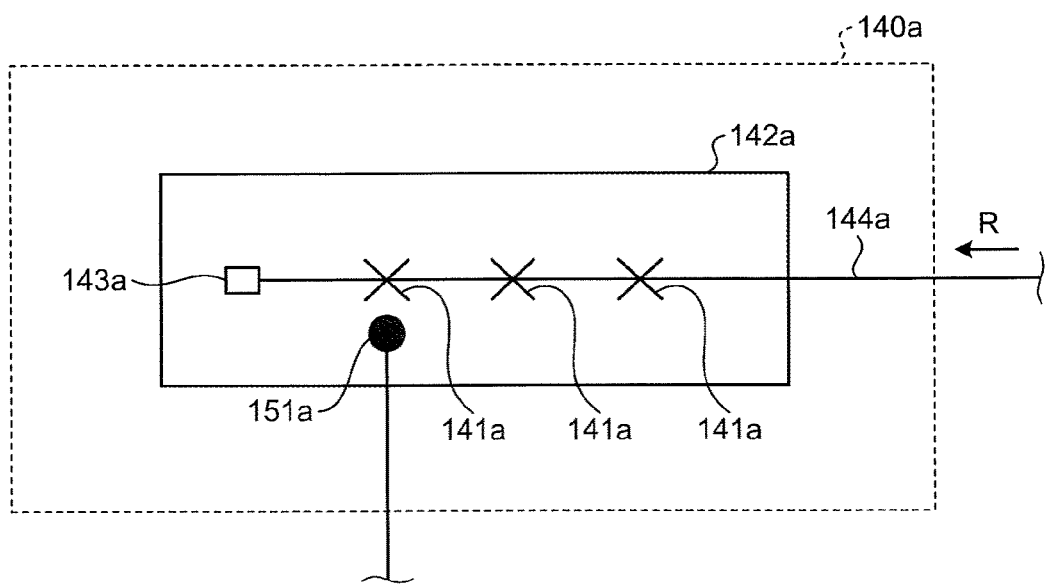
FIG. 4 schematically illustrates a configuration of a return-light-attenuating module according to a first configuration example.
Figure 5:
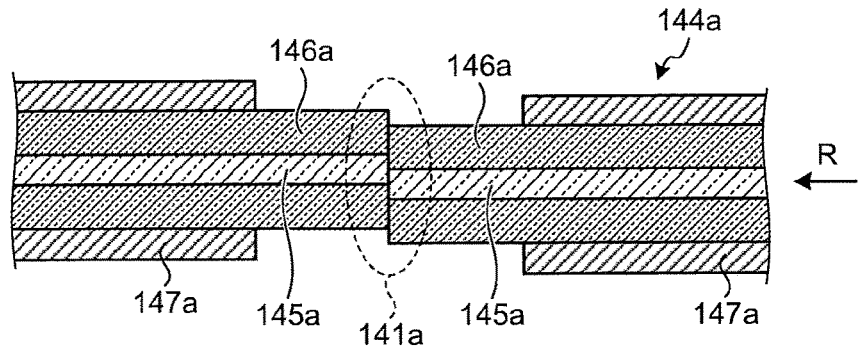
FIG. 5 illustrates an axis-offset-fusion-splice of optical fibers used in a first configuration example.

FIG. 4 schematically illustrates a configuration of a return-light-attenuating module 140a, and FIG. 5 illustrates an axis-offset-fusion-splice portion 141a of an optical fiber used in the first configuration example. As illustrated in FIG. 4, the return-light-attenuating module 140a according to the first configuration example includes an optical fiber 144a which has been subjected to an axis-offset-fusion-splice 141a, and a thermal conductor 142a conducting a heat generated by the axis-offset-fusion-splice 141a.

The return-light-attenuating module 140a according to the first configuration example uses the axis-offset-fusion-splice portion 141a of the optical fiber 144a as a thermal conversion unit converting the return light R having been propagated to the optical fiber 144a at the terminal portion to heat. In the return-light-attenuating module 140a, the axis-offset-fusion-splice portion 141a of the optical fiber 144a is disposed at a thermal conductor 142a, and the optical fiber 144a is fixed on the thermal conductor 142a with a fixing member such as, for example, a silicone-based resin or the like. It is preferable to form a groove on a surface of the thermal conductor 142a and to contain the optical fiber 144a in the groove.

A first temperature measurement point 151a is set at a position suitable for measuring a heat generated by the axis-offset-fusion-splice portion 141a of the optical fiber 144a via the thermal conductor 142a. That is, for example, it is preferable that the first temperature measurement point 151a be disposed in the vicinity of the axis-offset-fusion-splice portion 141a. The first temperature measurement point 151a is configured so that temperature sensors such as a thermistor, thermocouple, and the like are disposed to be capable of measuring a temperature at the first temperature measurement point 151a.

A sealing portion 143a provided at an end portion of the optical fiber 144a is a composing part for sealing an end of the optical fiber 144a.

FIG. 5 is a cross-sectional view, of the optical fiber 144a, in which a periphery of the axis-offset-fusion-splice portion 141a indicated as "X" in FIG. 4 is expanded. As illustrated in FIG. 5, the optical fiber 144a is fusion-spliced at the axis-offset-fusion-splice portion 141a so that center axes of core 145a are offset in a radial direction with each other. Therefore, the return light R propagated through the optical fiber 144a is subjected to a huge loss at the axis-offset-fusion-splice portion 141a. That is, the return light R loses energy at the axis-offset-fusion-splice portion 141a, and the lost energy is converted to a leakage light and heat. The heat is conducted to the thermal conductor 142a via the fixing member, and the leakage light reaches the thermal conductor 142a via the fixing member and is converted to heat there. A loss amount at the axis-offset-fusion-splice portion 141a may be adjusted with the number of position where the axis-offset-fusion-splice portion 141a is provided and an axis-offset amount. Although, a coating 147a is provided around a cladding 146a at a portion separated from the axis-offset-fusion-splice portion 141a in the optical fiber 144a illustrated in FIG. 5, the coating 147a may be omitted. It is possible to make the coating 147a be removed, in consideration of affection by heat, at a periphery of the axis-offset-fusion-splice portion 141a or the entire of the optical fiber 144a.

The return-light-attenuating module 140a configured as described above is a configuration example which may replace the return-light-attenuating module 140 in the optical fiber laser device 100.

Second Configuration Example of Return-Light-Attenuating Module

Figure 6:
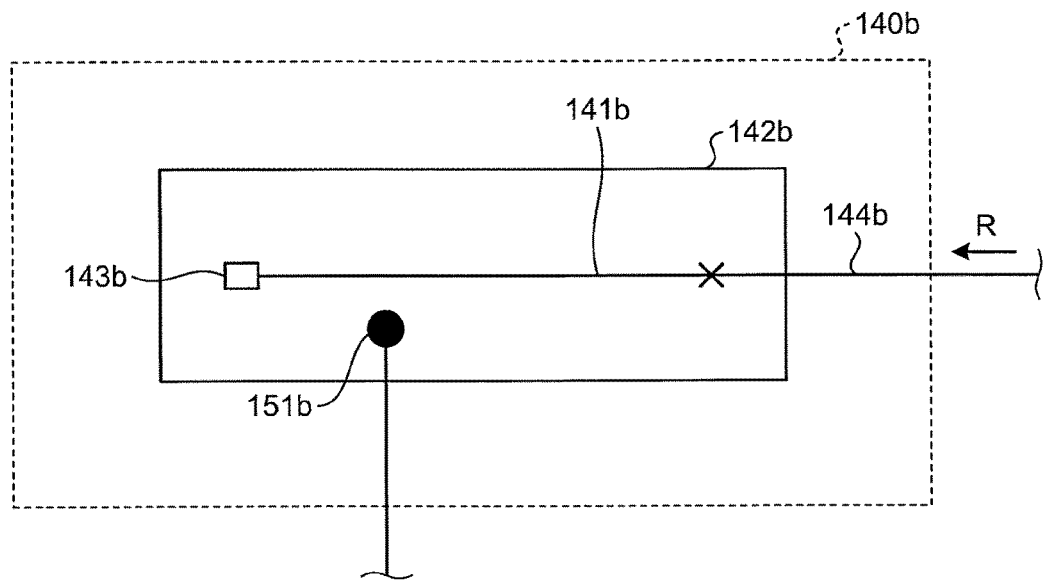
FIG. 6 schematically illustrates a configuration of a return-light-attenuating module according to a second configuration example.
Figure 7:
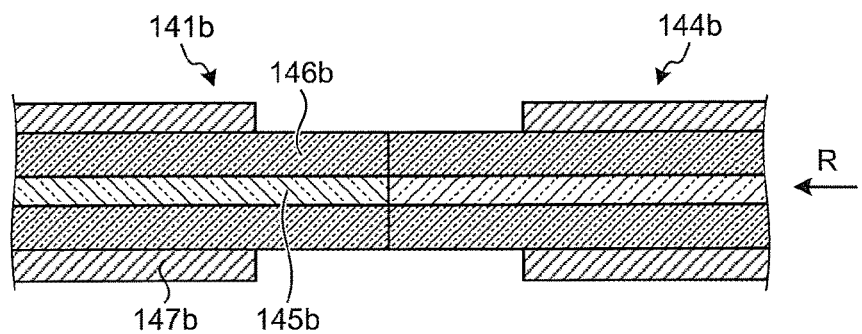
FIG. 7 illustrates a high loss optical fiber used in the second configuration example.

FIG. 6 schematically illustrates a configuration a return-light-attenuating module 140b according to a second configuration example, and FIG. 7 illustrates a high-loss optical fiber 141b used in the second configuration example. As illustrated in FIG. 6, the return-light-attenuating module 140b according to the second configuration example includes an optical fiber 144b provided with the high-loss optical fiber 141b and a thermal conductor 142b conducting a heat generated by the high-loss optical fiber 141b.

The return-light-attenuating module 140b according to the second configuration example uses the high-loss optical fiber 141b as a thermal conversion unit converting the return light R having been propagated to the optical fiber 144b at the terminal portion to heat. In the return-light-attenuating module 140b, the high-loss optical fiber 141b to which the optical fiber 144b is fusion-spliced is disposed at the thermal conductor 142b, and the optical fiber 144b and the high-loss optical fiber 141b are fixed on the thermal conductor 142b with, for example, a silicone-based resin or the like.

A first temperature measurement point 151b is set at a position appropriate for measuring a heat generated by the high-loss optical fiber 141b via the thermal conductor 142b. That is, for example, it is preferable to dispose the first temperature measurement point 151b in the vicinity of a portion of the high-loss optical fiber 141b. The first temperature measurement point 151b is configured so that temperature sensors such as a thermistor, thermocouple, and the like are disposed to be capable of measuring a temperature at the first temperature measurement point 151b.

A sealing portion 143b provided at an end portion of the high-loss optical fiber 141b is a composing part for sealing an end of the high-loss optical fiber 141b.

FIG. 7 is a cross-sectional view of a fusion-spliced portion, expanded in FIG. 6 and indicated as "X", of the optical fiber 144b and the high-loss optical fiber 141b. As illustrated in FIG. 7, a core 145b of the high-loss optical fiber 141b is formed of a material that is different from that of the core of the optical fiber 144b. For example, the core 145b of the high-loss optical fiber 141b is doped with a metallic impurity such as cobalt or the like. A cladding 146b of the high-loss optical fiber 141b may be identical to that of a cladding of the optical fiber 144b.

By configuring in this manner, the return light R propagated through the high-loss optical fiber 141b is subjected to a huge loss. That is, the return light R loses energy at the high-loss optical fiber 141b, and the lost energy is converted to a heat mainly. A loss amount at the high-loss optical fiber 141b may be adjusted with a length of the high-loss optical fiber 141b and the concentration of the metallic impurity. Although a coating 147b is provided around the cladding 146b in the high-loss optical fiber 141b illustrated in FIG. 7, the coating 147b is not always necessary. It is possible to make the coating 147b be in a removed state, in consideration of affection by heat, at a periphery or the entire of the high-loss optical fiber 141b.

The return-light-attenuating module 140b configured as described above is a configuration example which may replace the return-light-attenuating module 140 in the optical fiber laser device 100. The return-light-attenuating module 140b described above may be configured such that the axis-offset-fusion-splice portion 141a of the first configuration example is provided to the high-loss optical fiber 141b.

Third Configuration Example of Return-Light-Attenuating Module

Figure 8:
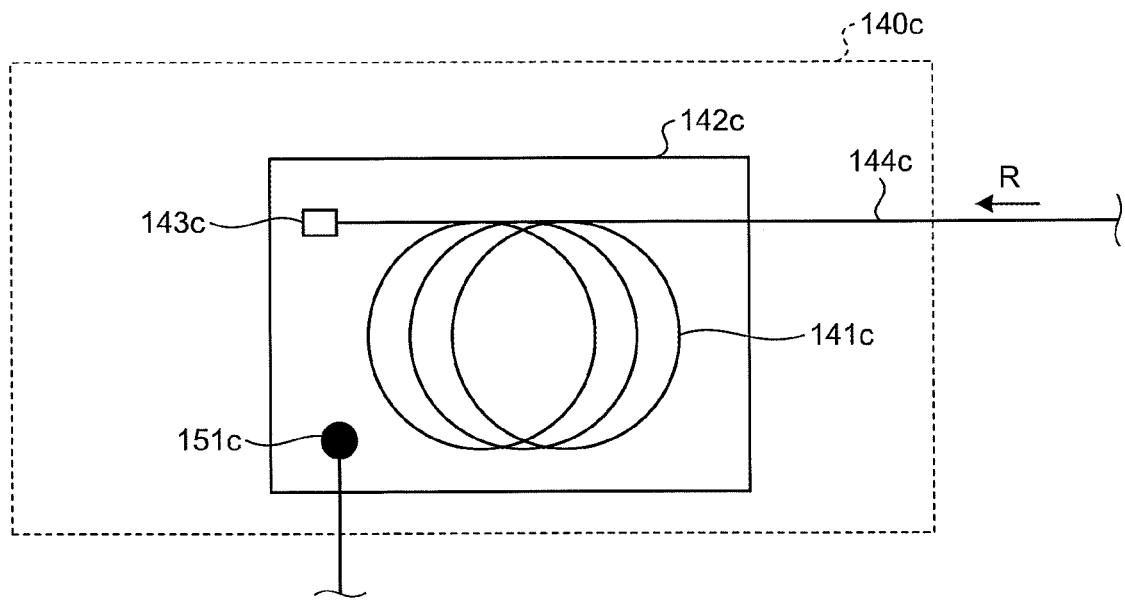
FIG. 8 schematically illustrates a configuration of a return-light-attenuating module according to a third configuration example.

FIG. 8 schematically illustrates a configuration of a return-light-attenuating module 140c according to a third configuration example. As illustrated in FIG. 8, the return-light-attenuating module 140c according to the third configuration example includes an optical fiber 144c to which a bending portion 141c is intentionally provided, and a thermal conductor 142c conducting a heat generated by the bending portion 141c of the optical fiber 144c.

The return-light-attenuating module 140c according to the third configuration example uses a bending loss of the optical fiber 144c as a thermal conversion unit converting the return light R propagated to the optical fiber 144c, which is a terminal portion, into heat. The bending loss is a phenomenon in which a loss of the return light R propagating through the coiled optical fiber 144c is higher than a loss of the return light R propagating through an optical fiber 144c kept in a straight manner. Therefore, the return light R propagating through the optical fiber 144c intentionally provided with the bending portion 141c is supposed to be subjected to a huge loss. The loss amount may be adjusted with a bending radius and a length of the bending portion 141c.

In the return-light-attenuating module 140c, the bending portion 141c is disposed to the thermal conductor 142c, and the optical fiber 144c provided with the bending portion 141c is fixed on the thermal conductor 142c with, for example, a silicone-based resin or the like.

A first temperature measurement point 151c is set at a position appropriate for measuring a heat generated by the bending portion 141c of the optical fiber 144c via the thermal conductor 142c. That is, for example, it is preferable to dispose the first temperature measurement point 151c in the vicinity of the bending portion 141c of the optical fiber 144c. The first temperature measurement point 151c is configured such that temperature sensors such as a thermistor, thermocouple, and the like are disposed to be capable of measuring a temperature at the first temperature measurement point 151c.

A sealing portion 143c provided at an end portion of the optical fiber 144c is a composing part for sealing an end of the optical fiber 144c.

The return-light-attenuating module 140c configured as described above is a configuration example which may replace the return-light-attenuating module 140 in the optical fiber laser device 100. The return-light-attenuating module 140c described above may be configured to provide the bending portion 141c to the high-loss optical fiber 141b of the second configuration example and provide the axis-offset-fusion-splice portion 141a of the first configuration example to the bending portion 141c.

Fourth Configuration Example of Return-Light-Attenuating Module

Figure 9:
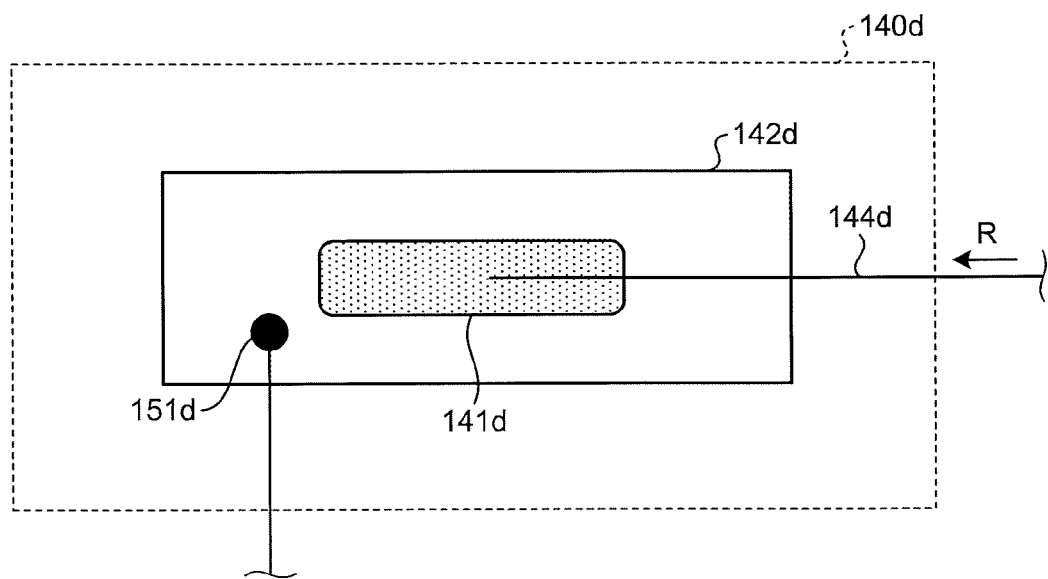
FIG. 9 schematically illustrates a configuration of a return-light-attenuating module according to a fourth configuration example.
Figure 10:
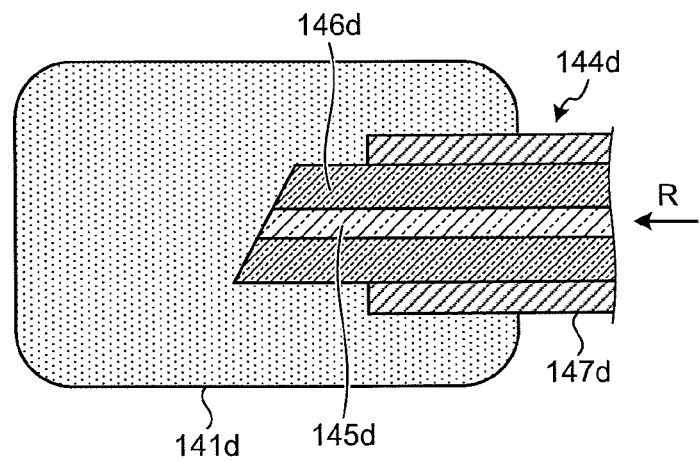
FIG. 10 is a cross-sectional view schematically illustrating a configuration of a return-light-attenuating module used in the fourth configuration example.

FIG. 9 schematically illustrates a configuration of a return-light-attenuating module 140d according to a fourth configuration example, and FIG. 10 is a cross-sectional view schematically illustrating a configuration of an end of an optical fiber 144d used in the fourth configuration example. As illustrated in FIG. 9, the return-light-attenuating module 140d according to the fourth configuration example includes a sealing member 141d sealing an end of the optical fiber 144d and a thermal conductor 142c conducting a heat generated by the sealing member 141d.

The return-light-attenuating module 140d according to the fourth configuration example uses the sealing member 141d sealing the end of the optical fiber 144d as a thermal conversion unit for converting the return light R propagating to the optical fiber 144d, which is a terminal portion, into heat. The sealing member 141d is, for example, a resin or the like and has characteristics of scattering or absorbing the return light R emitted from an endmost portion of the optical fiber 144d. The return light R scattered or absorbed by the sealing member 141d generates heat at the sealing member 141d directly or reaches a thermal conductor 142d and generates heat indirectly.

In the return-light-attenuating module 140d, the sealing member 141d sealing the end of the optical fiber 144d is provided to the thermal conductor 142d, and the optical fiber 144d is fixed on the thermal conductor 142d with, for example, silicone-based resin or the like.

A first temperature measurement point 151d is set at a position appropriate for measuring heat generated by the sealing member 141d via the thermal conductor 142d. That is, it is preferable that, for example, the first temperature measurement point 151d be disposed in the vicinity of the sealing member 141d. The first temperature measurement point 151d is configured so that temperature sensors such as a thermistor, thermocouple, and the like are disposed to be capable of measuring a temperature at the first temperature measurement point 151d.

FIG. 10 is an expanded view of the end, sealed by the sealing member 141d, of the optical fiber 144d. As illustrated in FIG. 10, a core 145d and a cladding 146d at the end of the optical fiber 144d are cut obliquely relative to an optical axis of the optical fiber 144d. It is hereby preferable since an amount of light, among the return lights R, reflected at the end of the optical fiber 144d and returning to the core decreases. When an intensity of the return light R is low, the core 145d and the cladding 146d at the end of the optical fiber 144d may be in a state of being cut vertically relative to the optical axis of the optical fiber 144d.

Although a coating 147d is provided around the cladding 146d in the optical fiber 144d illustrated in FIG. 10, the coating 147d is not always necessary. It is possible to remove the coating 147d of the optical fiber 144d at the end portion or the entire coating 147d in consideration of affection by heat.

The return-light-attenuating module 140d configured as described above is a configuration example which may replace the return-light-attenuating module 140 in the optical fiber laser device 100. The configuration of sealing the end of the optical fiber 144d of the return-light-attenuating module 140d with the sealing member 141d may be applied to the sealing portions 143a, 143b, and 143c in the above-described first to third configuration examples.

Fifth Configuration Example of Return-Light-Attenuating Module

Figure 11:
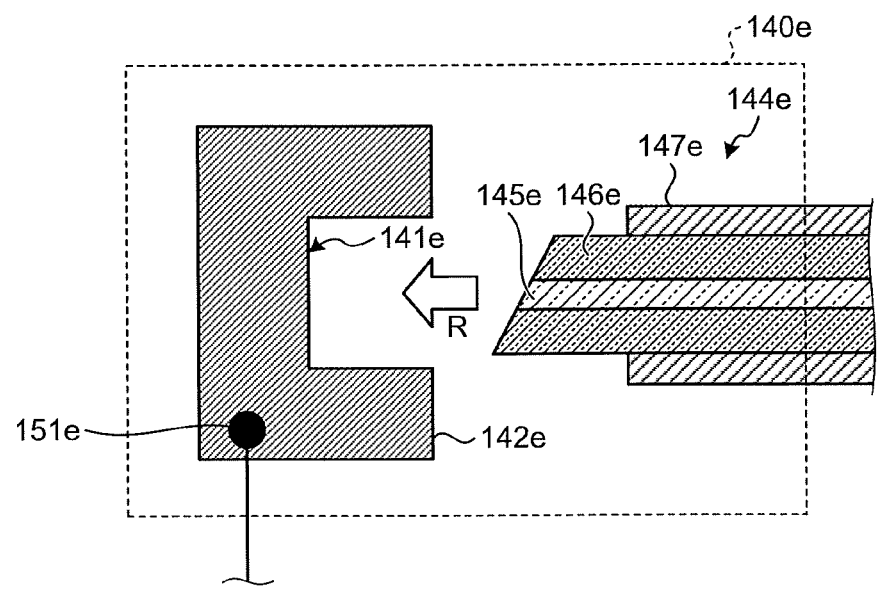
FIG. 11 schematically illustrates a configuration of a return-light-attenuating module according to a fifth configuration example.

FIG. 11 schematically illustrates a configuration of a return-light-attenuating module 140e according to a fifth configuration example. As illustrated in FIG. 11, the return-light-attenuating module 140e according to the fifth configuration example includes an optical fiber 144e and an irradiation surface 141*e*, of a thermal conductor 142*e*, to which the return light R emitted from the end of the optical fiber 144*e* is irradiated.

The return-light-attenuating module 140*e* according to the fifth configuration example uses the irradiation surface 141*e* on the thermal conductor 142*e* as a thermal conversion unit converting the return light R propagating to the optical fiber 144*e*, which is a terminal portion, into a heat. The irradiation surface 141*e* on the thermal conductor 142*e* is a surface-treated metal surface to absorb the emitted ray and generate heat, and has a function of converting the return light R propagating to the optical fiber 144*e* to a heat. That is, the heat emitted by the irradiation surface 141*e* is one reflecting an intensity of the return light R including a time-history-based influence as well.

A first temperature measurement point 151*e* is set at a position appropriate for measuring a heat emitted by the irradiation surface 141*e* via a thermal conductor 142*e*. That is, it is preferable that for example, the first temperature measurement point 151*e* be disposed in the vicinity of the irradiation surface 141*e*. The first temperature measurement point 151*e* is configured so that temperature sensors such as a thermistor, thermocouple, and the like are disposed to be capable of measuring a temperature at the first temperature measurement point 151*e*.

As illustrated in FIG. 11, a core 145*e* and a cladding 146*e* at an end of the optical fiber 144*e* are cut obliquely relative to an optical axis of the optical fiber 144*e*. It is hereby preferable since an amount of the return light R reflected at the end of the optical fiber 144*e* decreases. When an intensity of the return light R is low, the core 145*e* and the cladding 146*e* at the end of the optical fiber 144*e* may be cut vertically relative to the optical axis of the optical fiber 144*e*.

Although a coating 147*e* is provided around the cladding 146*e* in the optical fiber 144*e* illustrated in FIG. 11, the coating 147*e* may not be necessary. It is possible to remove the coating 147*e* at a periphery or the entire of the optical fiber 144*e* in consideration of affection by heat.

The return-light-attenuating module 140*e* configured as described above is a configuration example which may replace the return-light-attenuating module 140 in the optical fiber laser device 100.

Configuration Example of Terminal Portion

As described above, the terminal portion 130 of the optical fiber laser device 100 illustrated in FIG. 1 provided with only the return-light-attenuating module 140 may be configured to include other components. Herein, a configuration example of the terminal portion 130 including configurations other than the return-light-attenuating module 140 will be explained. Configuration examples explained below are illustrative of the terminal portion 130, and each configuration example may replace the terminal portion 130 in the optical fiber laser device 100. Therefore, only portions corresponding to the terminal portion 130 are described in the configuration examples explained below, and other configurations may be regarded as being identical to those of the optical fiber laser device 100.

The configuration example for the terminal portion described hereafter includes the return-light-attenuating module 140 as well. As described above, this return-light-attenuating module 140 may be replaced with the return-light-attenuating modules 140*a*, 140*b*, 140*c*, 140*d*, and 140*e* according to the first to fifth configuration examples. Although explanation of the configuration of the return-light-attenuating module 140 omitted below may be regarded as configurations of those of the return-light-attenuating modules 140*a*, 140*b*, 140*c*, 140*d*, and 140*e* according to the above-described first to fifth configuration examples.

Configuration Example 1 of Terminal Portion

Figure 12:
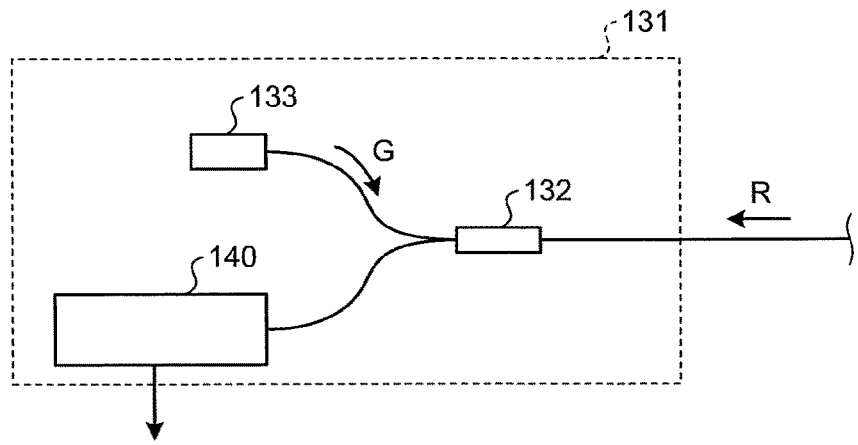
FIG. 12 illustrates a schematic configuration of a terminal portion according to a configuration example 1.

FIG. 12 illustrates a schematic configuration of a terminal portion 131 according to a configuration example 1. As illustrated in FIG. 12, the terminal portion 131 according to the configuration example 1 is configured to include a wavelength division multiplex optical multiplexer/demultiplexer 132, a visible-light-emitting portion 133, and the return-light-attenuating module 140.

The visible-light-emitting portion 133 is a laser diode emitting, for example, a red-colored laser light. As described above, the laser light output by the optical fiber laser device 100 is of a wavelength of 1070 nm and not a visible light range of laser light. Therefore, it is difficult to confirm a position to which the output laser light is emitted. The visible-light-emitting portion 133 is a light source for outputting a guide light G for confirming the position at which the output laser light is irradiated.

The wavelength division multiplex optical multiplexer/demultiplexer 132 is an instrument for conducting wavelength-selective optical multiplexing/demultiplexing among an optical fiber through which the return light R is propagated, an optical fiber connected to the visible-light-emitting portion 133, and an optical fiber connected to the return-light-attenuating module 140. The wavelength division multiplex optical multiplexer/demultiplexer 132 has wavelength characteristics of transmitting the guide light G output by the visible-light-emitting portion 133 with low loss to the optical fiber through which the return light R is propagated. On the other hand, the wavelength division multiplex optical multiplexer/demultiplexer 132 has wavelength characteristics of transmitting the return light R with low loss to the optical fiber connected to the return-light-attenuating module 140. The wavelength division multiplex optical multiplexer/demultiplexer 132 has wavelength characteristics of attenuating the return light R to a large degree when transmitting the return light R to the optical fiber connected to the visible-light-emitting portion 133.

By the above-described configuration, the terminal portion 131 according to the configuration example 1 includes: the return-light-attenuating module 140 that attenuates the return light R propagating in at least the optical outputting fiber 120 in a reverse direction relative to the output laser light; and a visible-light-emitting portion 133 that outputs the guide light G for confirming the position to which the output laser light is irradiated.

Configuration Example 2 of Terminal Portion

Figure 13:
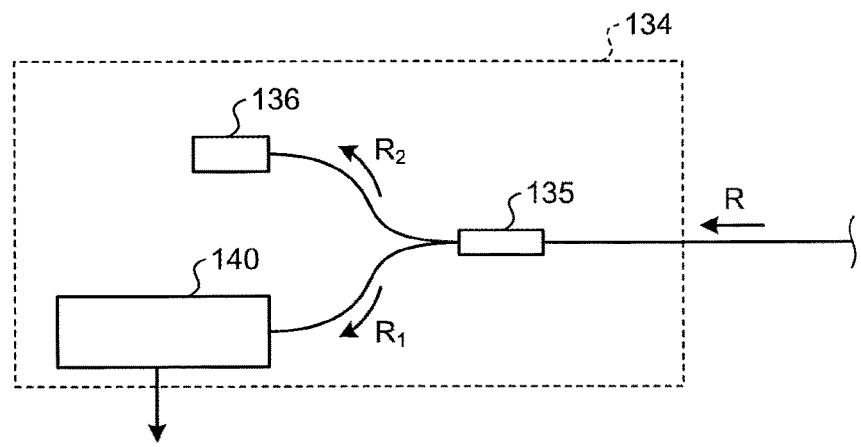
FIG. 13 illustrates a schematic configuration of a terminal portion according to a configuration example 2.

FIG. 13 illustrates a schematic configuration of a terminal portion 134 according to a configuration example 2. As illustrated in FIG. 13, the terminal portion 134 according to the configuration example 2 is configured to include an optical multiplexer/demultiplexer 135, an optical sensor 136, and the return-light-attenuating module 140.

The optical multiplexer/demultiplexer 135 is an instrument known as a Tap coupler and is an instrument conducting, while adjusting an optical power ratio, optical multiplexing/demultiplexing among the optical fiber through which the return light R is propagated, the optical fiber connected to the optical sensor 136, and the optical fiber connected to the return-light-attenuating module 140. The optical multiplexer/demultiplexer 135 splits the input return light R in return light R1 output to the return-light-attenuating module 140 and return light R2 output to the optical sensor 136. In this state, a splitting ratio of optical intensities between the return light R1 and the return light R2 is, for example, 1:100 to 1:100000. Because of the splitting ratio of these optical intensities, the optical multiplexer/demultiplexer 135 is called a 20 dB-to-50 dB coupler as well.

The optical sensor 136 is configured by, for example, a photodiode. The optical sensor 136 configured by the photodiode is capable of monitoring an optical intensity of the return light R2 input to the optical sensor 136 by converting the optical intensity of the input light to an electric signal with a photoelectric effect. The intensity of the return light R2 input to the optical sensor 136 as described above is one that the optical multiplexer/demultiplexer 135 splits the return light R at a predetermined splitting ratio. Therefore, the optical sensor 136 is capable of monitoring the optical intensity of the return light R propagating in the optical outputting fiber in the reverse direction relative to the output laser light.

A result of monitoring by the optical sensor 136 may be used in combination with monitoring of the measured temperature at the return-light-attenuating module 140. For example, a history of temperature measured by the return-light-attenuating module 140 and a history of optical intensity, monitored by the optical sensor 136, of the return light R monitored may be used to monitor a machined state at the outputting portion of the optical fiber laser device. The monitoring of the measured temperature at the return-light-attenuating module 140 and the monitoring of the return light R at the optical sensor 136 may be conducted respectively by an instrument externally connected to an output terminal derived to outside of the optical fiber laser device. When the optical intensity of the return light R which the optical sensor 136 monitors is equal to or less than a predetermined value, monitoring of the measured temperature at the return-light-attenuating module 140 and the monitoring of the return light R at the optical sensor 136 may be used to control to decrease or stop the output of the pumping light. When a fiber fuse occurs actually, the fiber fuse is prevented from occurring by using a phenomenon that an optical intensity of the return light R decreases when the fiber fuse occurs by any chance and by monitoring the measured temperature at the return-light-attenuating module 140, it is possible to stop a progress of the fiber fuse with an optical intensity of the return light R monitored by the optical sensor 136.

By the above-described configuration, the terminal portion 134 according to configuration example 2 includes: the return-light-attenuating module 140 that performs attenuation process to the return light R propagating in at least the optical outputting fiber 120 in a reverse direction relative to the output laser light; and the optical sensor 136 that monitors an optical intensity of the return light R propagating in the optical outputting fiber in a reverse direction relative to the output laser light.

Configuration Example 3 of Terminal Portion

Figure 14:
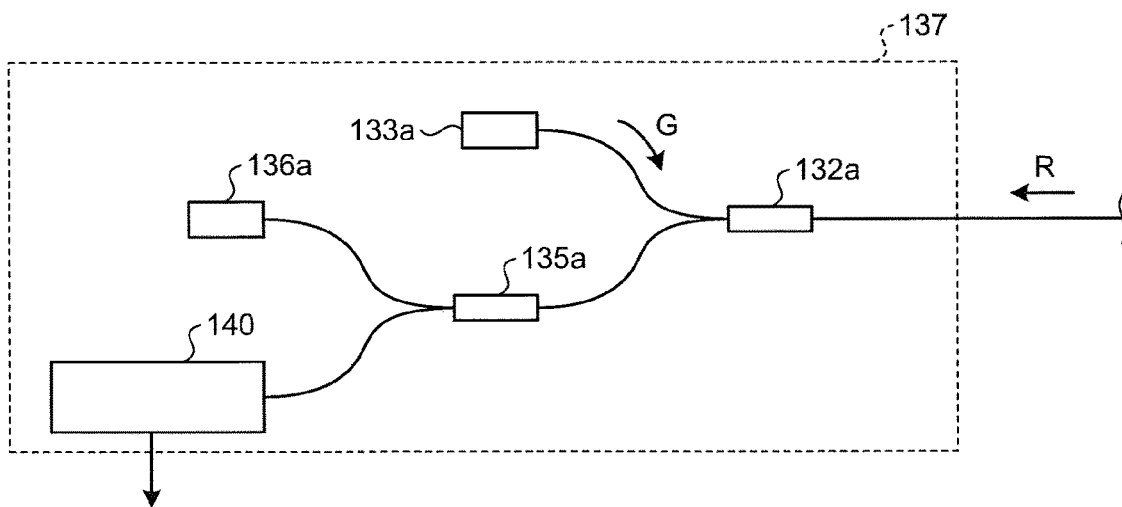
FIG. 14 illustrates a schematic configuration of a terminal portion according to a configuration example 3.

FIG. 14 illustrates a schematic configuration of a terminal portion 137 according to a configuration example 3. As illustrated in FIG. 4, the terminal portion 137 according to the configuration example 3 includes a wavelength division multiplex optical multiplexer/demultiplexer 132a, a visible-light-emitting portion 133a, an optical multiplexer/demultiplexer 135a, an optical sensor 136a, and the return-light-attenuating module 140. That is, the terminal portion 137 according to the configuration example 3 is a combination of the above-described terminal portion 131 according to the configuration example 3 and the configuration of the terminal portion 134 according to the configuration example 2. Therefore, many duplicated explanations are omitted in the present configuration example, and the omitted part of description may be regarded as similar to the configuration example 1 and the configuration example 2.

The visible-light-emitting portion 133a is a light source for outputting the guide light G for confirming a position to which the output laser light is irradiated. The wavelength division multiplex optical multiplexer/demultiplexer 132a is an instrument for conducting wavelength-selective optical multiplexing/demultiplexing among an optical fiber through which the return light R is propagated, an optical fiber connected to the visible-light-emitting portion 133a, and an optical fiber connected to the optical multiplexer/demultiplexer 135a.

The wavelength division multiplex optical multiplexer/demultiplexer 132a has wavelength characteristics of transmitting the guide light G output by the visible-light-emitting portion 133a with low loss to the optical fiber through which the return light R is propagated. On the other hand, the wavelength division multiplex optical multiplexer/demultiplexer 132a has wavelength characteristics of transmitting the return light R with low loss to the optical fiber connected to the optical multiplexer/demultiplexer 135a. The wavelength division multiplex optical multiplexer/demultiplexer 132a has wavelength characteristics of attenuating the return light R to a large degree when transmitting the return light R to the optical fiber connected to the visible-light-emitting portion 133a.

The optical multiplexer/demultiplexer 135a is an instrument known as a Tap coupler and is an instrument conducting, while adjusting an optical power ratio, optical multiplexing/demultiplexing among the optical fiber through which the return light R is propagated, the optical fiber connected to the optical sensor 136a, and the optical fiber connected to the return-light-attenuating module 140. The optical sensor 136a is capable of monitoring an optical intensity of the return light R propagating through the optical outputting fiber in a reverse direction relative to the output laser light.

By the above-described configuration, the terminal portion 137 according to the configuration example 3 includes: the return-light-attenuating module 140 that performs attenuation process to the return light R propagating in at least the optical outputting fiber 120 in a reverse direction relative to the output laser light; the visible-light-emitting portion 133a that outputs the guide light G for confirming a position to which the output laser light is irradiated; and the optical sensor 136a that monitors an optical intensity of the return light R propagating in the optical outputting fiber in a reverse direction of the output laser light.

Modified Examples of Embodiments

Hereafter, modified examples of the optical fiber laser devices according to the embodiments of the present disclosure will be explained. Modified examples explained below are illustrative of the optical fiber laser devices to which the present disclosure may be applied. The modified examples explained below include configurations, which are shared with the optical fiber laser device 100 of the first embodiment, such as the terminal portion 130, the return-light-attenuating module 140, and the like. Reference symbols being identical to those of the first embodiment are given to these configurations shared with the optical fiber laser device 100, and explanations thereof will be omitted.

Second Embodiment

Figure 15:
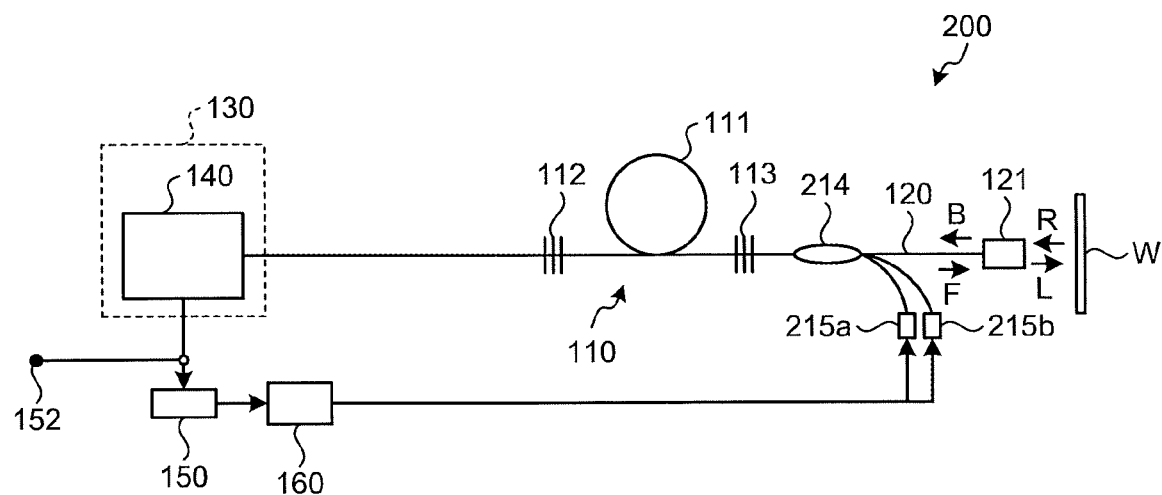
FIG. 15 illustrates a schematic configuration of an optical fiber laser device according to a second embodiment of the present disclosure.

FIG. 15 illustrates a schematic configuration of an optical fiber laser device 200 according to a second embodiment of the present disclosure. As illustrated in FIG. 15, the optical fiber laser device 200 according to the second embodiment of the present disclosure is an optical fiber laser type device that generates laser light by using the optical amplifying fiber 111 as an amplification medium in the laser oscillator 110.

As illustrated in FIG. 15, the optical fiber laser device 200 according to the second embodiment adopts a so-called backward-pumping configuration. That is, the optical fiber laser device 200 introduces pumping light backwardly relative to the laser oscillator 110. Therefore, the optical fiber laser device 200 includes, at the second light-reflecting unit 113, pumping light multiplexer 214 for multiplexing pumping light output by pumping laser diodes 215a and 215b and outputting the pumping light to the second light-reflecting unit 113.

The pumping-light multiplexer 214 is configured by, for example, a TFB similarly to the first embodiment. In the optical fiber laser device 200, a light-pumping port of the pumping-light multiplexer 214 is connected to the pumping laser diodes 215a and 215b and a reverse-direction-side signal port of the pumping-light multiplexer 214 is connected to the second light-reflecting unit 113. The forward-direction-side signal port of the pumping-light multiplexer 214 is connected to the optical outputting fiber 120. In the optical fiber laser device 200, the terminal portion 130 is connected to the first light-reflecting unit 112. When a redundant port exists in the light-pumping ports of the pumping-light multiplexer 214, the terminal portion 130 may be connected to the redundant port.

The optical fiber laser device 200 of the second embodiment configured as described above is capable of determining an amount of load which the optical fiber receives at the terminal portion 130 in consideration of not only the intensity of the return light but also a time length during which a high intensity state of the return light continues. The control unit 160 is capable of controlling outputs of the pumping laser diodes 215a and 215b based on the amount of load which the optical fiber receives at the terminal portion 130. Hereby, a determination as to whether the output laser light output by the optical fiber laser device 200 is restrained is optimized, and thus, unnecessary restrain of the output laser light decreases. As a result, the optical fiber laser device 200 achieves high durability and high output capability.

Third Embodiment

Figure 16:
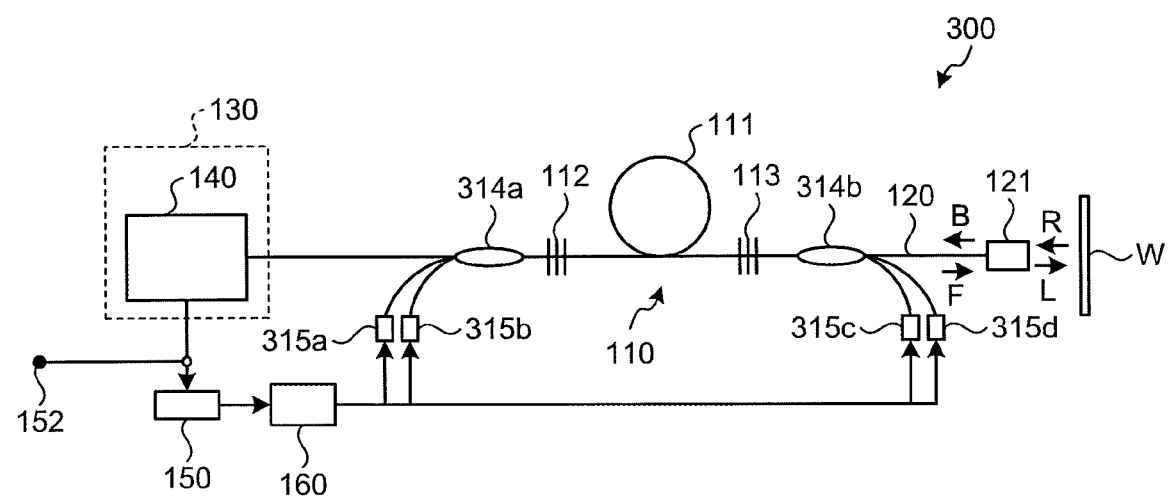
FIG. 16 illustrates a schematic configuration of an optical fiber laser device according to a third embodiment of the present disclosure.

FIG. 16 illustrates a schematic configuration of an optical fiber laser device 300 according to a third embodiment of the present disclosure. As illustrated in FIG. 16, the optical fiber laser device 300 according to the third embodiment of the present disclosure is an optical fiber laser type device that generates laser light by using the optical amplifying fiber 111 as an amplification medium in the laser oscillator 110.

As illustrated in FIG. 16, the optical fiber laser device 300 according to the third embodiment adopts a so-called bidirectional pumping type configuration. That is, in the optical fiber laser device 300, pumping lights are introduced forwardly and backwardly respectively relative to the laser oscillator 110. Therefore, the optical fiber laser device 300 includes, at an upstream to the first light-reflecting unit 112, a pumping-light multiplexer 314a multiplexing pumping lights output by pumping laser diodes 315c and 315d and outputting the pumping lights to the first light-reflecting unit 112, and at a downstream to the second light-reflecting unit 113, a pumping-light multiplexer 314b multiplexing pumping lights output by pumping laser diodes 315a and 315b and outputting the pumping lights to the second light-reflecting unit 113.

The pumping-light multiplexers 314a and 314b are configured by, for example, TFB similarly to the first embodiment. In the optical fiber laser device 300, a light-pumping port of the pumping-light multiplexer 314a is connected to the pumping laser diodes 315a and 315b, and the forward-direction-side signal port of the pumping-light multiplexer 314a is connected to the first light-reflecting unit 112. A light-pumping port of the pumping-light multiplexer 314b is connected to the pumping laser diodes 315c and 315d, and the reverse-direction-side signal port of the pumping-light multiplexer 314b is connected to the second light-reflecting unit 113. The forward-direction-side signal port of the pumping-light multiplexer 314b is connected to the optical outputting fiber 120.

The reverse-direction-side signal port of the pumping-light multiplexer 314a is connected to the terminal portion 130. However, similarly to the first embodiment, the terminal portion 130 is not limited to one connected to the reverse-direction-side signal port of the pumping-light multiplexer 314a. It may be configured that the terminal portion 130 is connected to a so-called redundant port of the pumping-light multiplexers 314a and 314b.

The optical fiber laser device 300 of the third embodiment as configured above is capable of determine the amount of load which the optical fiber receives at the terminal portion 130 in consideration of not only the intensity of the return light but also a time period during which a high intensity state of the return light continues. The control unit 160 is capable of controlling outputs of the pumping laser diodes 315a, 315b, 315c, and 315d based on the amount of load which the optical fiber receives at the terminal portion 130. Hereby, a determination as to whether the output laser light output by the optical fiber laser device 300 is restrained is optimized, and thus, unnecessary restrain of the output laser light decreases. As a result, the optical fiber laser device 300 achieves high durability and high output capability.

Fourth Embodiment

Figure 17:
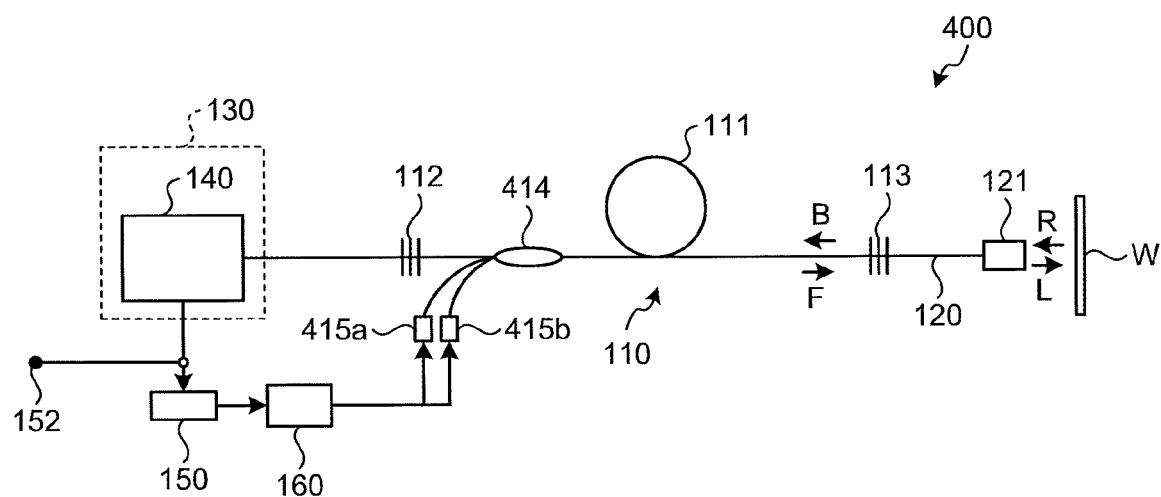
FIG. 17 illustrates a schematic configuration of an optical fiber laser device according to a fourth embodiment of the present disclosure.

FIG. 17 illustrates a schematic configuration of an optical fiber laser device 400 according to a fourth embodiment of the present disclosure. As illustrated in FIG. 17, the optical fiber laser device 400 according to the fourth embodiment of the present disclosure is an optical fiber laser type device that generates laser light by using the optical amplifying fiber 111 as an amplification medium in the laser oscillator 110.

As illustrated in FIG. 17, the optical fiber laser device 400 according to the fourth embodiment adopts a so-called forward-pumping type configuration. However, unlike the first embodiment, the optical fiber laser device 400 introduces pumping light from a downstream of the first light-reflecting unit 112 toward the optical amplifying fiber 111 forwardly. Provided between the first light-reflecting unit 112 and the optical amplifying fiber 111 is a pumping-light multiplexer 414 for multiplexing pumping lights output by pumping laser diodes 415a and 415b and outputting the pumping lights in a direction of the optical amplifying fiber 111.

The pumping-light multiplexer 414 is configured by, for example, TFB similarly to the first embodiment. In the optical fiber laser device 400, a light-pumping port of the pumping-light multiplexer 414 is connected to the pumping laser diodes 415a and 415b, and a forward-direction-side signal port of the pumping-light multiplexer 414 is connected to the optical amplifying fiber 111. A reverse-direction-side signal port of the pumping-light multiplexer 414 is connected to the first light-reflecting unit 112. In the optical fiber laser device 400, the terminal portion 130 is connected to the first light-reflecting unit 112. When a redundant port exists in the light-pumping ports of the pumping-light multiplexer 414, the terminal portion 130 may be connected to the redundant port.

The optical fiber laser device 400 of the fourth embodiment configured as described above is capable of determining an amount of load which the optical fiber receives at the terminal portion 130 in consideration of not only the intensity of the return light but also a time length during which a high intensity state of the return light continues. The control unit 160 is capable of controlling outputs of the pumping laser diodes 415a and 415b based on the amount of load which the optical fiber receives at the terminal portion 130. Hereby, a determination as to whether the output laser light output by the optical fiber laser device 400 is restrained is optimized, and thus, unnecessary restrain of the output laser light decreases. As a result, the optical fiber laser device 400 achieves high durability and high output capability.

Fifth Embodiment

Figure 18:
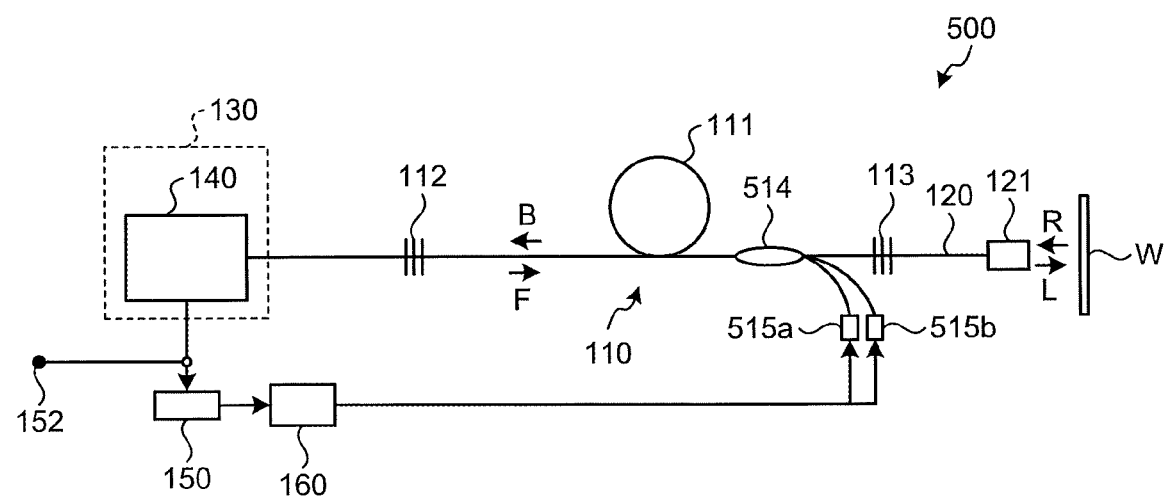
FIG. 18 illustrates a schematic configuration of an optical fiber laser device according to a fifth embodiment of the present disclosure.

FIG. 18 illustrates a schematic configuration of an optical fiber laser device 500 according to a fifth embodiment of the present disclosure. As illustrated in FIG. 18, the optical fiber laser device 500 according to the fifth embodiment of the present disclosure is an optical fiber laser type device that generates laser light by using the optical amplifying fiber 111 as an amplification medium in the laser oscillator 110.

As illustrated in FIG. 18, the optical fiber laser device 500 according to the fifth embodiment adopts a so-called backward-pumping configuration. However, unlike the second embodiment, the optical fiber laser device 500 introduces pumping light from an upstream of the second light-reflecting unit 113 toward the optical amplifying fiber 111 backwardly. Provided between the second light-reflecting unit 113 and the optical amplifying fiber 111 is a pumping-light multiplexer 514 for multiplexing pumping lights output by pumping laser diodes 515a and 515b and outputting the pumping lights in a direction of the optical amplifying fiber 111.

The pumping-light multiplexer 514 is configured by, for example, TFB similarly to the first embodiment. In the optical fiber laser device 500, a light-pumping port of the pumping-light multiplexer 514 is connected to the pumping laser diodes 515a and 515b, and a reverse-direction-side signal port of the pumping-light multiplexer 514 is connected to the optical amplifying fiber 111. A forward-direction-side signal port of the pumping-light multiplexer 514 is connected to the optical outputting fiber 120 via the second light-reflecting unit 113. In the optical fiber laser device 500, the terminal portion 130 is connected to the first light-reflecting unit 112. When a redundant port exists in the light-pumping ports of the pumping-light multiplexer 514, the terminal portion 130 may be connected to the redundant port.

The optical fiber laser device 500 of the fifth embodiment configured as described above is capable of determining an amount of load which the optical fiber receives at the terminal portion 130 in consideration of not only the intensity of the return light but also a time length during which a high intensity state of the return light continues. The control unit 160 is capable of controlling outputs of the pumping laser diodes 515a and 515b based on the amount of load which the optical fiber receives at the terminal portion 130. Hereby, a determination as to whether the output laser light output by the optical fiber laser device 500 is restrained is optimized, and thus, unnecessary restrain of the output laser light decreases. As a result, the optical fiber laser device 500 achieves high durability and high output capability.

Sixth Embodiment

Figure 19:
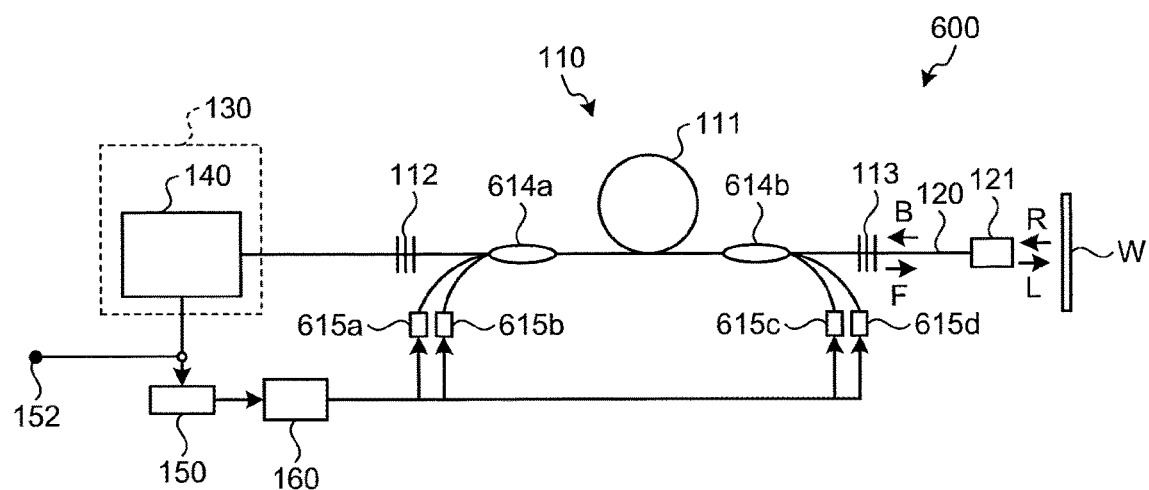
FIG. 19 illustrates a schematic configuration of an optical fiber laser device according to a sixth embodiment of the present disclosure.

FIG. 19 illustrates a schematic configuration of an optical fiber laser device 600 according to a sixth embodiment of the present disclosure. As illustrated in FIG. 19, the optical fiber laser device 600 according to the sixth embodiment of the present disclosure is an optical fiber laser type device that generates laser light by using the optical amplifying fiber 111 as an amplification medium in the laser oscillator 110.

As illustrated in FIG. 18, the optical fiber laser device 600 according to the sixth embodiment adopts a so-called bidirectional pumping type configuration. However, unlike the third embodiment, the optical fiber laser device 600 introduces pumping light from a downstream of the first light-reflecting unit 112 toward the optical amplifying fiber 111 forwardly, and introduces pumping light from an upstream of the second light-reflecting unit 113 toward the optical amplifying fiber 111 backwardly. Provided between the first light-reflecting unit 112 and the optical amplifying fiber 111 is a pumping-light multiplexer 614a for multiplexing pumping lights output by pumping laser diodes 615a and 615b and outputting the pumping lights in a direction of the optical amplifying fiber 111. Provided between the second light-reflecting unit 113 and the optical amplifying fiber 111 is a pumping-light multiplexer 614b for multiplexing pumping lights output by pumping laser diodes 615c and 615d and outputting the pumping lights in a direction of the optical amplifying fiber 111.

The pumping-light multiplexers 614a and 614b are configured by, for example, TFB similarly to the first embodiment. In the optical fiber laser device 600, a light-pumping port of the pumping-light multiplexer 614a is connected to the pumping laser diodes 615a and 615b, and a forward-direction-side signal port of the pumping-light multiplexer 614a is connected to the optical amplifying fiber 111. A reverse-direction-side signal port of the pumping-light multiplexer 614a is connected to the first light-reflecting unit 112. In the optical fiber laser device 600, a light-pumping port of the pumping-light multiplexer 614b is connected to the pumping laser diodes 615c and 615d, and a reverse-direction-side signal port of the pumping-light multiplexer 614b is connected to the optical amplifying fiber 111. A forward-direction-side signal port of the pumping-light multiplexer 614b is connected to the optical outputting fiber 120. In the optical fiber laser device 600, the terminal portion 130 is connected to the first light-reflecting unit 112. When a redundant port exists in the light-pumping ports of the pumping-light multiplexer 614a and 614b, the terminal portion 130 may be connected to the redundant port.

The optical fiber laser device 600 of the sixth embodiment configured as described above is capable of determining an amount of load which the optical fiber receives at the terminal portion 130 in consideration of not only the intensity of the return light but also a time length during which a high intensity state of the return light continues. The control unit 160 is capable of controlling outputs of the pumping laser diodes 615a, 615b, 615c, and 615d based on the amount of load which the optical fiber receives at the terminal portion 130. Hereby, a determination as to whether the output laser light output by the optical fiber laser device 600 is restrained is optimized, and thus, unnecessary restrain of the output laser light decreases. As a result, the optical fiber laser device 600 achieves high durability and high output capability.

Seventh Embodiment

Figure 20:
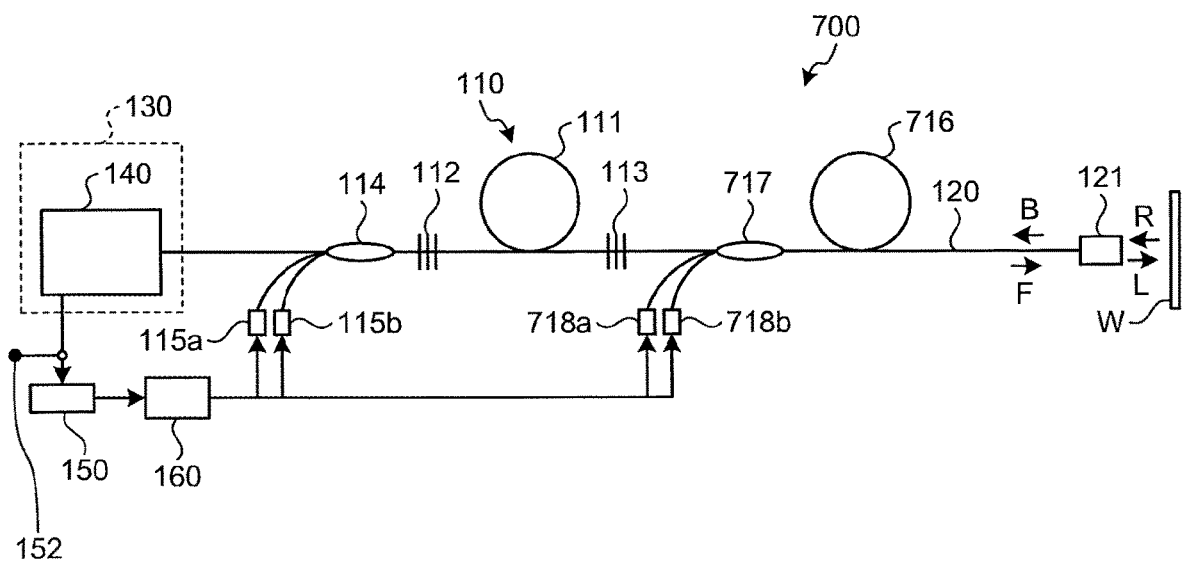
FIG. 20 illustrates a schematic configuration of an optical fiber laser device according to a seventh embodiment of the present disclosure.

FIG. 20 illustrates a schematic configuration of an optical fiber laser device 700 according to a seventh embodiment of the present disclosure. As illustrated in FIG. 20, the optical fiber laser device 700 according to the seventh embodiment of the present disclosure has a master oscillator power-amplifier (MOPA) structure that generates laser light by using the optical amplifying fiber 111 as an amplification medium in the laser oscillator 110, and amplifies the laser light by using an optical amplifying fiber 716 as an amplification medium in the optical amplifier.

As illustrated in FIG. 20, the optical fiber laser device 700 according to the seventh embodiment of the present disclosure is configured in which new components are added to the configuration of the optical fiber laser device 100 according to the first embodiment. Therefore, only additional components will be explained here.

As illustrated in FIG. 20, the optical fiber laser device 700 according to the seventh embodiment of the present disclosure includes an optical amplifying fiber 716, between the laser oscillator 110 and the irradiation head 121, functioning as an amplification medium for an optical amplifier. Provided between the optical amplifying fiber 716 and the second light-reflecting unit 113 is a pumping-light multiplexer 717 for multiplexing pumping lights output by pumping laser diodes 718a and 718b and outputting the pumping lights in a direction of the optical amplifying fiber 716.

The pumping-light multiplexer 717 is configured by, for example, TFB similarly to the pumping-light multiplexer 114. In the optical fiber laser device 700, a light-pumping port of the pumping-light multiplexer 717 is connected to the pumping laser diodes 718a and 718b, and a forward-direction-side signal port of the pumping-light multiplexer 717 is connected to the optical amplifying fiber 716. A reverse-direction-side signal port of the pumping-light multiplexer 717 is connected to the second light-reflecting unit 113. When a redundant port exists in the light-pumping ports of the pumping-light multiplexer 717, the terminal portion 130 may be connected to the redundant port.

Similarly to the optical amplifying fiber 111, the optical amplifying fiber 716 is a double-cladding-type optical fiber in which a core portion made of a silica-based glass is doped with a Yb ion that is an amplifying material, and in which an inner cladding layer made of a silica-based glass and an outer cladding layer made of a resin or the like are formed in this order at an outer periphery of the core portion.

By the above-described configuration, the optical fiber laser device 700 is capable of amplifying the laser light, oscillated by the laser oscillator 110, with the optical amplifying fiber 716 and outputting the laser light to the optical outputting fiber 120.

In the optical fiber laser device 700 of the seventh embodiment configured as described above, the control unit 160 is capable of determining an amount of load which the optical fiber receives at the terminal portion 130 in consideration of not only the intensity of the return light but also a time length during which a high intensity state of the return light continues. The control unit 160 is capable of controlling outputs of the pumping laser diodes 115a and 115b and/or the pumping laser diodes 718a and 718b based on an amount of load which the optical fiber receives at the terminal portion 130. Hereby, a determination as to whether the output laser light output by the optical fiber laser device 700 is restrained is optimized, and thus, unnecessary restrain of the output laser light decreases. As a result, the optical fiber laser device 700 achieves high durability and high output capability.

Although the optical fiber laser device 700 of the above-described seventh embodiment is configured in which the optical amplifying fiber 716 and the pumping-light multiplexer 717 are added to the optical fiber laser device 100 of the first embodiment, it is possible to configure to add the optical amplifying fiber 716 and the pumping-light multiplexer 717 to the optical fiber laser devices 200, 300, 400, 500, and 600 of the second to sixth embodiments.

Eighth Embodiment

Figure 21:
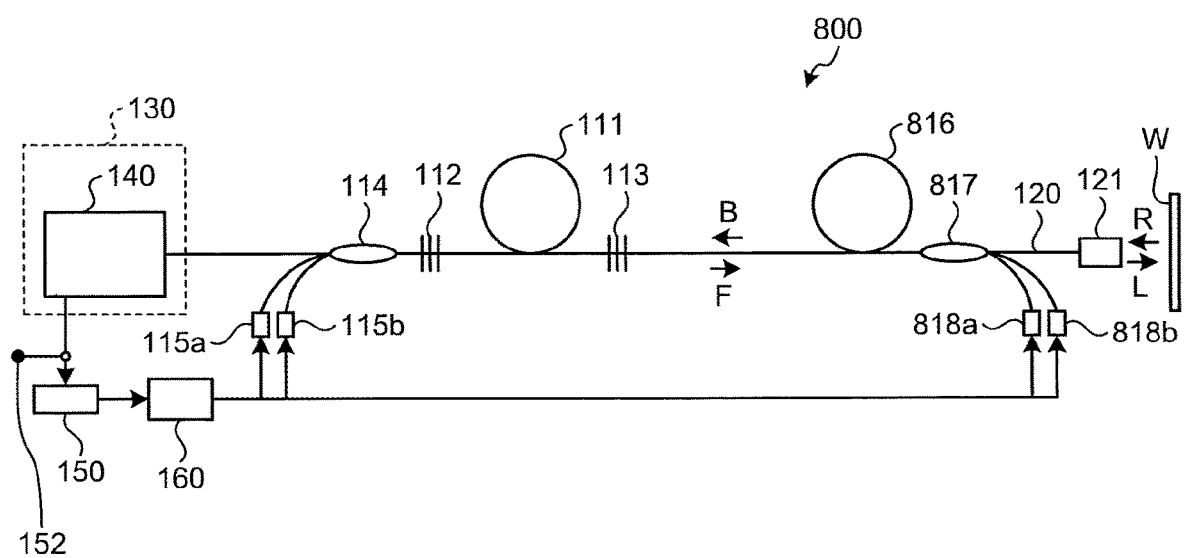
FIG. 21 illustrates a schematic configuration of an optical fiber laser device according to an eighth embodiment of the present disclosure.

FIG. 21 illustrates a schematic configuration of an optical fiber laser device 800 according to an eighth embodiment of the present disclosure. As illustrated in FIG. 21, the optical fiber laser device 800 according to the eighth embodiment of the present disclosure has the MOPA structure generates laser light by using the optical amplifying fiber 111 as an amplification medium in the laser oscillator 110, and amplifies the laser light by using an optical amplifying fiber 816 as an amplification medium in the optical amplifier.

As illustrated in FIG. 21, the optical fiber laser device 800 according to the eighth embodiment of the present disclosure is configured in which new components are added to the configuration of the optical fiber laser device 100 according to the first embodiment. Therefore, only additional components will be explained here.

As illustrated in FIG. 21, the optical fiber laser device 800 according to the eighth embodiment of the present disclosure includes an optical amplifying fiber 816, between the laser oscillator 110 and the irradiation head 121, functioning as an amplification medium for an optical amplifier. Provided between the optical amplifying fiber 816 and the optical outputting fiber 120 is a pumping-light multiplexer 817 for multiplexing pumping lights output by pumping laser diodes 818a and 818b, and outputting the pumping lights in a direction of the optical amplifying fiber 816.

The pumping-light multiplexer 817 is configured by, for example, TFB similarly to the pumping-light multiplexer 114. In the optical fiber laser device 800, a light-pumping port of the pumping-light multiplexer 817 is connected to the pumping laser diodes 818a and 818b, and a reverse-direction-side signal port of the pumping-light multiplexer 817 is connected to the optical amplifying fiber 816. A forward-direction-side signal port of the pumping-light multiplexer 817 is connected to the optical outputting fiber 120. When a redundant port exists in the light-pumping ports of the pumping-light multiplexer 817, the terminal portion 130 may be connected to the redundant port.

Similarly to the optical amplifying fiber 111, the optical amplifying fiber 816 is a double-cladding-type optical fiber in which a core portion made of a silica-based glass is doped with a Yb ion that is an amplifying material, and in which an inner cladding layer made of a silica-based glass and an outer cladding layer made of a resin or the like are formed in this order at an outer periphery of the core portion.

By the above-described configuration, the optical fiber laser device 800 is capable of amplifying the laser light, oscillated by the laser oscillator 110, with the optical amplifying fiber 816 and outputting the laser light to the optical outputting fiber 120.

In the optical fiber laser device 800 of the eighth embodiment configured as described above, the control unit 160 is capable of determining an amount of load which the optical fiber receives at the terminal portion 130 in consideration of not only the intensity of the return light but also a time length during which a high intensity state of the return light continues. The control unit 160 is capable of controlling outputs of the pumping laser diodes 115a and 115b and/or the pumping laser diodes 818a and 818b based on an amount of load which the optical fiber receives at the terminal portion 130. Hereby, a determination as to whether the output laser light output by the optical fiber laser device 800 is restrained is optimized, and thus, unnecessary restrain of the output laser light decreases. As a result, the optical fiber laser device 800 achieves high durability and high output capability.

Although the optical fiber laser device 800 of the above-described eighth embodiment is configured in which the optical amplifying fiber 816 and the pumping-light multiplexer 817 are added to the optical fiber laser device 100 of the first embodiment, it is possible to configure to add the optical amplifying fiber 816 and the pumping-light multiplexer 817 to the optical fiber laser devices 200, 300, 400, 500, and 600 of the second to sixth embodiments.

Ninth Embodiment

Figure 22:
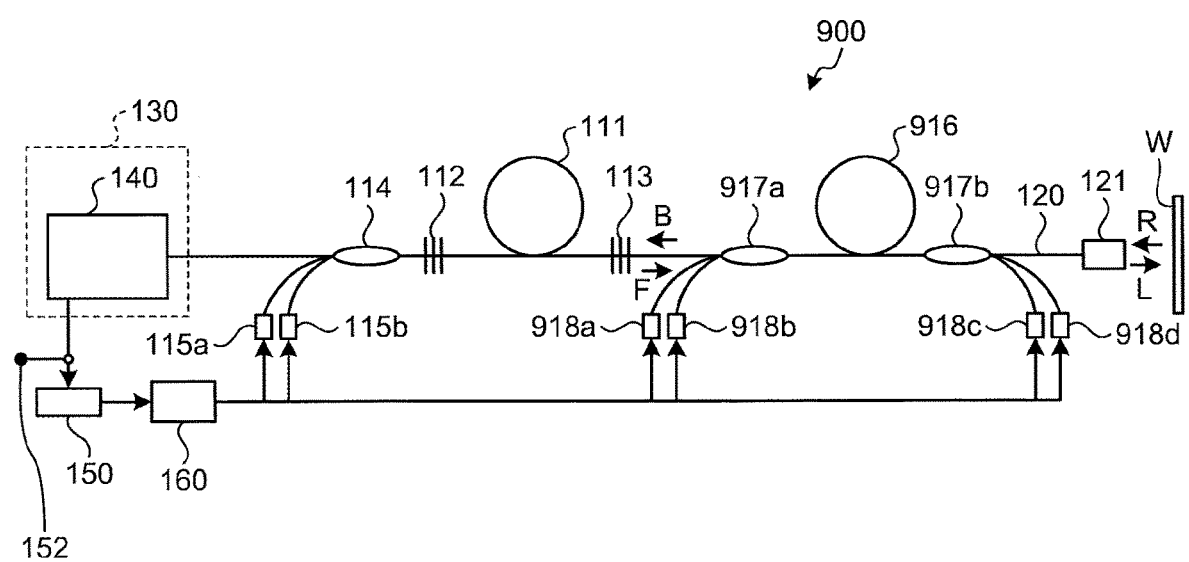
FIG. 22 illustrates a schematic configuration of an optical fiber laser device according to a ninth embodiment of the present disclosure.

FIG. 22 illustrates a schematic configuration of an optical fiber laser device 900 according to a ninth embodiment of the present disclosure. As illustrated in FIG. 22, the optical fiber laser device 900 according to the ninth embodiment of the present disclosure has the MOPA structure that generates laser light by using the optical amplifying fiber 111 as an amplification medium in the laser oscillator 110, and that amplifies the laser light by using an optical amplifying fiber 916 as an amplification medium in the optical amplifier.

As illustrated in FIG. 22, the optical fiber laser device 900 according to the ninth embodiment of the present disclosure is configured in which new components are added to the configuration of the optical fiber laser device 100 according to the first embodiment. Therefore, only additional components will be explained here.

As illustrated in FIG. 22, the optical fiber laser device 900 according to the ninth embodiment of the present disclosure includes an optical amplifying fiber 916, between the laser oscillator 110 and the irradiation head 121, functioning as an amplification medium for an optical amplifier. Provided between the optical amplifying fiber 916 and the second light-reflecting unit 113 is a pumping-light multiplexer 917a for multiplexing pumping lights output by pumping laser diodes 918a and 918b and outputting the pumping lights in a direction of the optical amplifying fiber 916. Moreover, provided between the optical amplifying fiber 916 and the optical outputting fiber 120 is a pumping-light multiplexer 917b for multiplexing pumping lights output by pumping laser diodes 918c and 918d and outputting the pumping lights in a direction of the optical amplifying fiber 916.

The pumping-light multiplexers 917a and 917b are configured by, for example, TFBs similarly to the pumping-light multiplexer 114. In the optical fiber laser device 900, a light-pumping port of the pumping-light multiplexer 917a is connected to the pumping laser diodes 918a and 918b, and a forward-direction-side signal port of the pumping-light multiplexer 917a is connected to the optical amplifying fiber 916. A reverse-direction-side signal port of the pumping-light multiplexer 917a is connected to the second light-reflecting unit 113. Moreover, in the optical fiber laser device 900, a light-pumping port of the pumping-light multiplexer 917b is connected to the pumping laser diodes 918c and 918d, and a reverse-direction-side signal port of the pumping-light multiplexer 917b is connected to the optical amplifying fiber 916. A forward-direction-side signal port of the pumping-light multiplexer 917b is connected to the optical outputting fiber 120. When a redundant port exists in the light-pumping ports of the pumping-light multiplexers 917a and 917b, the terminal portion 130 may be connected to the redundant port.

Similarly to the optical amplifying fiber 111, the optical amplifying fiber 916 is a double-cladding-type optical fiber in which a core portion made of a silica-based glass is doped with a Yb ion that is an amplifying material, and in which an inner cladding layer made of a silica-based glass and an outer cladding layer made of a resin or the like are formed in this order at an outer periphery of the core portion.

By the above-described configuration, the optical fiber laser device 900 is capable of amplifying the laser light, oscillated by the laser oscillator 110, with the optical amplifying fiber 916 and outputting the laser light to the optical outputting fiber 120.

In the optical fiber laser device 900 of the ninth embodiment configured as described above, the control unit 160 is capable of determining an amount of load which the optical fiber receives at the terminal portion 130 in consideration of not only the intensity of the return light but also a time length during which a high intensity state of the return light continues. The control unit 160 is capable of controlling outputs of the pumping laser diodes 115a and 115b and/or the pumping laser diodes 918a, 918b, 918c, and 918d based on an amount of load which the optical fiber receives at the terminal portion 130. Hereby, a determination as to whether the output laser light output by the optical fiber laser device 900 is restrained is optimized, and thus, unnecessary restrain of the output laser light decreases. As a result, the optical fiber laser device 900 achieves high durability and high output capability.

Although the optical fiber laser device 900 of the above-described ninth embodiment is configured in which the optical amplifying fiber 916 and the pumping-light multiplexers 917a and 917b are added to the optical fiber laser device 100 of the first embodiment, it is possible to configure to add the optical amplifying fiber 916 and the pumping-light multiplexers 917a and 917b to the optical fiber laser devices 200, 300, 400, 500, and 600 of the second to sixth embodiments.

Tenth Embodiment

Figure 23:
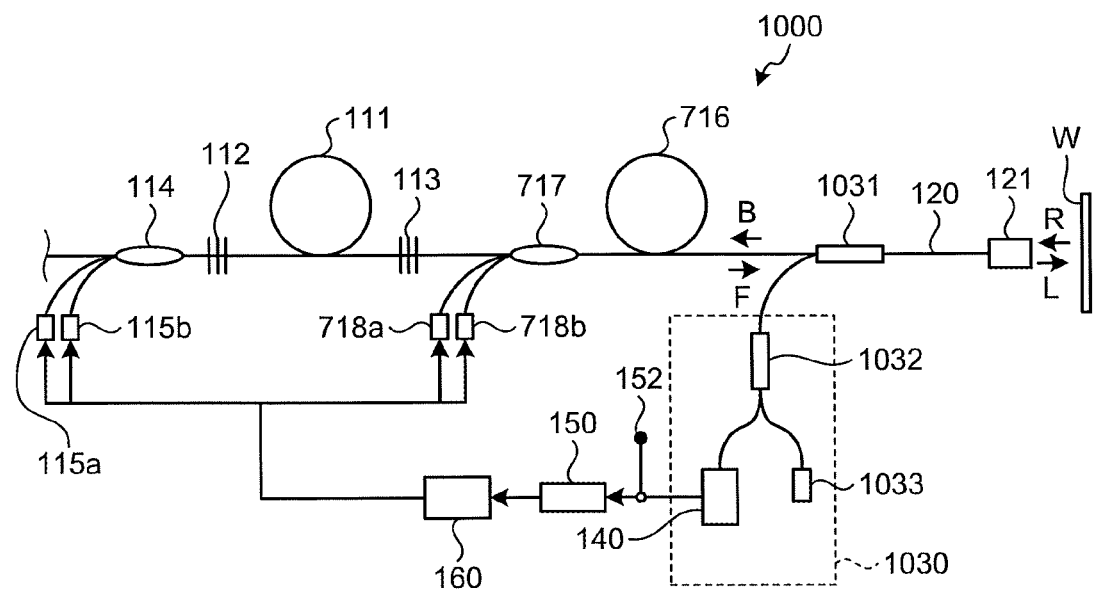
FIG. 23 illustrates a schematic configuration of an optical fiber laser device according to a tenth embodiment of the present disclosure.

FIG. 23 illustrates a schematic configuration of an optical fiber laser device 1000 according to a tenth embodiment of the present disclosure. As illustrated in FIG. 23, the optical fiber laser device 1000 according to the tenth embodiment of the present disclosure has the MOPA structure that generates laser light by using the optical amplifying fiber 111 as an amplification medium in the laser oscillator 110, and amplifies the laser light by using the optical amplifying fiber 716 as an amplification medium in the optical amplifier.

As illustrated in FIG. 23, the optical fiber laser device 1000 according to the tenth embodiment of the present disclosure is configured in which new components are added to the configuration of the optical fiber laser device 700 according to the seventh embodiment. Therefore, only additional components will be explained here.

As illustrated in FIG. 23, in the optical fiber laser device 1000, a wavelength division multiplex optical multiplexer/demultiplexer 1031 is inserted between the optical amplifying fiber 716 and the irradiation head 121, and an optical fiber between the optical amplifying fiber 716 and the irradiation head 121 is split. The split optical fiber is connected to a terminal portion 1030.

The terminal portion 1030 includes a wavelength division multiplex optical multiplexer/demultiplexer 1032, a visible-light-emitting portion 1033, and the return-light-attenuating module 140. That is, a configuration of the terminal portion 1030 is similar to the terminal portion 131 according to the configuration example 1 described above. Therefore, explanations for each configuration of the terminal portion 1030 are omitted here, and each configuration of the terminal portion 1030 of which explanations are omitted is regarded as being similar to each configuration of the terminal portion 131 according to the configuration example 1.

The terminal portion 1030 includes the return-light-attenuating module 140 that performs attenuation process to the return light R propagating in the optical outputting fiber in a reverse direction of the output laser light; and the visible-light-emitting portion 1033 that outputs the guide light for confirming a position to which the output laser light is irradiated.

In the optical fiber laser device 1000 of the tenth embodiment, the control unit 160 is capable of determining an amount of load which the optical fiber receives at the terminal portion 1030 in consideration of not only the intensity of the return light but also a time length during which a high intensity state of the return light continues. The control unit 160 is capable of controlling outputs of the pumping laser diodes 115a and 115b and/or the pumping laser diodes 718a and 718b based on an amount of load which the optical fiber receives at the terminal portion 1030. Hereby, a determination as to whether the output laser light output by the optical fiber laser device 1000 is restrained is optimized, and thus, unnecessary restrain of the output laser light decreases. As a result, the optical fiber laser device 1000 achieves high durability and high output capability.

Although the optical fiber laser device 1000 of the above-described tenth embodiment is configured in which the terminal portion 1030 is added to the optical fiber laser device 700 of the seventh embodiment, it is possible to configure to add the terminal portion 1030 to the laser devices of the other embodiments similarly.

Eleventh Embodiment

Figure 24:
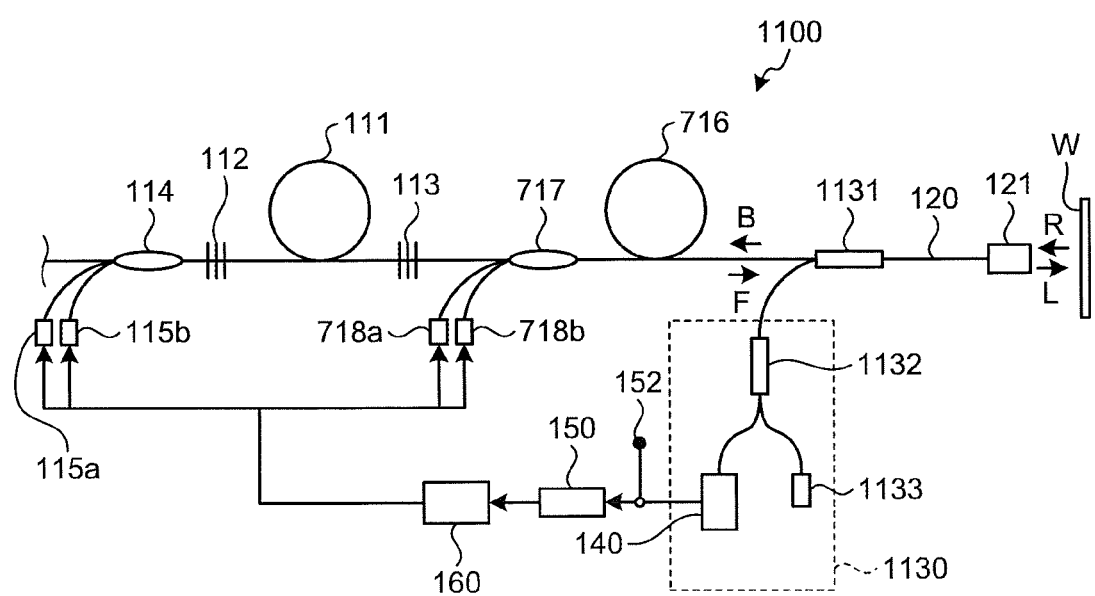
FIG. 24 illustrates a schematic configuration of an optical fiber laser device according to an eleventh embodiment of the present disclosure.

FIG. 24 illustrates a schematic configuration of an optical fiber laser device 1100 according to an eleventh embodiment of the present disclosure. As illustrated in FIG. 24, the optical fiber laser device 1100 according to an eleventh embodiment of the present disclosure has the MOPA structure that generates laser light by using the optical amplifying fiber 111 as an amplification medium in the laser oscillator 110, and amplifies the laser light by using the optical amplifying fiber 716 as an amplification medium in the optical amplifier.

As illustrated in FIG. 24, the optical fiber laser device 1100 according to the eleventh embodiment of the present disclosure is configured in which new components are added to the configuration of the optical fiber laser device 700 according to the seventh embodiment. Therefore, only additional components will be explained here.

As illustrated in FIG. 24, in the optical fiber laser device 1100, an optical multiplexer/demultiplexer 1131 is inserted between the optical amplifying fiber 716 and the irradiation head 121, and an optical fiber between the optical amplifying fiber 716 and the irradiation head 121 is split. The split optical fiber is connected to a terminal portion 1130.

The terminal portion 1130 includes an optical multiplexer/demultiplexer 1132, an optical sensor 1133, and the return-light-attenuating module 140. That is, a configuration of the terminal portion 1130 is similar to the terminal portion 134 according to the configuration example 2 described above. Therefore, explanations for each configuration of the terminal portion 1130 are omitted here, and each configuration of the terminal portion 1130 of which explanations are omitted is regarded as being similar to each configuration of the terminal portion 134 according to the configuration example 2.

The terminal portion 1130 includes: the return-light-attenuating module 140 that performs attenuation process to the return light R propagating in the optical outputting fiber in a reverse direction of the output laser light; and the optical sensor 1133 that monitors an optical intensity of the return light R propagating in the optical outputting fiber in a reverse direction of the output laser light.

In the optical fiber laser device 1100 of the eleventh embodiment, the control unit 160 is capable of determining an amount of load which the optical fiber receives at the terminal portion 1130 in consideration of not only the intensity of the return light but also a time length during which a high intensity state of the return light continues. The control unit 160 is capable of controlling outputs of the pumping laser diodes 115a and 115b and/or the pumping laser diodes 718a and 718b based on an amount of load which the optical fiber receives at the terminal portion 1130. Hereby, a determination as to whether the output laser light output by the optical fiber laser device 1100 is restrained is optimized, and thus, unnecessary restrain of the output laser light decreases. As a result, the optical fiber laser device 1100 achieves high durability and high output capability.

Although the optical fiber laser device 1100 of the above-described eleventh embodiment is configured in which the terminal portion 1130 is added to the optical fiber laser device 700 of the seventh embodiment, it is possible to configure to add the terminal portion 1130 to the laser devices of the other embodiments similarly.

Twelfth Embodiment

Figure 25:
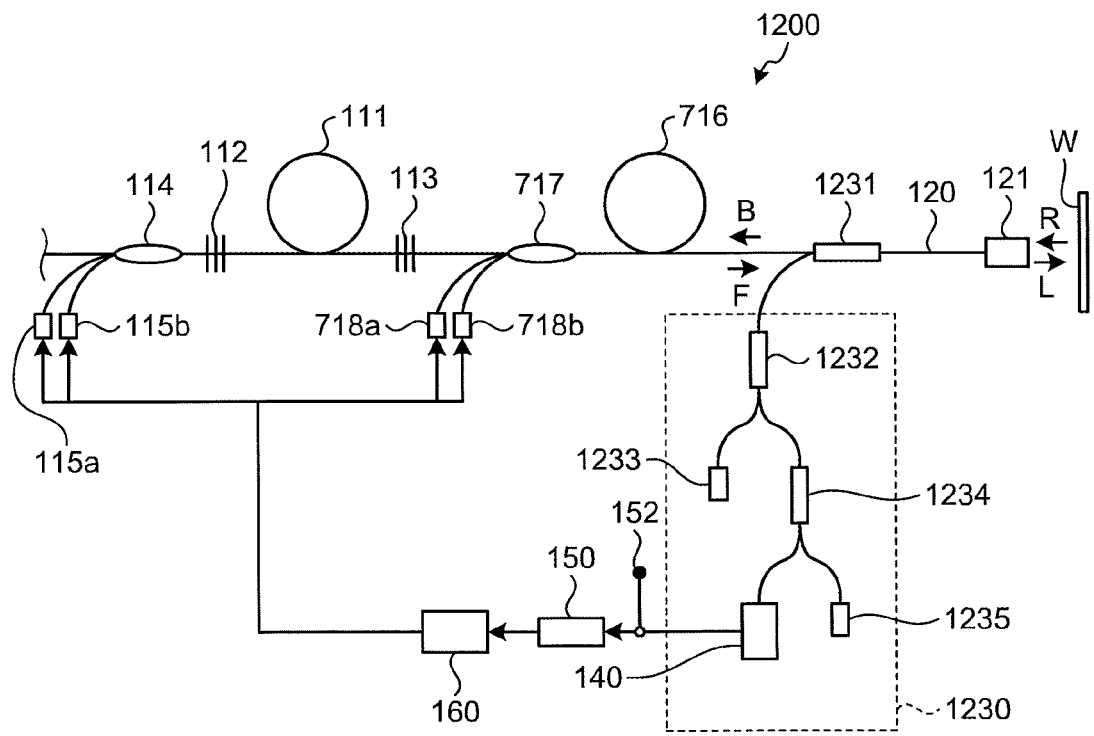
FIG. 25 illustrates a schematic configuration of an optical fiber laser device according to a twelfth embodiment of the present disclosure.

FIG. 25 illustrates a schematic configuration of an optical fiber laser device 1200 according to a twelfth embodiment of the present disclosure. As illustrated in FIG. 25, the optical fiber laser device 1100 according to an eleventh embodiment of the present disclosure has the MOPA structure that generates laser light by using the optical amplifying fiber 111 as an amplification medium in the laser oscillator 110, and amplifies the laser light by using the optical amplifying fiber 716 as an amplification medium in the optical amplifier.

As illustrated in FIG. 25, the optical fiber laser device 1200 according to the twelfth embodiment of the present disclosure is configured in which new components are added to the configuration of the optical fiber laser device 700 according to the seventh embodiment. Therefore, only additional components will be explained here.

As illustrated in FIG. 25, in the optical fiber laser device 1200, an optical multiplexer/demultiplexer 1231 is inserted between the optical amplifying fiber 716 and the irradiation head 121, and an optical fiber between the optical amplifying fiber 716 and the irradiation head 121 is split. The split optical fiber is connected to a terminal portion 1230. In the optical fiber laser device 1200 according to the twelfth embodiment, a wavelength division optical multiplexer/demultiplexer may be used in place of the optical multiplexer/demultiplexer 1231.

The terminal portion 1230 includes a wavelength division multiplex optical multiplexer/demultiplexer 1232, a visible-light-emitting portion 1233, an optical multiplexer/demultiplexer 1234, an optical sensor 1235, and the return-light-attenuating module 140. That is, a configuration of the terminal portion 1230 is similarly to the terminal portion 137 according to the configuration example 3 described above. Therefore, explanations for each configuration of the terminal portion 1230 is omitted here, and each configuration of the terminal portion 1230 of which explanations are omitted is regarded as being similar to each configuration of the terminal portion 137 according to the configuration example 3.

The terminal portion 1230 includes: the return-light-attenuating module 140 that performs attenuation process to the return light R propagating in the optical outputting fiber in a reverse direction of the output laser light; the visible-light-emitting portion 1233 that outputs the guide light for confirming a position to which the output laser light is irradiated; and the optical sensor 1235 that monitors an optical intensity of the return light R propagating in the optical outputting fiber in a reverse direction of the output laser light.

In the optical fiber laser device 1200 of the twelfth embodiment, the control unit 160 is capable of determining an amount of load which the optical fiber receives at the terminal portion 1230 in consideration of not only the intensity of the return light but also a time length during which a high intensity state of the return light continues. The control unit 160 is capable of controlling outputs of the pumping laser diodes 115a and 115b and/or the pumping laser diodes 718a and 718b based on an amount of load which the optical fiber receives at the terminal portion 1230. Hereby, a determination as to whether the output laser light output by the optical fiber laser device 1200 is restrained is optimized, and thus, unnecessary restrain of the output laser light decreases. As a result, the optical fiber laser device 1200 achieves high durability and high output capability.

Although the optical fiber laser device 1200 of the above-described twelfth embodiment is configured in which the terminal portion 1230 is added to the optical fiber laser device 700 of the seventh embodiment, it is possible to configure to add the terminal portion 1230 to the laser devices of the other embodiments similarly.

Thirteenth Embodiment

Figure 26:
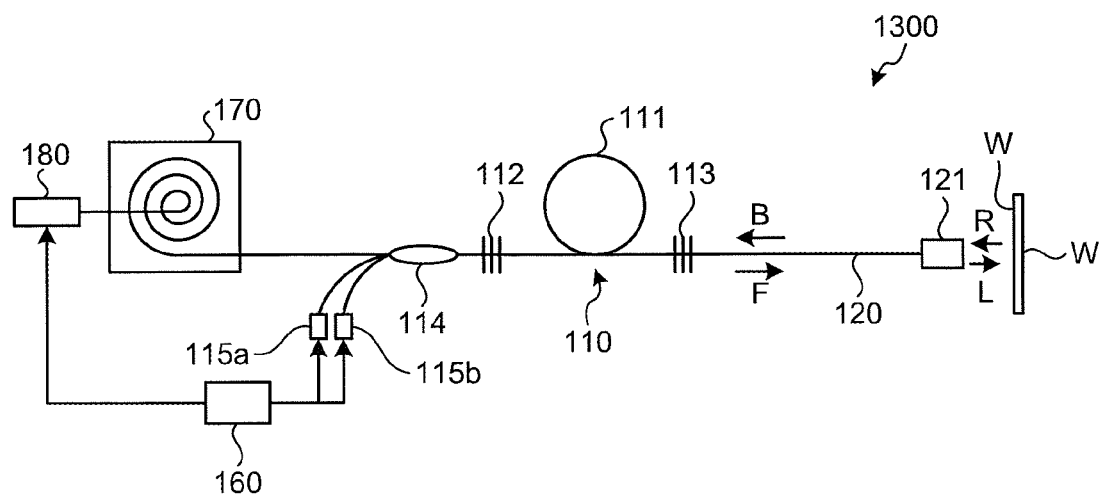
FIG. 26 illustrates a schematic configuration of an optical fiber laser device according to a thirteenth embodiment.

FIG. 26 illustrates a schematic configuration of an optical fiber laser device 1300 according to a thirteenth embodiment. As illustrated in FIG. 26, the optical fiber laser device 1300 according to the thirteenth embodiment is an optical fiber laser type device that generates output laser light by using an optical amplifying fiber 111 as an amplification medium in the laser oscillator 110.

As illustrated in FIG. 26, the optical fiber laser device 1300 according to the thirteenth embodiment adopts a so-called forward-pumping type configuration. The optical fiber laser device 1300 is provided with the pumping-light multiplexer 114, at an upstream to the first light-reflecting unit 112, multiplexing pumping lights output by the pumping laser diodes 115a and 115b and outputting the pumping lights to the optical amplifying fiber 111. Hereby the pumping lights are introduced from the upstream to the first light-reflecting unit 112 toward the optical amplifying fiber 111.

The pumping-light multiplexer 114 is configured by, for example, a tapered fiber bundle (TFB). The pumping-light multiplexer 114 includes the forward-direction-side signal port optical fiber and the reverse-direction-side signal port optical fiber, which configure two end portions, and a plurality of pumping-light port optical fibers. In the optical fiber laser device 1300, a light-pumping port of the pumping-light multiplexer 114 is connected to the pumping laser diodes 115a and 115b.

A reverse-direction-side signal port of the pumping-light multiplexer 114 is connected to a return-light-attenuating module 170. Since the cores extend at two ends of the forward-direction-side signal port and the reverse-direction-side signal port, the intensity of the return light is great, and thus, the reverse-direction-side signal port of the pumping-light multiplexer 114 is preferable for a port to be connected to the return-light-attenuating module 170. As illustrated in FIG. 26, a visible-light-emitting portion 180 introducing a visible light via the return-light-attenuating module 170 in a forward direction is connected to the return-light-attenuating module 170. The return-light-attenuating module 170 emits an attenuated return light from an end portion on an opposite side to the optical outputting fiber 120, and the visible-light-emitting portion 180 is connected to the end portion.

Figure 27:
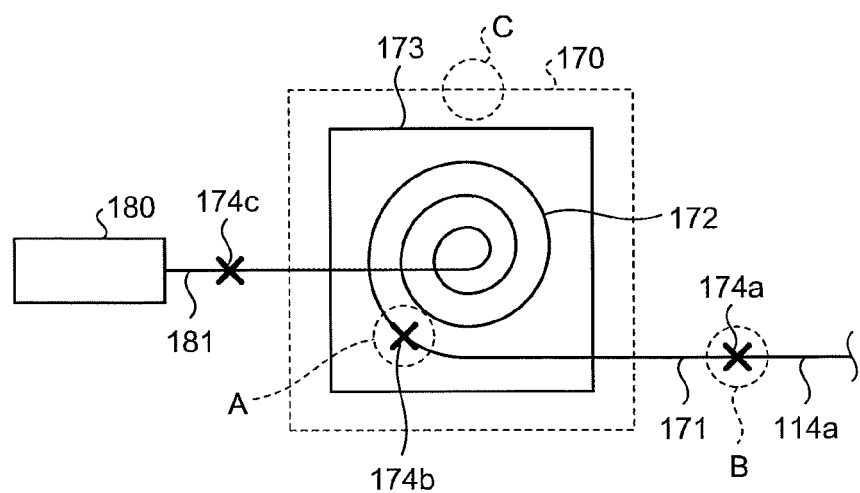
FIG. 27 illustrates a configuration of a return-light-attenuating module and its periphery.

FIG. 27 illustrates a configuration of the return-light-attenuating module 170 and therearound. As illustrated in FIG. 27, the return-light-attenuating module 170 includes, as a primary configuration, an optical fiber connecting from a reverse-direction-side signal port of the pumping-light multiplexer 114 to the visible-light-emitting portion 180. The return-light-attenuating module 170 includes a metal plate 173 fixing an optical receiving fiber 171 and an optical attenuating fiber 172 provided to the return-light-attenuating module 170 and configuring a thermal conversion portion for dissipating a heat generated when a leakage light from the optical receiving fiber 171 and the optical attenuating fiber 172 is converted to the heat. That is, the metal plate 173 is formed of a metal having high thermal conductivity, and the metal plate 173 itself is connected to a heatsink or the like in the optical fiber laser device 1300 and configured to dissipate the heat generated from the optical receiving fiber 171 and the optical attenuating fiber 172 effectively.

As illustrated in FIG. 27, the optical receiving fiber 171 and the optical attenuating fiber 172 are connected respectively to a signal port optical fiber 114a extending from a reverse-direction-side signal port of the pumping-light multiplexer 114 and a pigtail optical fiber 181 extending from the visible-light-emitting portion 180. The signal port optical fiber 114a and the optical receiving fiber 171 are fusion-spliced at a first fusion-spliced point 174a, the optical receiving fiber 171 and the optical attenuating fiber 172 are fusion-spliced at a second fusion-spliced point 174b, and the optical attenuating fiber 172 and the pigtail optical fiber 181 are fusion-spliced at a third fusion-spliced point 174c. A core of the optical attenuating fiber 172 is connected, via the optical receiving fiber 171 and the signal port optical fiber 114a and the like, to a core of an optical fiber such as the optical amplifying fiber 111 or the like configuring the laser oscillator 110.

It is preferable to configure the first fusion-spliced point 174a so that a connection loss is fewer, for example, an approximately same degree to a connection loss of the second fusion-spliced point 174b, or smaller than the connection loss of the second fusion-spliced point 174*b*. It is preferable to prevent, from a heat management point of view, a heat from being generated at the first fusion-spliced point 174*a* and to concentrate a heat-generating factor on the metal plate 173. It is preferable to make the signal port optical fiber 114*a* and the optical receiving fiber 171 approximately identical in core diameter and NA. It is preferable to make a cladding diameter of the optical receiving fiber 171 equal to or more than a cladding diameter of the signal port optical fiber 114*a*.

It is preferable to use so-called low-index optical fibers for the signal port optical fiber 114*a* and the optical receiving fiber 171. A refractive index of a coating of the low-index optical fiber is lower than a refractive index of a cladding, and thus it is possible to restrain a low leakage light at the first fusion-spliced point 174*a*, the low-index optical fiber contributes to concentration of a heat-generating factor on the metal plate 173.

From the view point described above, it is preferable that the optical receiving fiber 171 be selected in accordance with the optical fiber to be connected to the return-light-attenuating module 170, for example, the signal port optical fiber 114*a* in the present embodiment. For example, the optical receiving fiber 171 may be an optical fiber that is the same as the optical fiber connected to the return-light-attenuating module 170. In that case, a configuration of not providing the first fusion-spliced point 174*a* is possible as well.

Herein an example of combination of optical fibers will be illustrated. For example, when the signal port optical fiber 114*a* is a pedestal optical fiber of which core diameter is 14 μm and of which cladding diameter is 125 μm, the optical receiving fiber 171 is a double-cladding optical fiber of which core diameter is 14 μm and of which cladding diameter is 125 μm. A pedestal optical fiber is an optical fiber constructed so that an area, of which refractive index is between those of the core and the cladding, is provided around the core. In this case, propagation characteristics of the cores of the pedestal optical fiber and the double-cladding optical fiber are substantially single mode similarly to the optical fiber configuring the laser oscillator 110.

It is not always necessary to configure the second fusion-spliced point 174*b* so that its connection loss is less than that of the first fusion-spliced point 174*a*. It is because the second fusion-spliced point 174*b* is disposed on the metal plate 173 to be capable of dissipating a heat caused by a connection loss. However, when the heat generated at the second fusion-spliced point 174*b* is great to some degree, a coating of the optical fiber may be melted sometimes by the generated heat. Therefore, it is preferable that the coating of the optical fiber in the vicinity of the second fusion-spliced point 174*b* be removed in advance. It is more preferable that the coating of the optical attenuating fiber 172 in a predetermined length be removed from the second fusion-spliced point 174*b* since the optical attenuating fiber 172 generates more heat.

Since it is not necessary to configure the second fusion-spliced point 174*b* so that the connection loss decreases, the optical attenuating fiber 172 may be chosen in wide variety. If the optical attenuating fiber 172 is chosen freely so that a bending loss in the return light is greater than a bending loss in the visible light and this optical attenuating fiber 172 is coiled for a plurality of rounds to be fixed to the metal plate 173, the optical attenuating fiber 172 may serve as the return light propagation loss portion made of a medium causing a loss to the return light continuously in a direction of propagation of the return light. Since a problematic component of the return light propagates in a core mode, it is preferable that, in the core of the optical attenuating fiber 172, a loss at a wavelength of the return light be greater than a loss at a visible light wavelength range relative to the return light propagating in the core mode.

The visible-light-emitting portion 180 outputs a visible laser light in, for example, red, green, or the like as a visible light, and the visible laser light is output from the optical fiber laser device 1300 via the return-light-attenuating module 170, the optical amplifying fiber 111, and the optical outputting fiber 120. A length and a bending diameter of the optical attenuating fiber 172 configuring the return-light-attenuating module 170 in this state is set so that a visible laser light output from the optical fiber laser device 1300 has a visible degree of optical intensity, and so that return light made of infrared light input to the return-light-attenuating module 170 is attenuated and output to the visible-light-emitting portion 180 side. The visible degree of optical intensity herein is, for example, approximately JIS C6802 class 2 to 3. The restrain means, for example, attenuation of a return light power input to the visible-light-emitting portion 180 by equal to or greater than approximately 300 W, or by a degree not damaging the visible-light-emitting portion 180 even if it is approximately equal to or more than the output.

A wavelength of visible light is approximately 400 nm to 800 nm, and a wavelength of output laser light L for laser machining is infrared light, and is equal to or greater than 1000 nm in many cases. Therefore, it is preferable to choose the optical attenuating fiber 172 whose bending loss in light of wavelength of equal to or more than 1000 nm is greater than a bending loss in light of wavelength of equal to or less than 800 nm. For example, it is more preferable that, when a wavelength of a visible light used for a guide light is 660 nm and a wavelength of output laser light L for laser-machining use is 1070 nm, the optical attenuating fiber 172 be chosen so that a bending loss in light of wavelength of 1070 nm is greater than a bending loss in light of wavelength of 660 nm. It is preferable that a difference between the bending loss in the return light and the bending loss in the visible light be equal to or greater than 50 dB so that the visible light output from the optical fiber laser device 1300 is visible and the return light to the visible-light-emitting portion 180 is restrained. For example, if a difference between a bending loss in the return light and a bending loss in the visible light is equal to or greater than 50 dB, a major portion of the return light is attenuated and subjected to thermal conversion at the optical attenuating fiber 172. The return light of which major portion is attenuated at the optical attenuating fiber 172 in this manner is attenuated to equal to or less than 10 mW if it is, for example, 500 W, and only a remaining light with a micro intensity is supposed to be output from the optical attenuating fiber 172.

It is preferable that a bend edge wavelength of the optical attenuating fiber 172 be shorter than a wavelength of the return light. The bend edge wavelength is a wavelength at which an optical fiber without being coiled makes a fundamental mode propagate therethrough but does not make the fundamental mode propagate therethrough if the wavelength is longer than the bend edge wavelength (the longest wavelength at which the fundamental mode may be propagated with a low loss). That is, when attempting the return light of which wavelength is longer than the bend edge wavelength through the coiled optical attenuating fiber 172, the power of the return light may be significantly reduced. On the other hand, a wavelength of the visible light being used as a guide light is made shorter than the bend edge wavelength of the optical attenuating fiber 172, preferably by equal to or longer than 100 nm.

It is preferable that the core of the optical attenuating fiber 172 be configured to propagate light that is at least used as a guide light among the visible lights at a substantially single mode. It is because a loss in the guide light may be decreased. Therefore, it is preferable that the bend edge wavelength of the optical attenuating fiber 172 be longer than 660 nm, and longer than 800 nm is more preferable.

It is preferable that the bending radius of the optical attenuating fiber 172 be set so that an amount of the bending loss in light being used as a guide light is within a range in which a visible light output from the optical fiber laser device as described above is visible. For example, it is preferable that the bending radius of the optical attenuating fiber 172 be configured to vary by one round within a range of radii from 150 mm to 30 mm. As illustrated in FIG. 27, it is more preferable that an end point of the optical attenuating fiber 172 at a larger bending radius side be connected to the optical receiving fiber 171. It is because, it is an arrangement that the bending loss increases gradually from a side at which the return light is incident since a larger bending radius is subjected to a smaller bending loss, and thus, it is possible to disperse a heat caused by the bending loss. Although it is possible to select the length of a section of the coiled optical attenuating fiber 172 in accordance with the amount of the return light to be attenuated, and it may be, for example, 1 m to 5 m.

An end at a smaller bending radius side of the optical attenuating fiber 172 (an end on an opposite side to the optical outputting fiber 120) is fusion-spliced to the pigtail optical fiber 181 at a third fusion-spliced point. The pigtail optical fiber 181 and the optical attenuating fiber 172 may be the same optical fiber. Therefore, a configuration without the third fusion-spliced point 174c is possible.

It is preferable that a groove be provided to positions at the metal plate 173 where the optical receiving fiber 171 and the optical attenuating fiber 172 are arranged, the optical receiving fiber 171 and the optical attenuating fiber 172 be accommodated in the groove and fixed with a resin or the like. It is because it is possible to increase an effect of not only fixing the optical receiving fiber 171 and the optical attenuating fiber 172 reliably but also conducting a thermal conversion, and exhausting a heat, of a leakage light of the return light leaking from the optical attenuating fiber 172 effectively. The metal plate 173 serves as a thermal conversion portion converting light caused by a loss of the optical attenuating fiber 172 to heat.

It may be configured to monitor an intensity of the return light by arranging a light-receiving element or the like on the metal plate 173 at a position where a leakage light of the return light may be received. For example, a stable measurement of the return light intensity is possible by arranging the light-receiving element in vicinity A of the second fusion-spliced point 174b or a portion of a bending portion to which the return light is incident. Moreover, for example, a light-receiving element may be arranged in a vicinity B of the first fusion-spliced point 174a, and a light-receiving element may be arranged in a vicinity C surrounding the optical attenuating fiber 172 or around the return-light-attenuating module 170.

It is preferable to provide a temperature sensor such as a thermistor or the like to the metal plate 173. It is because a temperature of the metal plate 173 is correlated to an intensity of the return light and it may be used to control etc. an output of the output laser light L while monitoring the intensity of the return light.

Figure 28:
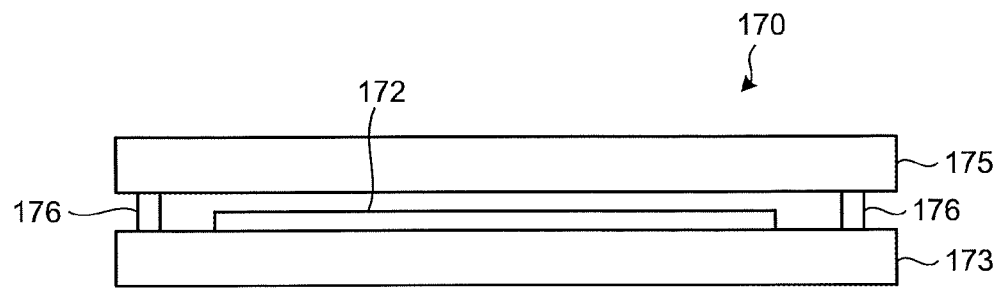
FIG. 28 is a side plan view of the return-light-attenuating module.

As illustrated in FIG. 28, it is preferable to cover the return-light-attenuating module 170 with a shielding plate. FIG. 28 is a side plan view of the return-light-attenuating module 170. As illustrated in FIG. 28, a shielding plate 175 is arranged to be in approximately parallel with the metal plate 173 by spacers 176. The shielding plate 175 may be formed of the same material with the metal plate 173 or resin. An interval between the metal plate 173 and the shielding plate 175 is, for example, 6 mm, and the optical attenuating fiber 172 is accommodated between the metal plate 173 and the shielding plate 175.

By the above-described configuration, it is possible to restrain the return light leaking from the optical attenuating fiber 172 from being emitted around the return-light-attenuating module 170. Since the return light leaking from the optical attenuating fiber 172 is confined within the return-light-attenuating module 170, a sensing accuracy for the return light when arranging the light-receiving element within the return-light-attenuating module 170 improves. This configuration obtains an effect of being capable of increasing sensitivity of a temperature sensor because a temperature gradient relative to an input power increases when arranging the light-receiving element within the return-light-attenuating module 170.

Figure 29:
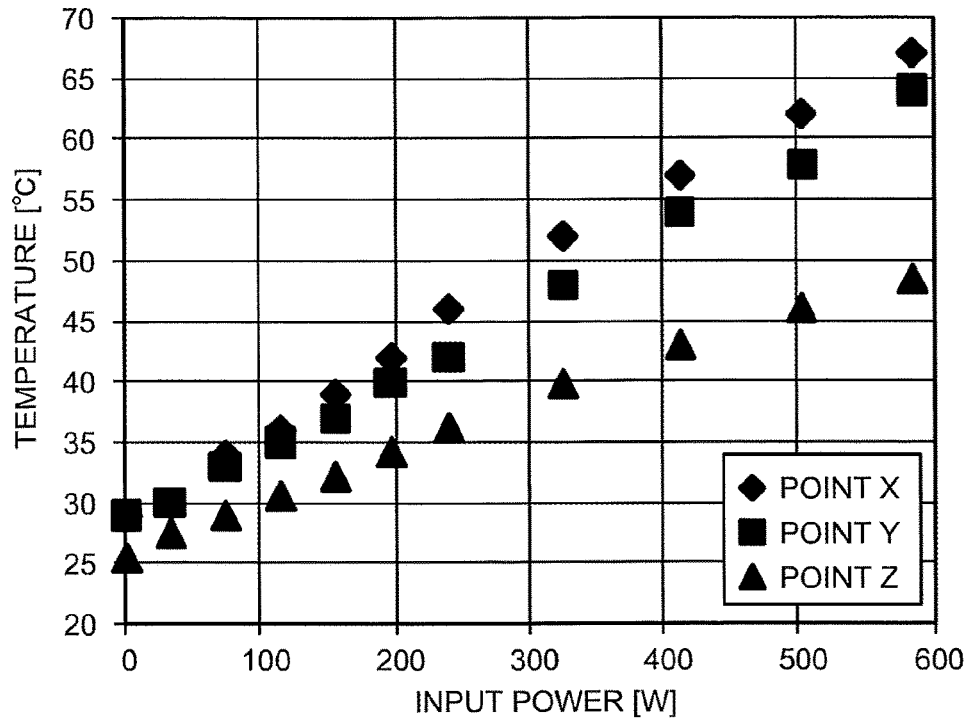
FIG. 29 is a graph illustrating temperature of an optical fiber relative to an input power to the return-light-attenuating module.
Figure 30:
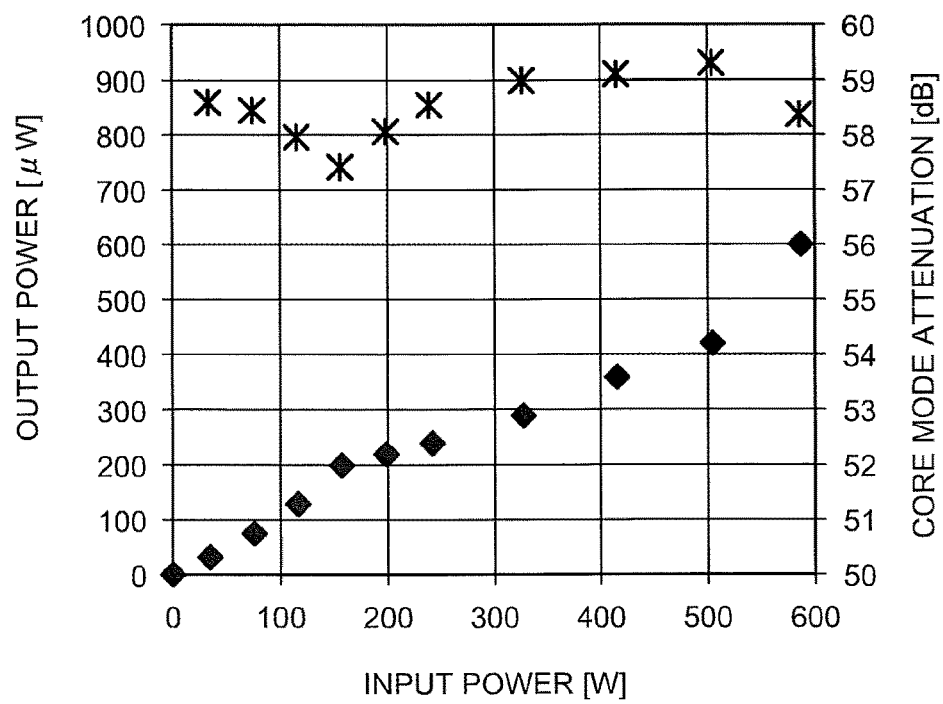
FIG. 30 is a graph illustrating an output power relative to the input power to the return-light-attenuating module.

Herein an evaluation to a single unit of the return-light-attenuating module 170 is explained while referring to FIGS. 29 and 30. FIG. 29 is a graph illustrating a temperature of an optical attenuating fiber 172 relative to an input power to the return-light-attenuating module 170, and FIG. 30 is a graph illustrating an output power relative to the input power to the return-light-attenuating module 170.

In the graph illustrated in FIG. 29, a vertical axis indicates temperature [° C.], a horizontal axis indicates input power [W], and temperatures of a second fusion-spliced point 174b ((Point X)), an optical attenuating fiber 172 (Point Y), and a metal plate 173 (Point Z) when inputting a wavelength of 1070 nm of laser light to a position corresponding to the first fusion-spliced point 174a are plotted. Laser lights of a pedestal mode and a cladding mode are contained as well in the laser light input to the position corresponding to the first fusion-spliced point 174a, and a ratio of the core mode is 70%. Since the temperature of the metal plate 173 follows, and varies in accordance with, the temperatures of the second fusion-spliced point 174b and the optical attenuating fiber 172, the temperatures of the second fusion-spliced point 174b and the optical attenuating fiber 172 are measured by attaching a temperature sensor to the metal plate 173.

As illustrated in FIG. 29, the temperatures of the second fusion-spliced point 174b, the optical attenuating fiber 172, and the metal plate 173 show approximate linear characteristics relative to the input power to the return-light-attenuating module 170. For example, relative to 600 W of the input power as well, the second fusion-spliced point 174b is equal to or less than 70° C., and the temperature of the metal plate 173 is restrained at equal to or less than 60° C.

In the graph illustrated in FIG. 30, a left vertical axis indicates output power [μW], a horizontal axis indicates input power [W], and a right vertical axis indicates attenuation amount indicated in decibel [dB], and an output power at a position corresponding to the third fusion-spliced point 174c when inputting the wavelength of 1070 nm of laser light to a position corresponding to the first fusion-spliced point 174a is plotted. Similarly, the laser light input to the position corresponding to the first fusion-spliced point 174a contains the laser lights of the pedestal mode and the cladding mode as well, and the ratio of the core mode is 70%.

As illustrated in FIG. 30, the return-light-attenuating module 170 exerts an effect of attenuating approximately 58 dB relative to 0 W to 600 W of input power, and the output power is restrained under 1 mW relative to, for example, 600 W of input power as well.

As described above, in the optical fiber laser device 1300, the return-light-attenuating module 170 configured by bending the optical attenuating fiber 172 of which bending loss relative in the return light is greater than a bending loss in the visible light by a plurality of rounds is connected to the first light-reflecting unit 112 via, for example, the signal port optical fiber of the pumping-light multiplexer 114, and the optical fiber laser device 1300 includes the visible-light-emitting portion 180 into which the visible light is introduced via the return-light-attenuating module 170. Therefore, the optical fiber laser device 1300 described above is configured to be high in durability relative to the return light, and thus achieves high durability and high output capability.

Fourteenth Embodiment

Figure 31:
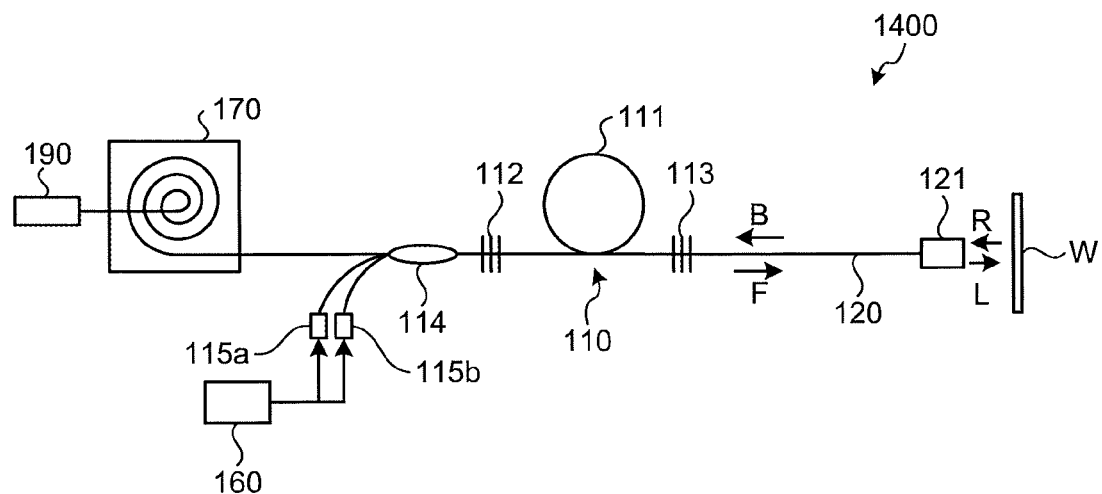
FIG. 31 illustrates a schematic configuration of an optical fiber laser device according to a fourteenth embodiment.

FIG. 31 illustrates a schematic configuration of an optical fiber laser device 1400 according to a fourteenth embodiment. As illustrated in FIG. 31, the optical fiber laser device 1400 according to the fourteenth embodiment is an optical fiber laser type device generating output laser light by using the laser oscillator 110. The laser oscillator 110 is provided with the optical amplifying fiber 111 and is configured to generate a laser resonance between the first light-reflecting unit 112 and the second light-reflecting unit 113. The output laser light generated by the laser oscillator 110 is irradiated as the output laser light L to the workpiece W via the optical outputting fiber 120 and the irradiation head 121.

As illustrated in FIG. 31, the optical fiber laser device 1400 according to the fourteenth embodiment adopts the forward-pumping type configuration. That is, in the optical fiber laser device 1400, pumping light is introduced in the forward direction of the laser oscillator 110. For that purpose, the optical fiber laser device 1400 is provided with the pumping-light multiplexer 114, at an upstream to the first light-reflecting unit 112, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115a and 115b, and the forward-direction-side signal port of the pumping-light multiplexer 114 is connected to the first light-reflecting unit 112. By this configuration, the pumping-light multiplexer 114 multiplexes the pumping lights output by the pumping laser diodes 115a and 115b and outputs the pumping light to the laser oscillator 110. The return-light-attenuating module 170 is connected to the signal port optical fiber extending from the reverse-direction-side signal port of the pumping-light multiplexer 114. The configuration in the return-light-attenuating module 170 may be configured to be similar to the first embodiment. The optical fiber laser device 1400 is provided with the control unit 160 for controlling the pumping laser diodes 115a and 115b and other controlled sites.

In the optical fiber laser device 1400 according to the fourteenth embodiment, a terminal-treating portion 190 is provided at an end point at the reverse direction side of the return-light-attenuating module 170. The terminal-treating portion 190 is achieved by providing, for example, a resin-sealing at a terminal of the optical fiber configuring the return-light-attenuating module 170. Although the terminal-treating portion 190 is described independently from the return-light-attenuating module 170 in FIG. 31, the resin-sealing may be provided to the terminal of the optical fiber in the return-light-attenuating module 170.

Figure 32:
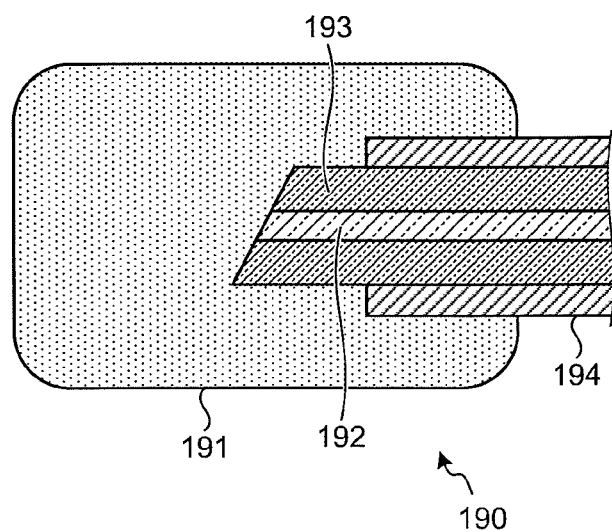
FIG. 32 illustrates an example of resin-sealing a terminal of an optical fiber at a terminal-treating portion.

FIG. 32 illustrates an example of the resin-sealing at the terminal of the optical fiber in the terminal-treating portion 190. As illustrated in FIG. 32, the terminal-treating portion 190 is provided with a sealing member 191 sealing an end of the optical fiber. The sealing member 191 is formed of a resin or the like and has characteristics of scattering or absorbing the return light emitted from the end of the optical fiber.

A core 192 and a cladding 193 at the end of the optical fiber are cut obliquely relative to an optical axis of the optical fiber. It is preferable to cut the end of the optical fiber obliquely in this manner because an amount of light, among the return light, reflected at the end of the optical fiber and returning to the core decreases. When the intensity of the return light is low, the core 192 and the cladding 193 at the end of the optical fiber may be cut vertically relative to the optical axis of the optical fiber.

Although, a coating 194 is provided around the cladding 193 of the optical fiber illustrated in FIG. 32, the coating 194 is not always necessary. It is possible to remove the coating 194 at the end portion or the entire of the optical fiber in consideration of affection by heat generated.

As described above, in the optical fiber laser device 1400, the return-light-attenuating module 170 configured by bending the optical attenuating fiber whose bending loss in the return light is greater than a bending loss in the visible light by a plurality of rounds is connected to the first light-reflecting unit 112 via the signal port optical fiber of the pumping-light multiplexer 114, and the terminal of the return-light-attenuating module 170 is sealed with the resin. Therefore, the optical fiber laser device 1400 described above is configured to be high in durability relative to the return light, and thus achieves high durability and high output capability.

Fifteenth Embodiment

Figure 33:
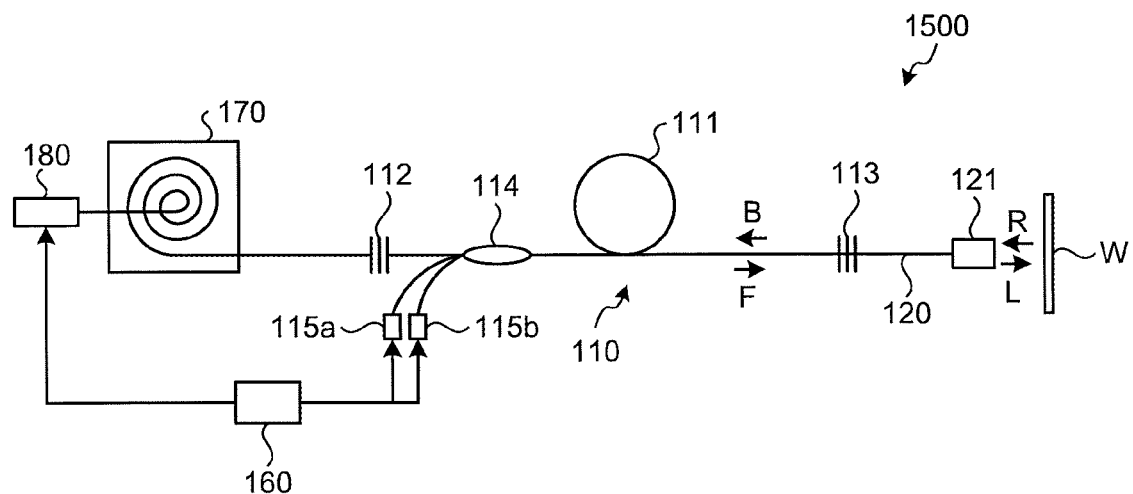
FIG. 33 illustrates a schematic configuration of an optical fiber laser device according to a fifteenth embodiment.

FIG. 33 illustrates a schematic configuration of an optical fiber laser device 1500 according to a fifteenth embodiment. As illustrated in FIG. 33, the optical fiber laser device 1500 according to the third embodiment is an optical fiber laser type device generating output laser light by using the laser oscillator 110. The laser oscillator 110 includes the optical amplifying fiber 111 and is configured to generate a laser resonance between the first light-reflecting unit 112 and the second light-reflecting unit 113. The output laser light generated by the laser oscillator 110 is irradiated as the output laser light L to the workpiece W via the optical outputting fiber 120 and the irradiation head 121.

As illustrated in FIG. 33, the optical fiber laser device 1500 according to the fifteenth embodiment adopts the forward-pumping type configuration. That is, in the optical fiber laser device 1500, the pumping light is introduced in the forward direction of the laser oscillator 110. However, unlike the first embodiment, the optical fiber laser device 1500 includes, between the first light-reflecting unit 112 and the optical amplifying fiber 111, the pumping-light multiplexer 114 for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115a and 115b, and the forward-direction-side signal port of the pumping-light multiplexer 114 is connected to the first light-reflecting unit 112. By this configuration, the pumping-light multiplexer 114 multiplexes the pumping lights output by the pumping laser diodes 115a and 115b and outputs the pumping lights to the laser oscillator 110. By this configuration, the pumping-light multiplexer 114 multiplexes the pumping lights output by the pumping laser diodes 115a and 115b and outputs the pumping lights to the laser oscillator 110. The reverse-direction-side signal port of the pumping-light multiplexer 114 is connected to the first light-reflecting unit 112. The optical fiber laser device 1500 is provided with the pumping laser diodes 115a and 115b and the control unit 160 for controlling other controlled sites.

The return-light-attenuating module 170 is connected to an optical fiber extending from the first light-reflecting unit 112. Unlike the first embodiment, in the optical fiber laser device 1500 according to the fifteenth embodiment, the return-light-attenuating module 170 is connected to the laser oscillator 110 not via the pumping-light multiplexer 114. However, the return-light-attenuating module 170 serves similarly to the first embodiment in the fifteenth embodiment as well. The visible-light-emitting portion 180 introducing a visible light in a forward direction via the return-light-attenuating module 170 is connected to the return-light-attenuating module 170.

As described above, in the optical fiber laser device 1500, the return-light-attenuating module 170 configured by bending the optical attenuating fiber whose bending loss in the return light is greater than a bending loss in the visible light by a plurality of rounds is connected to the first light-reflecting unit 112, and the optical fiber laser device 1300 is provided with the visible-light-emitting portion 180 into which the visible light is introduced via the return-light-attenuating module 170. Therefore, the optical fiber laser device 1500 described above is configured to be high in durability relative to the return light, and thus achieves high durability and high output capability.

Sixteenth Embodiment

Figure 34:
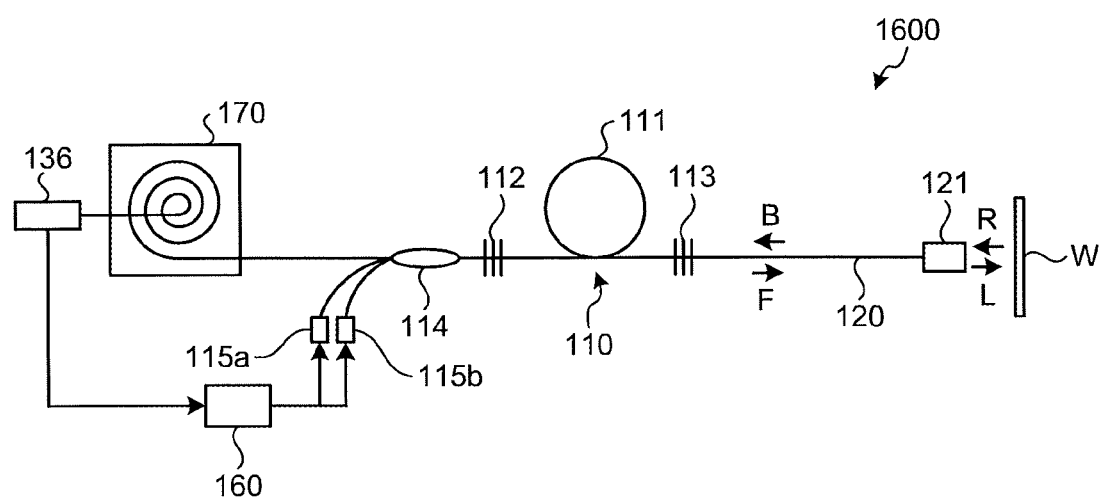
FIG. 34 illustrates a schematic configuration of an optical fiber laser device according to a sixteenth embodiment.

FIG. 34 illustrates a schematic configuration of an optical fiber laser device 1600 according to a sixteenth embodiment. As illustrated in FIG. 34, the optical fiber laser device 1600 according to the sixteenth embodiment is an optical fiber laser type device generating laser light by using the laser oscillator 110. The laser oscillator 110 is provided with the optical amplifying fiber 111 and is configured to generate a laser resonance between the first light-reflecting unit 112 and the second light-reflecting unit 113. The laser light generated by the laser oscillator 110 is irradiated as the output laser light L to the workpiece W via the optical outputting fiber 120 and the irradiation head 121.

As illustrated in FIG. 34, the optical fiber laser device 1600 according to the sixteenth embodiment adopts the forward-pumping type configuration. That is, in the optical fiber laser device 1600, pumping light is introduced in the forward direction of the laser oscillator 110. For that purpose, the optical fiber laser device 1600 is provided with the pumping-light multiplexer 114, at an upstream to the first light-reflecting unit 112, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115a and 115b, and the forward-direction-side signal port of the pumping-light multiplexer 114 is connected to the first light-reflecting unit 112. By this configuration, the pumping-light multiplexer 114 multiplexes the pumping lights output by the pumping laser diodes 115a and 115b and outputs the pumping lights to the laser oscillator 110. The return-light-attenuating module 170 is connected to the signal port optical fiber extending from the reverse-direction-side signal port of the pumping-light multiplexer 114. The optical fiber laser device 1600 is provided with the control unit 160 for controlling the pumping laser diodes 115a and 115b and other controlled sites.

In the optical fiber laser device 1600 according to the sixteenth embodiment, the optical sensor 136 is connected to an end point at the reverse direction side of the return-light-attenuating module 170. The optical sensor 136 makes light input via the return-light-attenuating module 170 be subjected to photoelectric conversion, and measures an intensity of the return light transmitting through the first light-reflecting unit 112 of the laser oscillator 110. The intensity of the return light measured by the optical sensor 136 is transmitted to the control unit 160. The intensity of the return light may be an index for determining as to whether or not the optical fiber laser device 1600 is operated normally. On the other hand, the return light may be very intense sometimes, and if it is input directly, the optical sensor 136 may be damaged possibly. To address this, the optical fiber laser device 1600 is configured to measure the intensity of the return light attenuated by the return-light-attenuating module 170 appropriately.

As described above, in the optical fiber laser device 1600, the return-light-attenuating module 170 configured by bending the optical attenuating fiber of which bending loss in the return light is greater than a bending loss in the visible light by a plurality of rounds is connected to the first light-reflecting unit 112 via the signal port optical fiber of the pumping-light multiplexer 114, and the optical sensor 136 conducting photoelectric conversion is connected to a terminal of the return-light-attenuating module 170. Therefore, the optical fiber laser device 1600 described above is configured to be high in durability relative to the return light, and thus achieves high durability and high output capability.

Seventeenth Embodiment

Figure 35:
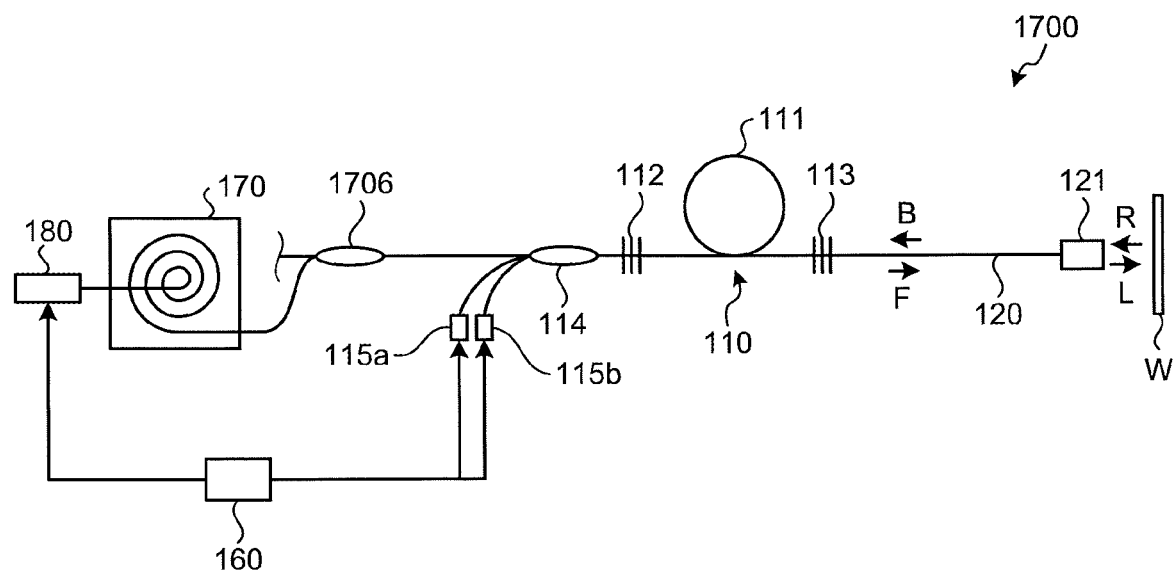
FIG. 35 illustrates a schematic configuration of an optical fiber laser device according to a seventeenth embodiment.

FIG. 35 illustrates a schematic configuration of an optical fiber laser device 1700 according to a seventeenth embodiment. As illustrated in FIG. 35, the optical fiber laser device 1700 according to the seventeenth embodiment is an optical fiber laser type device generating output laser light by using the laser oscillator 110. The laser oscillator 110 is provided with the optical amplifying fiber 111 and is configured to generate a laser resonance between the first light-reflecting unit 112 and the second light-reflecting unit 113. The output laser light generated by the laser oscillator 110 is irradiated as the output laser light L to the workpiece W via the optical outputting fiber 120 and the irradiation head 121.

As illustrated in FIG. 35, the optical fiber laser device 1700 according to the seventeenth embodiment adopts the forward-pumping type configuration. That is, in the optical fiber laser device 1700, pumping light is introduced in the forward direction of the laser oscillator 110. For that purpose, the optical fiber laser device 1700 is provided with the pumping-light multiplexer 114, at an upstream to the first light-reflecting unit 112, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115$a$ and 115$b$, and the forward-direction-side signal port of the pumping-light multiplexer 114 is connected to the first light-reflecting unit 112. By this configuration, the pumping-light multiplexer 114 multiplexes the pumping lights output by the pumping laser diodes 115$a$ and 115$b$ and outputs the pumping lights to the laser oscillator 110. The optical fiber laser device 1700 is provided with the control unit 160 for controlling the pumping laser diodes 115$a$ and 115$b$ and other controlled sites.

In the optical fiber laser device 1700 according to the seventeenth embodiment, the return-light-attenuating module 170 is connected to a downstream, split by an optical multiplexer/demultiplexer 1706, to the signal port optical fiber extending from the reverse-direction-side signal port of the pumping-light multiplexer 114. One, for example, called a Tap coupler or a wavelength division multiplex optical multiplexer/demultiplexer or the like may be used for the optical multiplexer/demultiplexer 1706. The Tap coupler demultiplexes an input light by a predetermined intensity ratio without wavelength dependency, and the wavelength division multiplex optical multiplexer/demultiplexer is capable of demultiplexing an input light by a predetermined intensity ratio while having a wavelength dependency. Therefore, the return light after being attenuated by the optical multiplexer/demultiplexer 1706 is supposed to be input to the return-light-attenuating module 170. The visible-light-emitting portion 180 introducing a visible light in a forward direction via the return-light-attenuating module 170 is connected to the return-light-attenuating module 170.

As described above, in the optical fiber laser device 1700, the return-light-attenuating module 170 configured by bending the optical attenuating fiber of which bending loss in the return light is greater than a bending loss in the visible light by a plurality of rounds is connected to the first light-reflecting unit 112 via the signal port optical fiber of the pumping-light multiplexer 114, and the optical fiber laser device 1700 is provided with the visible-light-emitting portion 180 into which the visible light is introduced via the return-light-attenuating module 170. Therefore, the optical fiber laser device 1700 described above is configured to be high in durability relative to the return light, and thus achieves high durability and high output capability.

Eighteenth Embodiment

Figure 36:
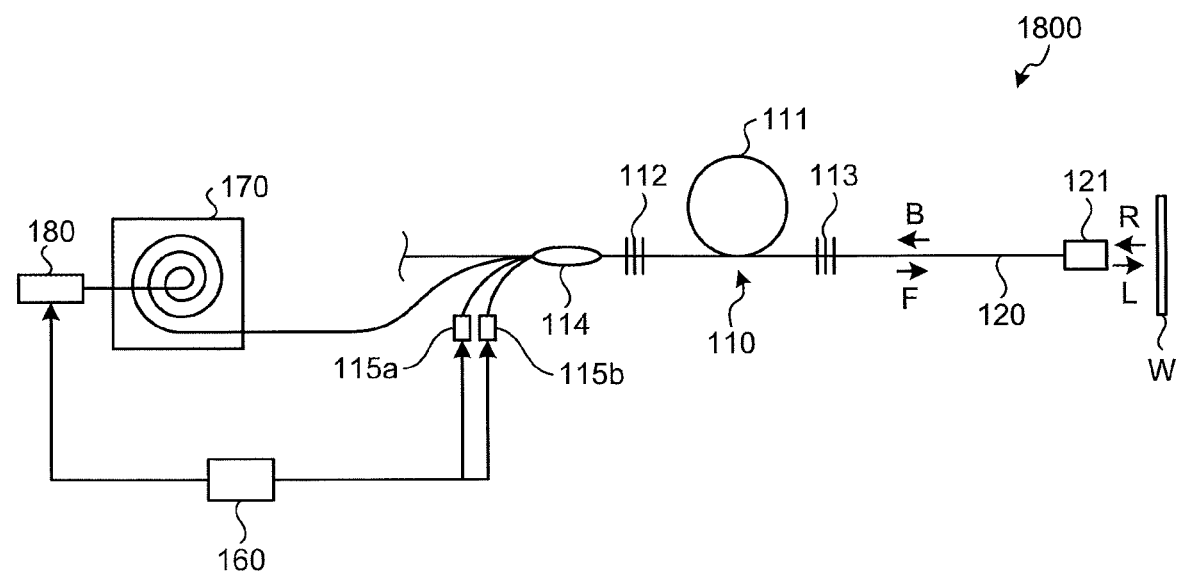
FIG. 36 illustrates a schematic configuration of an optical fiber laser device according to an eighteenth embodiment.

FIG. 36 illustrates a schematic configuration of an optical fiber laser device 1800 according to the eighteenth embodiment. As illustrated in FIG. 36, the optical fiber laser device 1800 according to the eighteenth embodiment is an optical fiber laser type device generating laser light by using the laser oscillator 110. The laser oscillator 110 is provided with the optical amplifying fiber 111 and is configured to generate a laser resonance between the first light-reflecting unit 112 and the second light-reflecting unit 113. The output laser light generated by the laser oscillator 110 is irradiated as the output laser light L to the workpiece W via the optical outputting fiber 120 and the irradiation head 121.

As illustrated in FIG. 36, the optical fiber laser device 1800 according to the eighteenth embodiment adopts the forward-pumping type configuration. That is, in the optical fiber laser device 1800, pumping light is introduced in the forward direction of the laser oscillator 110. For that purpose, the optical fiber laser device 1800 is provided with the pumping-light multiplexer 114, at an upstream to the first light-reflecting unit 112, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115$a$ and 115$b$, and the forward-direction-side signal port of the pumping-light multiplexer 114 is connected to the first light-reflecting unit 112. By this configuration, the pumping-light multiplexer 114 multiplexes the pumping lights output by the pumping laser diodes 115$a$ and 115$b$ and outputs the pumping lights to the laser oscillator 110. The optical fiber laser device 1800 is provided with the control unit 160 for controlling the pumping laser diodes 115$a$ and 115$b$ and other controlled sites.

In the optical fiber laser device 1800 according to the eighteenth embodiment, the return-light-attenuating module 170 is connected to a port, among the light-pumping port of the pumping-light multiplexer 114, to which the pumping laser diodes 115$a$ and 115$b$ are not connected (a so-called redundant port), and is configured so that the attenuated return light is irradiated from an end portion on the opposite side to the optical outputting fiber 120 (an end portion from which the return light is emitted). A multi-mode optical fiber extends to the light-pumping port of the pumping-light multiplexer 114. For example, for this multi-mode optical fiber, NA is 0.22, a core diameter is 110 µm, and a cladding diameter is 125 µm. Therefore, it is preferable that a same kind of multi-mode optical fiber be selected as an optical receiving fiber of the return-light-attenuating module 170 so that a connection loss decreases when the optical receiving fiber is connected to this multi-mode optical fiber. Although an inner configuration of the return-light-attenuating module 170 may be similar to the first embodiment, the optical attenuating fiber 172 may be the multi-mode optical fiber. The visible-light-emitting portion 180 introducing a visible light in a forward direction via the return-light-attenuating module 170 is connected to the return-light-attenuating module 170.

As described above, in the optical fiber laser device 1800, the return-light-attenuating module 170 configured by bending the optical attenuating fiber of which bending loss in the return light is greater than a bending loss in the visible light by a plurality of rounds is connected to the first light-reflecting unit 112 via the signal port optical fiber of the pumping-light multiplexer 114, and the optical fiber laser device 1700 is provided with the visible-light-emitting portion 180 into which the visible light is introduced via the return-light-attenuating module 170. Therefore, the optical fiber laser device 1800 described above is configured to be high in durability relative to the return light, and thus achieves high durability and high output capability.

Nineteenth Embodiment

Figure 37:
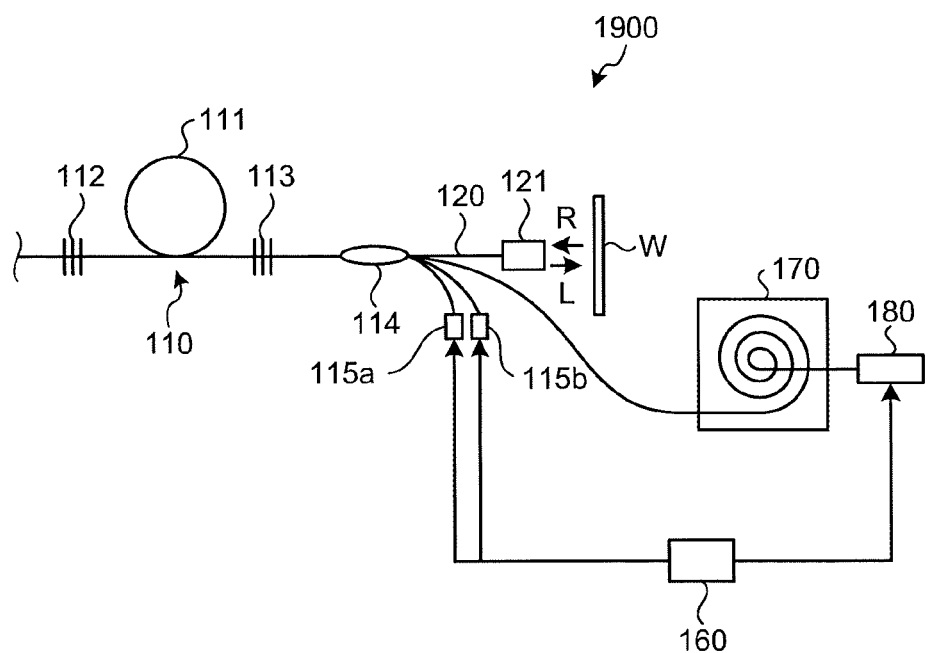
FIG. 37 illustrates a schematic configuration of an optical fiber laser device according to a nineteenth embodiment.

FIG. 37 illustrates a schematic configuration of an optical fiber laser device 1900 according to a nineteenth embodiment. As illustrated in FIG. 37, the optical fiber laser device 1900 according to the nineteenth embodiment is an optical fiber laser type device generating laser light by using the laser oscillator 110. The laser oscillator 110 is provided with the optical amplifying fiber 111 and is configured to generate a laser resonance between the first light-reflecting unit 112 and the second light-reflecting unit 113. The output laser light generated by the laser oscillator 110 is irradiated as the output laser light L to the workpiece W via the optical outputting fiber 120 and the irradiation head 121.

As illustrated in FIG. 37, the optical fiber laser device 1900 according to the nineteenth embodiment adopts a so-called backward-pumping configuration. That is, in the optical fiber laser device 1900, pumping light is introduced in a backward direction of the laser oscillator 110. For that purpose, the optical fiber laser device 1900 is provided with the pumping-light multiplexer 114, at a downstream to the second light-reflecting unit 113, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115a and 115b, and the reverse-direction-side signal port of the pumping-light multiplexer 114 is connected to the second light-reflecting unit 113. By this configuration, the pumping-light multiplexer 114 multiplexes the pumping lights output by the pumping laser diodes 115a and 115b and outputs the pumping lights to the laser oscillator 110. The optical fiber laser device 1900 is provided with the control unit 160 for controlling the pumping laser diodes 115a and 115b and other controlled sites.

In the optical fiber laser device 1900 according to the nineteenth embodiment, the return-light-attenuating module 170 is connected to a port, among the light-pumping port of the pumping-light multiplexer 114, to which the pumping laser diodes 115a and 115b are not connected (a so-called redundant port), and is configured so that the attenuated return light is irradiated from an end portion on the opposite side to the optical outputting fiber 120 (an end portion from which the return light is emitted). A multi-mode optical fiber extends to the light-pumping port of the pumping-light multiplexer 114, and it is preferable that an optical receiving fiber of the return-light-attenuating module 170 be selected so that a connection loss decreases when the optical receiving fiber is connected to this multi-mode optical fiber. The visible-light-emitting portion 180 introducing a visible light in a forward direction via the return-light-attenuating module 170 is connected to the return-light-attenuating module 170.

As described above, in the optical fiber laser device 1900, the return-light-attenuating module 170 configured by bending the optical attenuating fiber of which bending loss in the return light is greater than a bending loss in the visible light by a plurality of rounds is connected to the second light-reflecting unit 113 via the signal port optical fiber of the pumping-light multiplexer 114, and the optical fiber laser device 1700 is provided with the visible-light-emitting portion 180 into which the visible light is introduced via the return-light-attenuating module 170. Therefore, the optical fiber laser device 1900 described above is configured to be high in durability relative to the return light, and thus achieves high durability and high output capability.

Twentieth Embodiment

Figure 38:
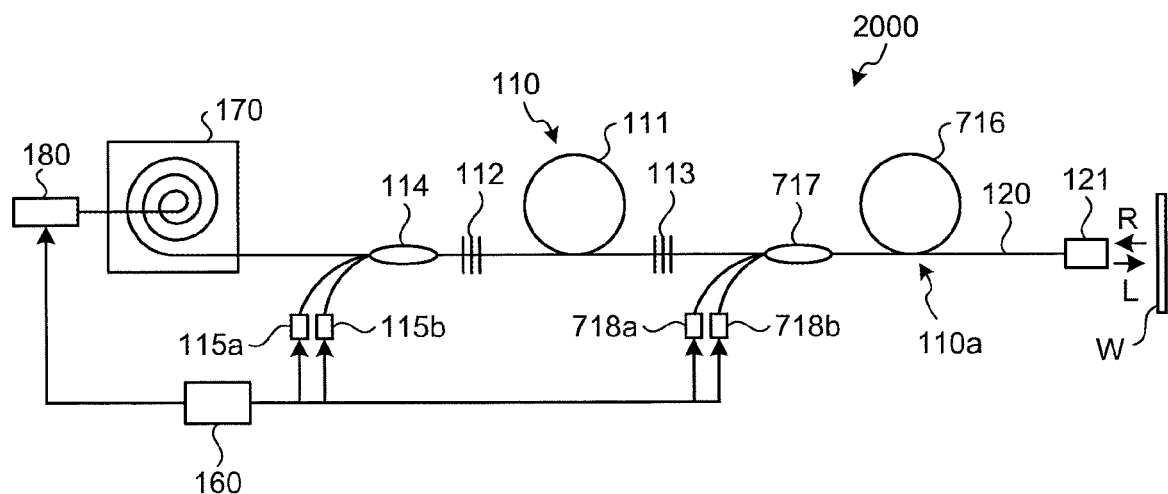
FIG. 38 illustrates a schematic configuration of an optical fiber laser device according to a twentieth embodiment.

FIG. 38 illustrates a schematic configuration of an optical fiber laser device 2000 according to a twentieth embodiment. As illustrated in FIG. 38, the optical fiber laser device 2000 according to the twentieth embodiment is a so-called master oscillator power-amplifier structure of an optical fiber laser type device generating output laser light by using the laser oscillator 110 and amplifying the output laser light generated by the laser oscillator 110 with an amplifier 110a. The laser oscillator 110 is provided with the optical amplifying fiber 111 and is configured to generate a laser resonance between the first light-reflecting unit 112 and the second light-reflecting unit 113. The output laser light generated by the laser oscillator 110 is amplified while propagating through the optical amplifying fiber 716 of the amplifier 110a and irradiated as the output laser light L to the workpiece W via the optical outputting fiber 120 and the irradiation head 121.

As illustrated in FIG. 38, any one of the laser oscillator 110 and the amplifier 110a of the optical fiber laser device 2000 according to the twentieth embodiment adopts the forward-pumping type configuration. That is, in the optical fiber laser device 2000, pumping light is introduced in the forward direction of the laser oscillator 110 and the amplifier 110a. For that purpose, the optical fiber laser device 2000 is provided with the pumping-light multiplexer 114, at an upstream to the first light-reflecting unit 112, for introducing the pumping light to the laser oscillator 110, and is provided with the second pumping-light multiplexer 717, between the second light-reflecting unit 113 and the optical amplifying fiber 716, for introducing the pumping light to the amplifier 110a.

The first pumping-light multiplexer 114 and the second pumping-light multiplexer 717 are configured by, for example, TFBs similarly to the first embodiment. The light-pumping port of the first pumping-light multiplexer 114 is connected to the pumping laser diodes 115a and 115b, and the forward-direction-side signal port of the first pumping-light multiplexer 114 is connected to the first light-reflecting unit 112. By this configuration, the pumping-light multiplexer 114 multiplexes the pumping lights output by the pumping laser diodes 115a and 115b and outputs the pumping lights to the laser oscillator 110. On the other hand, the light-pumping port of the second pumping-light multiplexer 717 is connected to the pumping laser diodes 718a and 718b, the reverse-direction-side signal port of the second pumping-light multiplexer 717 is connected to the second light-reflecting unit 113, and the reverse-direction-side signal port of the second pumping-light multiplexer 717 is connected to the optical amplifying fiber 716. By this configuration, the second pumping-light multiplexer 717 multiplexes the pumping lights output by pumping laser diodes 118a and 118b and outputs the pumping lights to the amplifier 110a.

The return-light-attenuating module 170 is connected to a signal port optical fiber extending from the reverse-direction-side signal port of the first pumping-light multiplexer 114. The inner configuration of the return-light-attenuating module 170 may be similar to the first embodiment. The visible-light-emitting portion 180 introducing a visible light in a forward direction via the return-light-attenuating module 170 is connected to the return-light-attenuating module 170. The optical fiber laser device 2000 is provided with the control unit 160 for controlling the pumping laser diodes 115a, 115b, 718a, 718b, visible-light-emitting portion 180, and the other controlled sites.

As described above, in the optical fiber laser device 2000, the return-light-attenuating module 170 configured by bending the optical attenuating fiber of which bending loss in the return light is greater than a bending loss in the visible light by a plurality of rounds is connected to the second light-reflecting unit 113 via the signal port optical fiber of the pumping-light multiplexer 114, and the optical fiber laser device 2000 is provided with the visible-light-emitting portion 180 into which the visible light is introduced via the return-light-attenuating module 170. Therefore, the optical fiber laser device 2000 described above is configured to be high in durability relative to the return light, and thus achieves high durability and high output capability.

Twenty-First Embodiment

Figure 39:
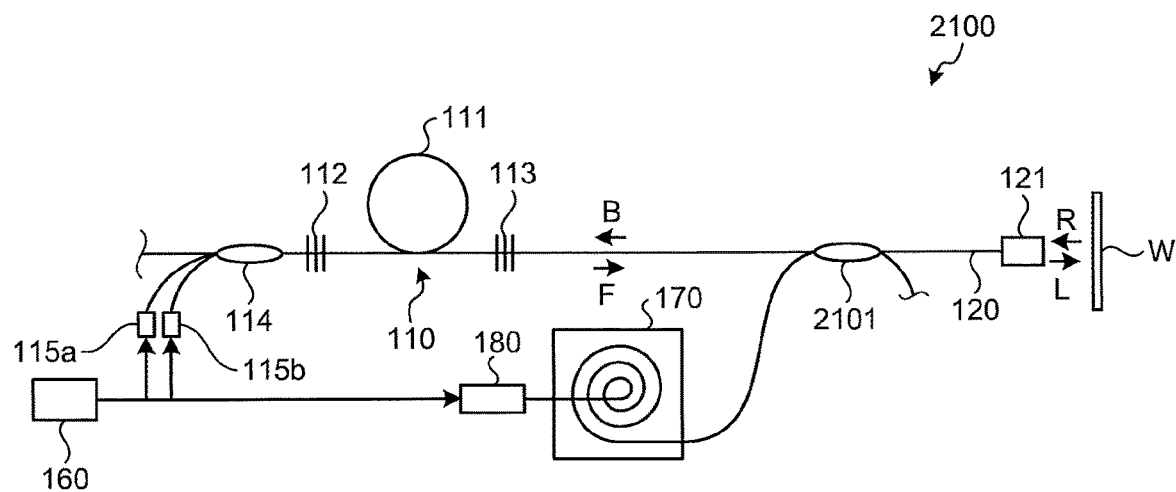
FIG. 39 illustrates a schematic configuration of an optical fiber laser device according to a twenty-first embodiment.

FIG. 39 illustrates a schematic configuration of an optical fiber laser device 2100 according to a twenty-first embodiment. As illustrated in FIG. 39, the optical fiber laser device 2100 according to the twenty-first embodiment is an optical fiber laser type device generating laser light by using the laser oscillator 110. The laser oscillator 110 is provided with the optical amplifying fiber 111 and is configured to generate a laser resonance between the first light-reflecting unit 112 and the second light-reflecting unit 113. The output laser light generated by the laser oscillator 110 is irradiated as the output laser light L to the workpiece W via the optical outputting fiber 120 and the irradiation head 121.

As illustrated in FIG. 39, the optical fiber laser device 2100 according to the twenty-first embodiment adopts the forward-pumping type configuration. That is, in the optical fiber laser device 2100, pumping light is introduced in the forward direction of the laser oscillator 110. For that purpose, the optical fiber laser device 2100 is provided with the pumping-light multiplexer 114, at an upstream to the first light-reflecting unit 112, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115a and 115b, and the forward-direction-side signal port of the pumping-light multiplexer 114 is connected to the first light-reflecting unit 112. By this configuration, the pumping-light multiplexer 114 multiplexes the pumping lights output by the pumping laser diodes 115a and 115b and outputs the pumping light to the laser oscillator 110. The optical fiber laser device 2100 is provided with the control unit 160 for controlling the pumping laser diodes 115a and 115b and other controlled sites.

In the optical fiber laser device 2100 according to the twenty-first embodiment, an optical multiplexer/demultiplexer 2101 is provided in the middle of the optical outputting fiber 120, and the return-light-attenuating module 170 is connected to an optical fiber, at an reverse direction side, of optical fibers split by the optical multiplexer/demultiplexer 2101, and it is configured so that the attenuated return light is emitted from an end portion on an opposite side of the optical outputting fiber 120 (an end portion emitting the return light). One, for example, called a Tap coupler or a wavelength division multiplex optical multiplexer/demultiplexer or the like may be used for the optical multiplexer/demultiplexer 2101, and any one of those has light-splitting characteristics of attenuating the return light splitting from the optical multiplexer/demultiplexer 2101 and input to the return-light-attenuating module 170 and outputting the visible light output from the visible-light-emitting portion 180 from the optical fiber laser device 2100 with a visible intensity. The inner configuration of the return-light-attenuating module 170 may be similar to the first embodiment. The visible-light-emitting portion 180 introducing a visible light in a forward direction via the return-light-attenuating module 170 is connected to the return-light-attenuating module 170. The visible light emitted by the visible-light-emitting portion 180 may be used for a guide light by the above-described configuration as well.

As described above, the optical fiber laser device 2100 includes the return-light-attenuating module 170 configured by bending the optical attenuating fiber, of which bending loss in the return light is greater than a bending loss in the visible light by a plurality of rounds, and the visible-light-emitting portion 180 into which the visible light is introduced via the return-light-attenuating module 170. Therefore, the optical fiber laser device 2100 described above is configured to be high in durability relative to the return light, and thus achieves high durability and high output capability.

Twenty-Second Embodiment

Figure 40:
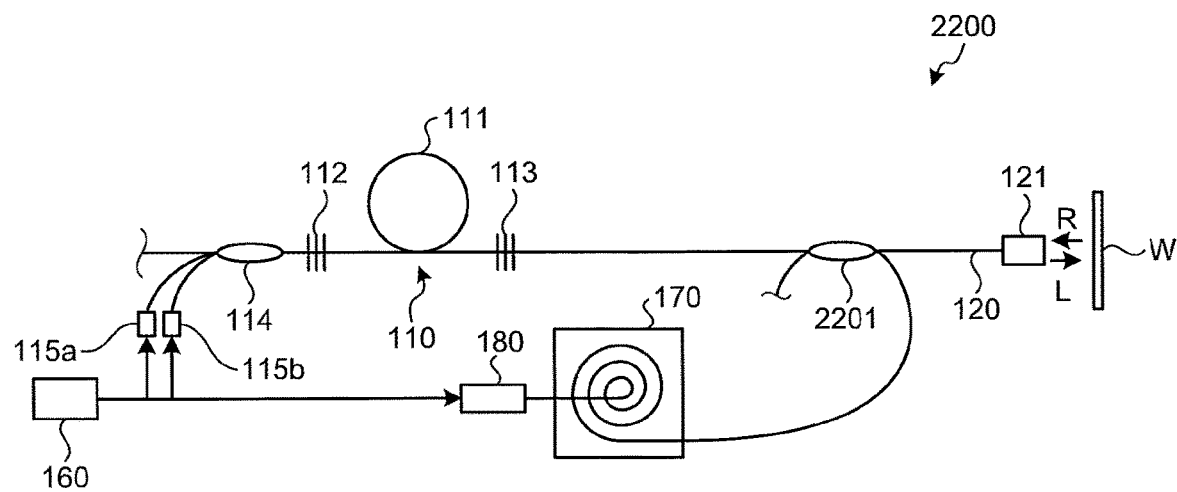
FIG. 40 illustrates a schematic configuration of an optical fiber laser device according to a twenty-second embodiment.

FIG. 40 illustrates a schematic configuration of an optical fiber laser device 2200 according to a twenty-second embodiment. As illustrated in FIG. 40, the optical fiber laser device 2200 according to the twenty-second embodiment is an optical fiber laser type device generating output laser light by using the laser oscillator 110. The laser oscillator 110 is provided with the optical amplifying fiber 111 and is configured to generate a laser resonance between the first light-reflecting unit 112 and the second light-reflecting unit 113. The output laser light generated by the laser oscillator 110 is irradiated as the output laser light L to the workpiece W via the optical outputting fiber 120 and the irradiation head 121.

As illustrated in FIG. 40, the optical fiber laser device 2200 according to the twenty-second embodiment adopts the forward-pumping type configuration. That is, in the optical fiber laser device 2200, pumping light is introduced in the forward direction of the laser oscillator 110. For that purpose, the optical fiber laser device 2200 is provided with the pumping-light multiplexer 114, at an upstream to the first light-reflecting unit 112, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115a and 115b, and the forward-direction-side signal port of the pumping-light multiplexer 114 is connected to the first light-reflecting unit 112. By this configuration, the pumping-light multiplexer 114 multiplexes the pumping lights output by the pumping laser diodes 115a and 115b and outputs the pumping light to the laser oscillator 110. The optical fiber laser device 2200 is provided with the control unit 160 for controlling the pumping laser diodes 115a and 115b and other controlled sites.

In the optical fiber laser device 2200 according to the twenty-second embodiment, an optical multiplexer/demultiplexer 2201 is provided in the middle of the optical outputting fiber 120, and the return-light-attenuating module 170 is connected to an optical fiber, at a forward direction side, of optical fibers split by the optical multiplexer/demultiplexer 2101. One, for example, called a Tap coupler or a wavelength division multiplex optical multiplexer/demultiplexer or the like may be used for the optical multiplexer/demultiplexer 2201. The inner configuration of the return-light-attenuating module 170 may be similar to the first embodiment. The visible-light-emitting portion 180 introducing a visible light in a forward direction via the return-light-attenuating module 170 is connected to the return-light-attenuating module 170.

By the above-described configuration, the visible light emitted by the visible-light-emitting portion 180 may be used for failure analysis. That is, when a failure like disconnection or the like is considered to occur on the optical path such as, for example, the optical outputting fiber 120, the optical amplifying fiber 111, and the like, for the output laser light in the optical fiber laser device 2200, the control unit 160 makes the visible-light-emitting portion 180 emit light in a state of stopping operations of the pumping laser diodes 115a and 115b. The visible light emitted from the visible-light-emitting portion 180 is propagated through the optical outputting fiber 120, the optical amplifying fiber 111, and the like, in this order. If it is assumed that there is disconnection on the optical path, since the visible light leaks to outside at a point of the disconnection, the point of disconnection may be identified visually.

As described above, the optical fiber laser device 2200 includes the return-light-attenuating module 170 configured by bending the optical attenuating fiber, of which bending loss in the return light is greater than a bending loss in the visible light by a plurality of rounds, and the visible-light-emitting portion 180 into which the visible light is introduced via the return-light-attenuating module 170. Therefore, the optical fiber laser device 2200 described above is configured to be high in durability relative to the return light, and thus achieves high durability and high output capability.

Twenty-Third Embodiment

Figure 41:
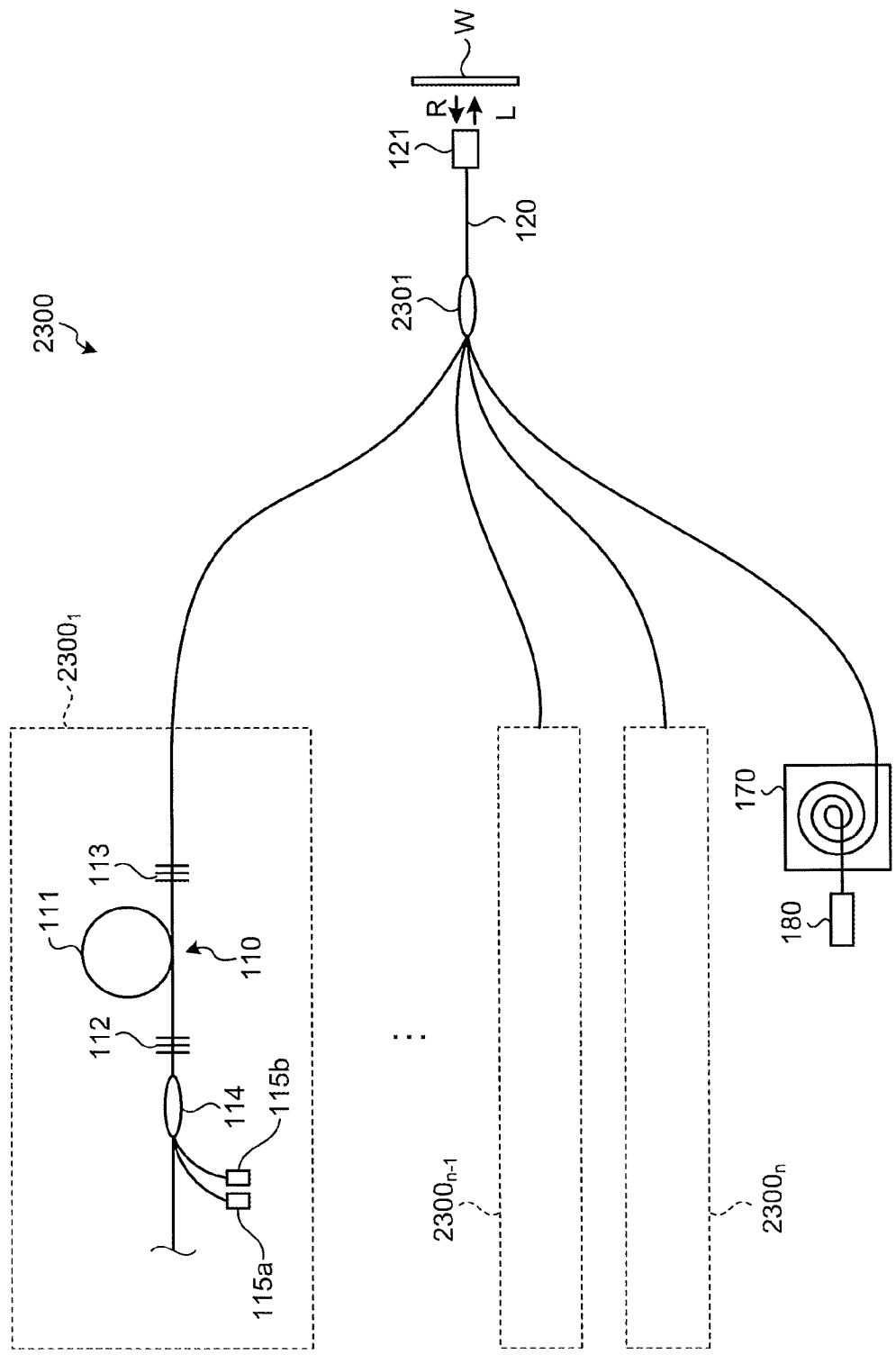
FIG. 41 illustrates a schematic configuration of an optical fiber laser device according to a twenty-third embodiment.

FIG. 41 illustrates a schematic configuration of an optical fiber laser device 2300 according to the twenty-third embodiment. As illustrated in FIG. 41, the optical fiber laser device 2300 according to the twenty-third embodiment includes a plurality of optical fiber laser portions 23001, . . . , 2300n-1, and 2300n, the output laser lights output by the respective optical fiber laser portions 23001, . . . , 2300n-1, and 2300n are coupled at a combiner 2301 and irradiated as the output laser light L to the workpiece W via the optical outputting fiber 120 and the irradiation head 121.

Each of the optical fiber laser portions 23001, . . . , 2300n-1, and 2300n is an independent virtual optical fiber laser device. Therefore, hereafter only a configuration of the optical fiber laser portion 23001 will be explained as a representative.

The optical fiber laser portion 23001 is an optical fiber laser type device generating output laser light by using the laser oscillator 110. The laser oscillator 110 is provided with the optical amplifying fiber 111 and is configured to generate a laser resonance between the first light-reflecting unit 112 and the second light-reflecting unit 113.

As illustrated in FIG. 41, the optical fiber laser portion 23001 adopts the forward-pumping type configuration. That is, in the optical fiber laser portion 23001, pumping light is introduced in the forward direction of the laser oscillator 110. For that purpose, the optical fiber laser portion 23001 is provided with the pumping-light multiplexer 114, at an upstream to the first light-reflecting unit 112, for introducing the pumping light to the laser oscillator 110.

The pumping-light multiplexer 114 is configured by, for example, the TFB similarly to the first embodiment. The light-pumping port of the pumping-light multiplexer 114 is connected to the pumping laser diodes 115a and 115b, and the forward-direction-side signal port of the pumping-light multiplexer 114 is connected to the first light-reflecting unit 112. By this configuration, the pumping-light multiplexer 114 multiplexes the pumping lights output by the pumping laser diodes 115a and 115b and outputs the pumping light to the laser oscillator 110.

In the optical fiber laser device 2300 according to the twenty-third embodiment, the return-light-attenuating module 170 is connected to a port, among ports of the combiner 2301, to which optical fiber laser portions 11001, . . . , 1100n-1, and 1100n are not connected, and is configured so that the attenuated return light is irradiated from an end portion on the opposite side to the optical outputting fiber 120 (an end portion from which the return light is emitted). Moreover, the visible-light-emitting portion 180 introducing a visible light in a forward direction via the return-light-attenuating module 170 is connected to the return-light-attenuating module 170. The visible light emitted by the visible-light-emitting portion 180 may be used for a guide light by the above-described configuration as well.

As described above, the optical fiber laser device 2300 includes the return-light-attenuating module 170 configured by bending the optical attenuating fiber, of which bending loss in the return light is greater than a bending loss in the visible light by a plurality of rounds, and the visible-light-emitting portion 180 into which the visible light is introduced via the return-light-attenuating module 170. Therefore, the above-described optical fiber laser device 2300 is configured to be high in durability relative to the return light, and thus achieves high durability and high output capability.

The present disclosure having been described based the embodiments is not limited to the above-described embodiments. The present disclosure includes a configuration combining components of each of the above-described embodiments. The present disclosure includes all of other embodiments, examples, operation techniques, and the like carried out based on the above-described embodiments by an ordinary skilled person in the art.

For example, although the above-described embodiments were described based on configuration examples of the forward-pumping laser oscillator and amplifier, the present disclosure may be carried out appropriately even by the backward-pumping laser oscillator and amplifier, and even by the bidirectional pumping laser oscillator and amplifier pumping in both the forward direction and the backward direction. Although only one embodiment configured to include the amplifier was explained in the above-described embodiments, it is possible to configure each embodiment to add an amplifier.

Although the return-light-attenuating module is provided at one location in each of the above-described embodiments, it goes without saying that a plurality of optical attenuation modules may be provided to one optical fiber laser device. A configuration of providing a plurality of optical attenuation modules to one port may be included in the scope of the present disclosure. The number of composing parts connected to one return-light-attenuating module is not limited to one, and an optical fiber may be split by an optical multiplexer/demultiplexer to be connected to, for example, a plurality of visible-light emitting unit, a detector and the like.

The visible light emitted by the visible-light emitting unit is not limited to red in color (wavelength of 660 nm), and a more visible green light may be used. It may be configured that a wavelength-dependency element is provided inside the visible-light emitting unit to limit a wavelength of the return light. Moreover, a space-coupling type shutter may be introduced to the visible-light-emitting unit to close the shutter when oscillating output laser light.

The present disclosure has been made in view of the above and an object of the present disclosure is to provide an optical fiber laser device having high durability and high output capability.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber laser device for generating laser light by using an optical amplifying fiber as an amplification medium in a laser oscillator, the optical fiber laser device comprising:
   an optical outputting fiber configured to output laser light to an outside in a forward direction, the optical outputting fiber being a substantially single mode fiber; and
   a return-light-attenuating portion formed of an optical attenuating fiber coiled for a plurality of coplanar rounds, wherein
   a bending radius of the optical attenuating fiber varies every round of the plurality of coplanar rounds, and
   a bending loss in return light is greater than a bending loss in visible light, the return light being infrared light propagating through the optical outputting fiber in a reverse direction of the laser light.

2. The optical fiber laser device according to claim 1, wherein the return-light-attenuating portion is connected to an optical fiber disposed at an upstream side relative to a reflection unit, of the laser oscillator, having high reflectivity.

3. The optical fiber laser device according to claim 2, wherein the return-light-attenuating portion is connected to an optical fiber at a reverse direction side relative to the reflection unit via a signal port optical fiber of a pumping-light multiplexer for introducing pumping light used for laser oscillation of the laser oscillator to the optical amplifying fiber.

4. The optical fiber laser device according to claim 2, wherein the return-light-attenuating portion is connected to an optical fiber at a reverse direction side relative to the reflection unit via a pumping light port of the pumping-light multiplexer for introducing pumping light used for laser oscillation of the laser oscillator to the optical amplifying fiber.

5. The optical fiber laser device according to claim 1, wherein the return-light-attenuating portion is connected to an optical fiber split from an optical multiplexer/demultiplexer provided in a middle of the optical outputting fiber.

6. The optical fiber laser device according to claim 1, further comprising a visible-light-emitting portion introducing the visible light to the optical outputting fiber via the return-light-attenuating portion.

7. The optical fiber laser device according to claim 6, wherein a bend edge wavelength of the optical attenuating fiber is shorter than a wavelength of the return light.

8. The optical fiber laser device according to claim 6, wherein the optical attenuating fiber is configured to propagate the visible light in a substantially single mode.

9. The optical fiber laser device according to claim 8, wherein the optical attenuating fiber is configured to propagate a red-color light in a substantially single mode.

10. The optical fiber laser device according to claim 1, wherein a terminal of the return-light-attenuating portion is sealed by a resin.

11. The optical fiber laser device according to claim 1, wherein an optical sensor conducting a photoelectric conversion is connected to a terminal of the return-light-attenuating portion.

12. An optical fiber laser device for generating laser light by using an optical amplifying fiber as an amplification medium in a laser oscillator, the optical fiber laser device comprising:
   an optical outputting fiber configured to output the laser light to an outside in a forward direction, the optical outputting fiber being a substantially single mode fiber; and
   a return-light-attenuating portion configured to attenuate an optical intensity of return light including infrared light propagating a core of the optical outputting fiber in a reverse direction and emit the attenuated return light from an end portion on an opposite side to the optical outputting fiber, wherein
   the return-light-attenuating portion includes:
      a return light propagation loss portion made of an optical attenuating fiber coiled for a plurality of coplanar rounds, the optical attenuating fiber giving a loss to the return light continuously in a direction of propagation of the return light, a bending radius of the optical attenuating fiber varying every round of the plurality of coplanar rounds
   wherein a major portion of the return light is attenuated and subjected to thermal conversion at the return light propagation loss portion, and
   only residual light, of which intensity is minute, after being attenuated is output from an end portion of the return light propagation loss portion.

13. The optical fiber laser device according to claim 12, wherein
   optical attenuating fiber includes a core connected to a core of an optical fiber included in the laser oscillator of the optical fiber laser device, and
   the major portion of the return light is attenuated at the core included in the return light propagation loss portion.

14. The optical fiber laser device according to claim 13, wherein a loss, of the core of the optical fiber included in the return light propagation loss portion, at a wavelength of an infrared laser light output from the optical outputting fiber is greater than a loss at a visible wavelength bandwidth.

15. The optical fiber laser device according to claim 14, wherein the core of the optical fiber included in the return light propagation loss portion has single mode propagation characteristics at the visible wavelength bandwidth.

16. The optical fiber laser device according to claim 12, further comprising a visible-light-emitting portion configured to introduce the visible light to the optical outputting fiber via the return-light-attenuating portion.

17. The optical fiber laser device according to claim 12, wherein an optical sensor conducting a photoelectric conversion is connected to a terminal of the return-light-attenuating portion.

* * * * *